(12) United States Patent
Tatani et al.

(10) Patent No.: US 11,175,754 B2
(45) Date of Patent: Nov. 16, 2021

(54) ELECTRONIC DEVICE AND INFORMATION PROCESSING METHOD

(71) Applicant: Keiji Tatani, Kanagawa (JP)

(72) Inventors: Keiji Tatani, Kanagawa (JP); Takashi Otsubo, Tokyo (JP); Masaki Ohmizo, Tokyo (JP)

(73) Assignee: Keiji Tatani, Kanagawa (JP)

( * ) Notice: Subject to any disclaimer, the term of this patent is extended or adjusted under 35 U.S.C. 154(b) by 5 days.

(21) Appl. No.: 16/494,115

(22) PCT Filed: Mar. 12, 2018

(86) PCT No.: PCT/JP2018/009535
§ 371 (c)(1),
(2) Date: Sep. 13, 2019

(87) PCT Pub. No.: WO2018/168784
PCT Pub. Date: Sep. 20, 2018

(65) Prior Publication Data
US 2021/0132709 A1    May 6, 2021

(30) Foreign Application Priority Data

Mar. 13, 2017  (JP) .............................. JP2017-047237

(51) Int. Cl.
*G06F 3/0354* (2013.01)
*G06N 20/00* (2019.01)
(Continued)

(52) U.S. Cl.
CPC .......... *G06F 3/03545* (2013.01); *G06F 3/011* (2013.01); *G06F 3/017* (2013.01); *G06F 3/038* (2013.01); *G06N 20/00* (2019.01)

(58) Field of Classification Search
CPC ...... G06F 3/03545; G06F 3/011; G06F 3/017; G06F 3/038; G06N 20/00
(Continued)

(56) References Cited

U.S. PATENT DOCUMENTS 4,740,161 A     4/1988  Schwartz et al.
6,289,124 B1 *  9/2001  Okamoto ............... G06K 9/222
                                              382/187

(Continued)

FOREIGN PATENT DOCUMENTS

CN    101576954 A    11/2009
CN    102346859 A     2/2012
(Continued)

OTHER PUBLICATIONS

Wang (J. Wang and F. Chuang, "An Accelerometer-Based Digital Pen With a Trajectory Recognition Algorithm for Handwritten Digit and Gesture Recognition," in IEEE Transactions on Industrial Electronics, vol. 59, No. 7, pp. 2998-3007, Jul. 2012, doi: 10.1109/TIE.2011.2167895 (Year: 2012).*

(Continued)

*Primary Examiner* — Mark Edwards
(74) *Attorney, Agent, or Firm* — Hayes Soloway PC

(57) ABSTRACT

The present invention provides an electronic apparatus and an information processing method that allow a user who uses a writing tool to perform write actions such as writing a letter and drawing a picture to learn and improve skills while being highly motivated and having fun. An electronic apparatus according to an embodiment of the present disclosure includes: a pen-type main body having a writing function or a main body attachable to a writing tool; a detection part provided in the main body for detecting frequency of a writing action of a user; a storage part for storing data including at least any of image data and numeric (Continued)

data; and a control part that performs control to select image data or numeric data from the storage part corresponding to the frequency detected by the detection part and to display an image based on the selected image data or numeric data on a display part.

22 Claims, 48 Drawing Sheets

(51) Int. Cl.
G06F 3/01 (2006.01)
G06F 3/038 (2013.01)
(58) Field of Classification Search
USPC .......................................................... 345/179
See application file for complete search history.

(56) References Cited

U.S. PATENT DOCUMENTS

| | | | |
|---|---|---|---|
| 8,538,156 B2 | 9/2013 | Yamanouchi | |
| 8,571,321 B2 | 10/2013 | Yamanouchi | |
| 9,357,493 B1* | 5/2016 | Butler | G06F 3/0346 |
| 2002/0187833 A1* | 12/2002 | Nishiyama | A63F 13/12 |
| | | | 463/40 |
| 2003/0034463 A1* | 2/2003 | Tullis | G06K 9/228 |
| | | | 250/566 |
| 2004/0189620 A1 | 9/2004 | Roh et al. | |
| 2010/0160041 A1* | 6/2010 | Grant | G06F 3/041 |
| | | | 463/31 |
| 2011/0010876 A1 | 1/2011 | Iwahori et al. | |
| 2011/0025842 A1* | 2/2011 | King | H04N 1/0036 |
| | | | 348/135 |
| 2013/0035890 A1* | 2/2013 | Wang | G06F 3/03 |
| | | | 702/92 |
| 2014/0234809 A1 | 8/2014 | Colvard | |
| 2016/0154484 A1* | 6/2016 | Kampf | G06F 3/03545 |
| | | | 345/179 |
| 2017/0115755 A1* | 4/2017 | Jung | A61B 5/0205 |
| 2018/0067640 A1* | 3/2018 | Jiang | G06F 17/10 |
| 2018/0203947 A1* | 7/2018 | Goyal | G06F 3/017 |

FOREIGN PATENT DOCUMENTS

| | | |
|---|---|---|
| CN | 106155313 A | 11/2016 |
| EP | 3238565 A1 | 1/2017 |
| EP | 3420849 A1 | 1/2019 |
| JP | H01218899 A | 9/1989 |
| JP | 07160853 A | 6/1995 |
| JP | 07248875 A | 9/1995 |
| JP | 10222240 A | 8/1998 |
| JP | 10232595 A | 9/1998 |
| JP | 2002041230 A | 2/2002 |
| JP | 2004061743 A | 2/2004 |
| JP | 2004288188 A | 10/2004 |
| JP | 2004537342 A | 12/2004 |
| JP | 2005062609 A | 3/2005 |
| JP | 2006204853 A | 8/2006 |
| JP | 2006521162 A | 9/2006 |
| JP | 2008134331 A | 6/2008 |
| JP | 2009031614 A | 2/2009 |
| JP | 2009187565 A | 8/2009 |
| JP | 2009240760 A | 10/2009 |
| JP | 2012512724 A | 6/2012 |
| JP | 2013130678 A | 7/2013 |
| JP | 2016510132 A | 4/2016 |
| JP | 2017060661 | 3/2017 |
| JP | 2017060662 | 3/2017 |
| JP | 2018001721 A | 1/2018 |
| WO | 0131570 A2 | 5/2001 |
| WO | 02082359 A1 | 10/2002 |
| WO | 2016104442 A1 | 9/2017 |

OTHER PUBLICATIONS

Office Action, Japanese Patent Application No. 2019-97032, Initiation Date: Jul. 31, 2020. (English Translation).

Egi and Ozawa, "A Method of Detecting Writing Action with Pen Acceleration toward Learner Sensing Systems", IPSJ Interaction, Mar. 15, 2012, pp. 275 to 280, online, pp. 1 to, pp. 14 to 6, and search on Jun. 2015 ; **URL,http://www.interaction, 6 pages.

Miyagawa, et al., "Handwritten Pattern Reproduction Using 3D Inertial Measurement of Handwriting Movement", 2002, vol. 38, No. 1,pp. 1-8, [online], ** Jun. 14, 2016, URL,https://www.jstage.jst.go.jp/article/sicetr1965/38/1/38_1_1/_pdf / - char / en, search on Jun. 2016, and / - char / en, 8 pages.

Office Action, Chinese Patent Application No. 2018800158172, Initiation Date: Feb. 24, 2021. (English Translation).

Search Report, Chinese Patent Application No. 2018800158172, dated Feb. 10, 2021. (English Translation).

* cited by examiner

FIG. 1
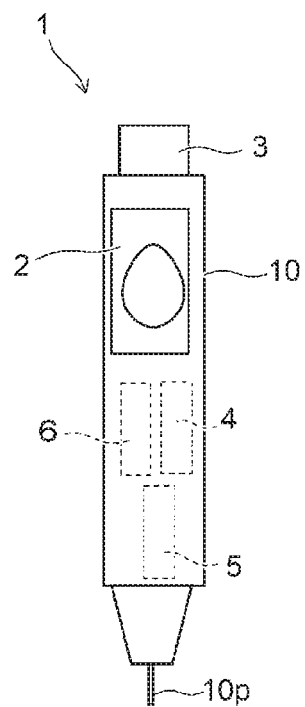
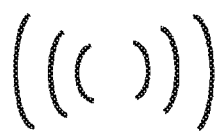
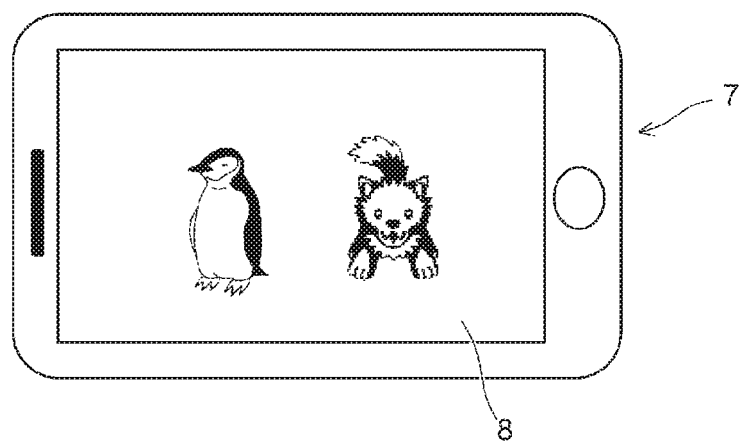

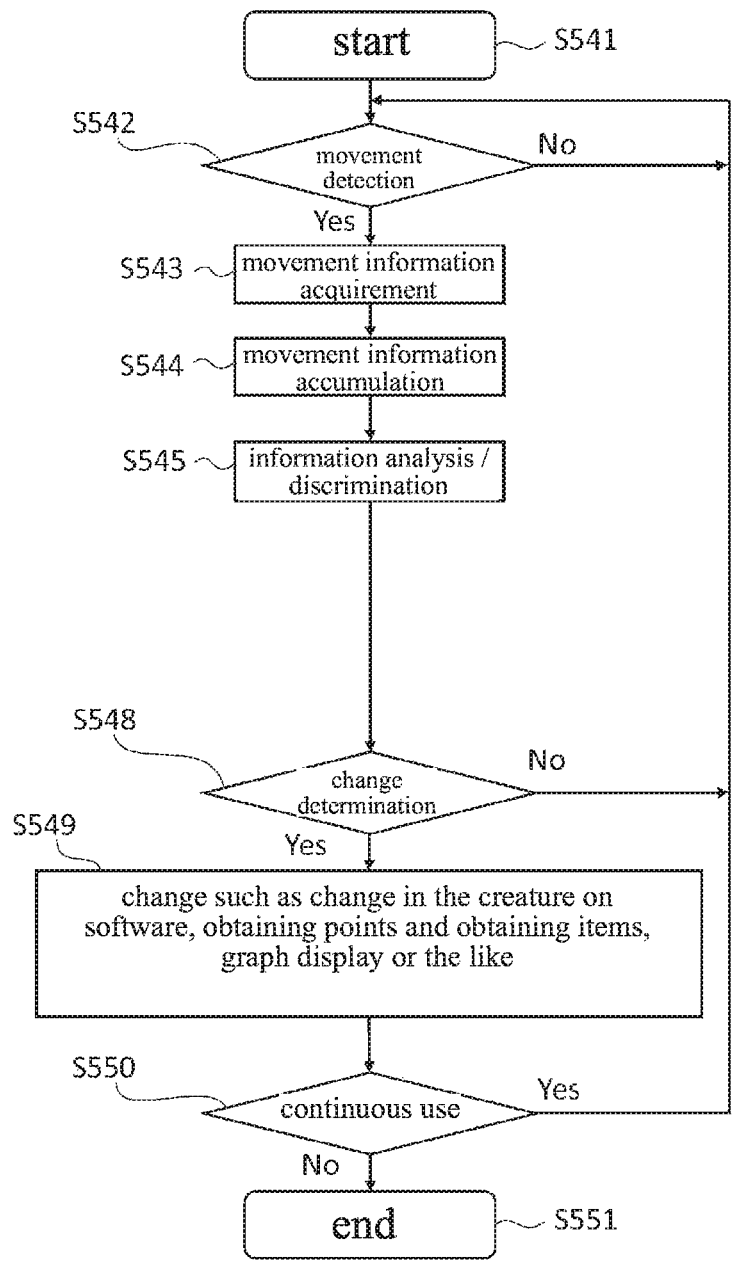

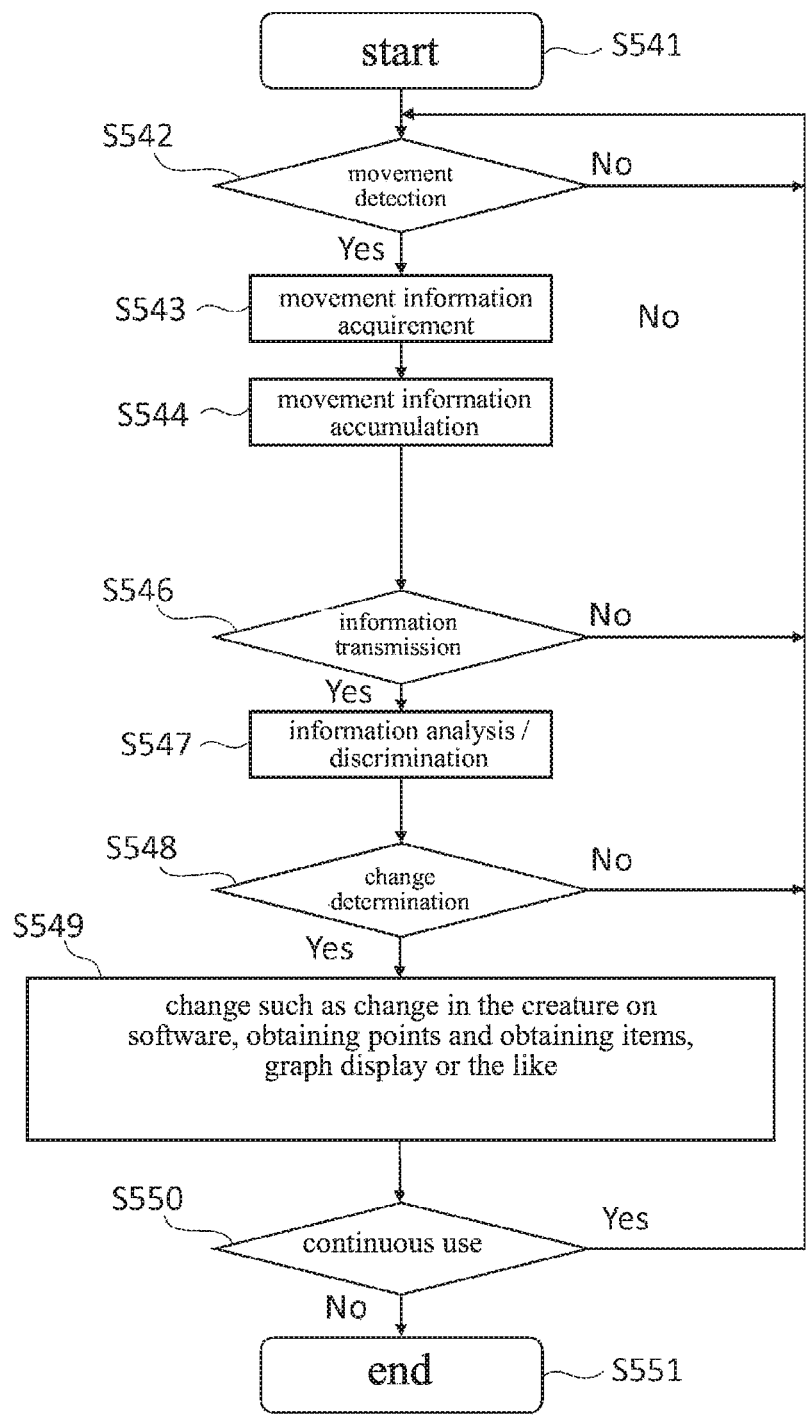

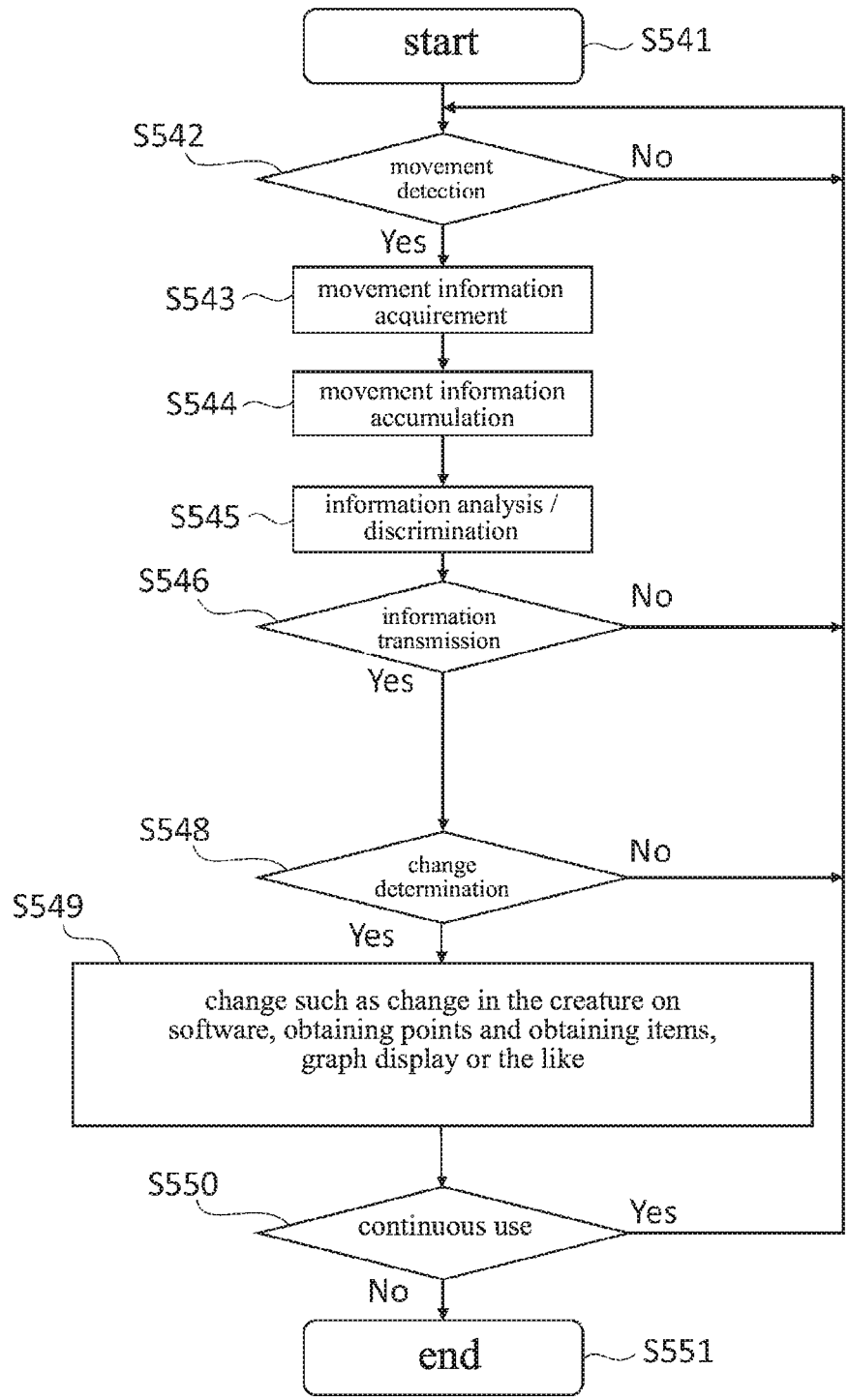

FIG. 16
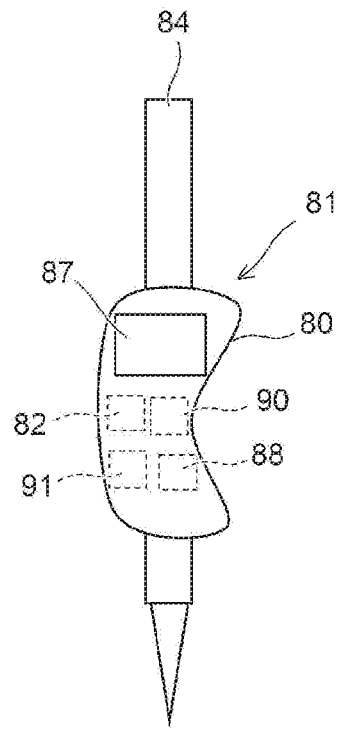
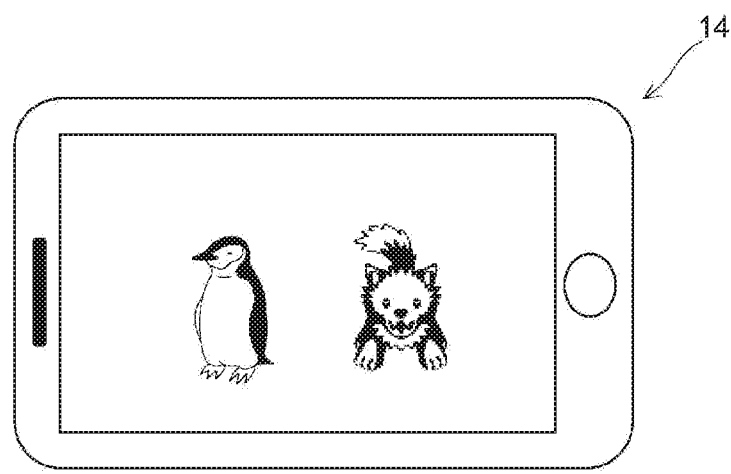

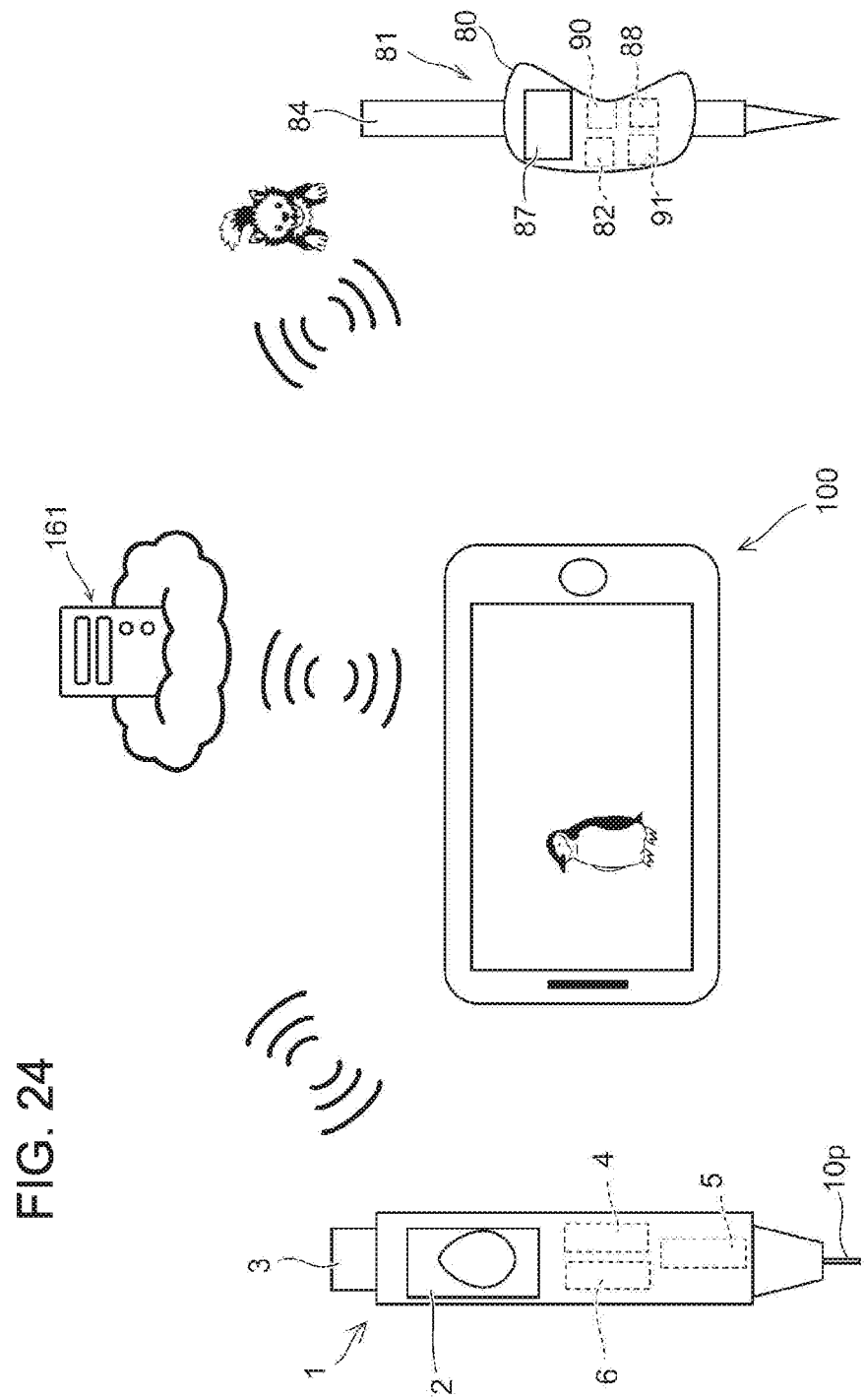

ELECTRONIC DEVICE AND INFORMATION PROCESSING METHOD

CROSS-REFERENCE TO RELATED APPLICATIONS AND PRIORITY

This patent application claims priority from International Patent Application PCT/JP2018/009535 filed Mar. 12, 2018, which claims priority from Japanese Patent Application No. 2017047237 filed Mar. 13, 2017. Each of these patent applications is herein incorporated by reference in its entirety.

TECHNICAL FIELD

The present disclosure relates to an electronic apparatus and an information processing method, and more particularly to an electronic apparatus and an information processing method that changes information such as images on software in response to a writing action such as writing a letter or drawing a picture, and is capable of playing a game.

BACKGROUND

In Patent Documents 1 and 2, a game for growing a virtual creature is disclosed. For example, in the image display device described in Patent Document 1, the growth process of a creature such as an animal or a plant is displayed as an image by an electronic apparatus such as an electronic notebook, an electronic game machine or the like. In addition, in the growth simulation device described in Patent Document 2, a player responds to a call or request from a virtual living body on the screen and performs a corresponding treatment, so that the virtual living body is trained or is made grow.

In Patent Document 3, a technique of detecting the movement of a toy cane and affecting software and the like is disclosed. In Patent Document 4, a technique of reading the movement of a pen and transmitting it to a server.

In Patent Document 5 and 6, a technique of tracking handwriting is disclosed. Specifically, in Patent Document 5, a method including the following stages is disclosed: a stage of transmitting light from a light source moving on a writing implement as an indication of the position and path of the writing implement on the two-dimensional writing surface; a stage of detecting the light by two or more sensors and generating a sequence of signals representing the detected light; and a stage of applying a technique of improving the reading stability of less than a pixel. In addition, in patent document 6, an electronic correction system is disclosed, which has: means for extracting and analyzing body motion information from writing information by an electronic pen; answer status obtained by the analysis means; answer result input by the electronic pen; and display means capable of displaying at least correct answer information for the question.

In Patent Document 7, a handwriting input device is disclosed. That is, in the handwriting input device disclosed in Patent Document 7, when written by the input pen, the handwriting is detected in real time and displayed on the TV as shown in the drawing.

In Patent Document 8, a handwritten letter input game device capable of advancing a game by inputting a handwritten letter is disclosed. This device is composed of: means for displaying a letter as a model; means for inputting a handwritten letter by pen input and displaying the contents simultaneously; means for recognizing stroke of the handwritten letter; means for determining stroke of the input letter; means for storing learning difficulty and models; and progressing means for displaying the result and a model of the next difficulty level on the display means according to the determined result.

In patent document 9, a portable handwritten letter input device is disclosed. In this device, the handwritten letter is stored in a memory as read video data by a camera, and the stored video data is transmitted to an external apparatus by infrared ray.

In Patent Document 10, a controller relative to an interactive painting game is disclosed. This controller includes: a sensor configured to track the position information of the controller in three-dimensional space and send a sensor signal representing the position information to the computer; and an actuator configured to output a haptic effect to a user upon receiving a control signal from a processor connected to the controller.

Further, in Patent Documents 11 to 14, a device for detecting the movement of a toothbrush and performing assistance regarding tooth brushing is disclosed.

PRIOR ART REFERENCE

Patent Documents

Patent Document 1: Japanese Patent Application Laid-Open Hei No. 7-160853
Patent Document 2: Japanese Patent Application Laid-Open Hei No. 10-232595
Patent Document 3: Japanese Unexamined Patent Application Publication (Translation of PCT Application) No. 2006-521162
Patent Document 4: Japanese Unexamined Patent Application Publication (Translation of PCT Application) No. 2004-537342
Patent Document 5: Japanese Patent Application Laid-Open No. 2009-187565
Patent Document 6: Japanese Patent Application Laid-Open No. 2009-031614
Patent Document 7: Japanese Patent Application Laid-Open Hei No. 7-248875
Patent Document 8: Japanese Patent Application Laid-Open No. 2006-204853
Patent Document 9: Japanese Patent Application Laid-Open No. 2002-041230
Patent Document 10: Japanese Unexamined Patent Application Publication (Translation of PCT Application) No. 2012-512724
Patent Document 11: International Publication WO2016/104442
Patent Document 12: Japanese Patent Application Laid-Open No. 2017-060661
Patent Document 13: Japanese Patent Application Laid-Open No. 2017-060662
Patent Document 14: Japanese Patent Application Laid-Open No. 2009-240760

SUMMARY OF THE INVENTION

Problems to be Solved by the Invention

When studying or drawing, writing tools such as pencils, mechanical pencils, and ballpoint pens are used. When using such writing tools to improve knowledge acquisition and skills, it is important to increase motivation.

Here, as the techniques describe in Patent Document 1 and Patent Document 2, there are so-called caring games of raising animals, virtual creatures and pets, etc. on software in a smart phone, a personal computer, a game machine or the like, to enjoy getting virtual creatures back from eggs, growing and evolving the virtual creatures. Further, in the techniques described in Patent Document 3 and Patent Document 4, the movement of the electronic apparatus is read. However, they are specialized for a game property of raising a virtual creature, and do not have a connection with a useful action such as writing a letter and drawing a picture. For this reason, the effect of enhancing the practice of letters and motivation of study cannot be expected.

In addition, with the handwriting tracking described in Patent Documents 5 and 6, the handwriting input device described in Patent Document 7, and the handwritten letter input device described in Patent Document 9, although the handwriting can be tracked, it is not combined to the effect of enhancing the practice of letter and the motivation of study.

Moreover, in the letter input game device described in Patent Document 8, the stroke of the input letter is determined by inputting a letter as a model, but only the determination for the fixed model is performed. Further, the controller related to the interactive painting game described in Patent Document 10 outputs a haptic effect to the user. In addition, the devices described in Patent Documents 11 to 14 perform assistance related to tooth brushing. With these technologies, it is not possible to sufficiently combine various writing actions such as writing a letter and drawing a picture with the effect of enhancing motivation of study such as improvement of learning and skills.

An object of the present invention is to provide an electronic apparatus and an information processing method that allow a user who uses a writing tool to perform write actions such as writing a letter and drawing a picture to learn and improve skills while being highly motivated and having fun.

Means for Solving the Problems

In order to solve the above problems, an electronic apparatus according to an embodiment of the present invention includes: a pen-type main body having a writing function or a main body attachable to a writing tool; a detection part provided in the main body for detecting frequency of a writing action of a user; a storage part for storing data including at least any of image data and numeric data; and a control part that performs control to select data from the storage part corresponding to the frequency detected by the detection part and display an image based on the selected data on a display part. Here, at least any of the storage part, the display part and the control part may be provided in the main body of the electronic apparatus or an external apparatus (such as a mobile terminal).

According to such a configuration, an image is displayed on the display part corresponding to the frequency of the writing action by the writing tool. That is, the image displayed on the display part changes depending on the frequency based on the writing action such as a letter or a drawing.

An electronic apparatus according to another aspect of the present disclosure includes: a panel part having a detection part for detecting handwriting; a storage part for storing data having at least any of image data and numeric data; and a control part that performs control to select data from the storage part corresponding to the frequency of the writing based on the handwriting detected by the detection part and to display an image based on the selected data on a display part.

According to such a configuration, handwriting is detected by the detection part provided in the panel part, and an image is displayed on a display part corresponding to the frequency of writing based on the detected handwriting. In other words, the image displayed on the display part changes depending on the frequency of writing based on the handwriting such as a letter written on the panel part or a drawing.

An information processing method according to another aspect of the present disclosure is an information processing method by an electronic apparatus which comprises a sensor for detecting actions of a user; and a control part for performing control to change an image displayed on a display part based on information detected by the sensor, In this information processing method, the control part includes: a step of detecting a writing action among the actions of the user from information acquired by the sensor; a step of obtaining the frequency of the writing action from the detected writing action; and a step of selecting an image displayed on the display part corresponding to the frequency.

According to such a configuration, a writing action is detected among the actions of the user, and an image is displayed on the display part corresponding to the frequency based on the detected writing action. That is, the image displayed on the display part changes depending on the frequency based on the writing action such as a letter written by the user or a drawing.

An information processing method according to another aspect of the present disclosure includes steps of: detecting a writing action by a sensor when a user uses an electronic apparatus including a sensor for detecting the writing action; obtaining a frequency of the writing action from the writing action detected by the sensor; and performing, with a server via a network, at least any of granting the point associated with the user and exchanging with an equivalent value corresponding to the point.

According to such a configuration, the writing action is detected among the actions of a user, and the point corresponding to the frequency based on the detected writing action is granted. And, it becomes possible to perform exchange with the desired equivalent value using this point.

Effects

According to the present disclosure, it is possible to provide an electronic apparatus and an information processing method that allow a user who performs write actions such as writing a letter and drawing a picture by using a writing tool to learn and improve skills while being highly motivated and having fun.

BRIEF DESCRIPTION OF THE DRAWINGS

FIG. 1 is a schematic view illustrating an electronic apparatus according to a first embodiment.

FIG. 5 is a flowchart showing one detailed example of the information processing method according to the present embodiment.

FIG. 6 is a flowchart showing one detailed example of the information processing method according to the present embodiment.

FIG. 7 is a flowchart showing one detailed example of the information processing method according to the present embodiment.

FIG. 16 is a schematic view showing another configuration example of the second embodiment.

FIG. 24 is a schematic view for explaining an example in which an electronic apparatus of different form is used.

DETAILED DESCRIPTION

Figure 2:
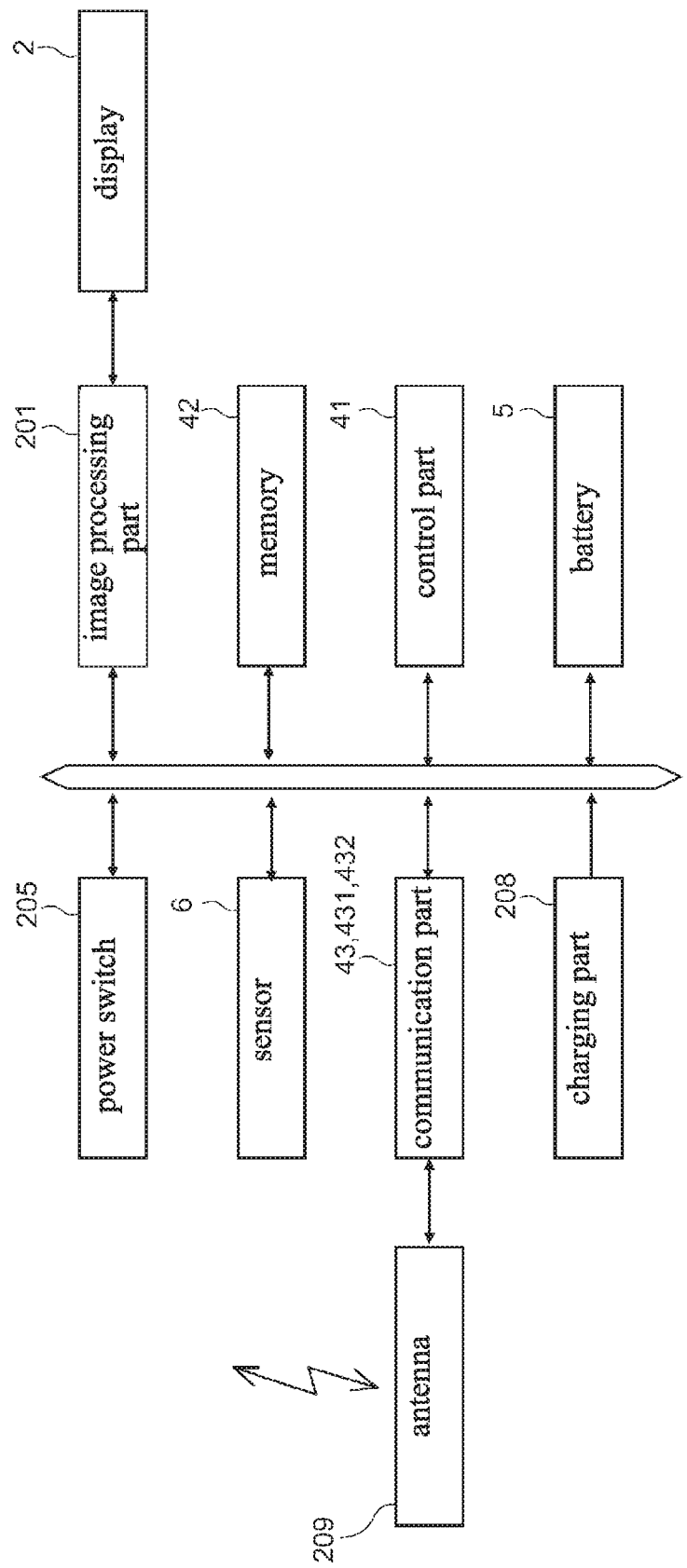
FIG. 2 is a block diagram illustrating the electronic apparatus according to the first embodiment.

Hereinafter, the embodiments of the present disclosure will be described based on the drawings. It should be noted that, in the following description, the same members are denoted by the same reference numerals, the member once explained will be omitted as appropriate.

First Embodiment

FIG. 1 is a schematic view illustrating an electronic apparatus according to a first embodiment.

FIG. 2 is a block diagram illustrating the electronic apparatus according to the first embodiment.

The electronic apparatus according to the present embodiment is a pen-type electronic apparatus 1 such as a mechanical pencil or a ballpoint pen. The pen-type electronic apparatus 1 includes a main body 10 having a writing function. The main body 10 is provided with a display (display part) 2, an information processing part 4, a battery 5 and a sensor 6.

One end of the main body 10 is provided with a pen tip 10p, and a user can hold the main body 10 and write a letter or draw a picture with the pen tip 10p. The other end of the main body 10 may be provided with a knock part 3. That is, the pen tip 10p may be projected by pushing in the knock part 3.

The display 2 is a display part using liquid crystal, organic EL, or the like. The display 2 is disposed, for example, near the other end of the main body 10 (a position that is not hidden when the main body 10 is held by hand). A predetermined image, letter information, or the like is displayed on the display 2.

The information processing part 4 includes a control part 41, a memory 42, and a communication part 43. These may be configured by one chip or may be configured by separate chips. The control part 41 is, for example, a CPU, and controls each part by a program executed hereinafter. The memory 42 includes a ROM and a RAM. The memory 42 stores a program executed by the control part, data to be displayed on the display 2 (at least any of image data and numeric data), and the like.

The communication part 43 is a part that performs input and output of information with an external apparatus (for example, mobile terminal 7). The communication part 43 includes a transmission part 431 for transmitting information to the outside and a reception part 432 for receiving the information sent from the outside. As the external apparatus, in addition to the mobile terminal 7, for example, a smartphone, a tablet type terminal, a game machine, a special purpose terminal, and a personal computer and the like are given. The communication part 43 is, for example, wireless communication means (communication means using radio waves or light). As the wireless communication means, Bluetooth (registered trademark), Wi-Fi (registered trademark), infrared communication means, and telephone line are given. The battery 5 is, for example, a storage battery, and is a supply source of electric power for driving each part.

The sensor 6 is a part that detects the movement of the main body 10. As the sensor 6, an acceleration sensor, a tilt sensor, a rotational track sensor, a gravitational acceleration sensor, a gyro sensor, an inertial sensor, and a pressure sensor can be given. Further, the sensor 6 may include means for detecting the operation of the knock part 3.

In the present embodiment, the frequency of the writing action of the user is detected by the sensor 6. Here, the frequency of the writing action is at least any of the values indicating the writing frequency by the pen-type electronic apparatus 1, the number of times of writing, the writing amount, the carefulness of the letter, the writing speed, the writing acceleration, the angle of the main body 10, and the pressure at the time of writing. In addition, the sensor 6 may detect a value based on the way of using and moving the pen-type electronic apparatus 1. These frequencies may be output values themselves from the sensor 6 or values obtained by calculation from the output values. The calculation for obtaining the frequency of the writing action may be performed by the sensor 6, or may be performed by the control unit 41 or other parts.

For example, as the writing action, when the acceleration of the acceleration sensor exceeds a certain value, it is determined as "Start", and when the acceleration of the acceleration sensor is equal to or less than a certain value and this continues for a certain time or longer, it is determined as "End". When the Start and End occur, the writing frequency is counted as one time, and the number of times the Start and End has occurred becomes the writing frequency.

The number of times of writing is counted when the acceleration sensor, the tilt sensor, and the rotation sensor have sensed a change, respectively. The writing amount is counted according to how long the change detected by the sensor has occurred continuously.

The method of determining the carefulness of the letter is, for example, by the fact that the period of change is uniform and that movements such as jump and stop occur regularly. The use method is determined by, for example, the fact that if a picture is drawn, a changed in acceleration occurs relatively, or the fact that if a Kanji letter is drawn, the change in acceleration occurs continuously in a short period and repeatedly at an angle close to 0°/90°.

The way of movement is detected by, for example, a change in acceleration, a change in tilt, a change in rotation direction, and the like. Further, by measuring the time until these changes at any time, information such as the distance, direction, period, interval, rotation, tilt, etc. of the pen tip 10p can be obtained. By detecting at least one of these pieces of information, the way of movement of the pen tip 10p can be detected.

The frequency of the writing action of the user detected by the sensor 6 may be stored in the memory 42, may be stored in the mobile terminal 7, or may be stored in a server via a network. In the present embodiment, the control part 41 performs control to select data (at least any of image data and numeric data) from the memory 42 in response to the frequency of the writing action of the user detected by the sensor 6 and display an image based on the selected data on the display 2.

Further, the control part 41 may transmit information of the frequency of the writing action to the mobile terminal 7 via the communication part 43. In the mobile terminal 7, application software is activated, and when information sent from the pen-type electronic apparatus 1 by wireless communication or the like is received, image data or the like corresponding to the information is selected and displayed on the display 8. In this case, the image data or the like may be stored in the mobile terminal 7, or may be download from a server via a network (for example, Internet).

In addition to the above configuration, the pen-type electronic apparatus 1 of this embodiment includes a power switch 205, an image processing part 201, a charging part 208 and an antenna 209 shown in FIG. 2. The power source of the pen-type electronic apparatus 1 is turned on/off by the power switch 205. The image processing part 201 processes and sends the image data read from the memory 42 according the instruction of the control part 41 to the display 2. The charging part 208 has a circuit or a cable connection terminal for charging the battery 5. The antenna 209 is connected to the communication part 43 and transmits/receives information to/from the external apparatus.

(Information Processing Method)

Figure 3:
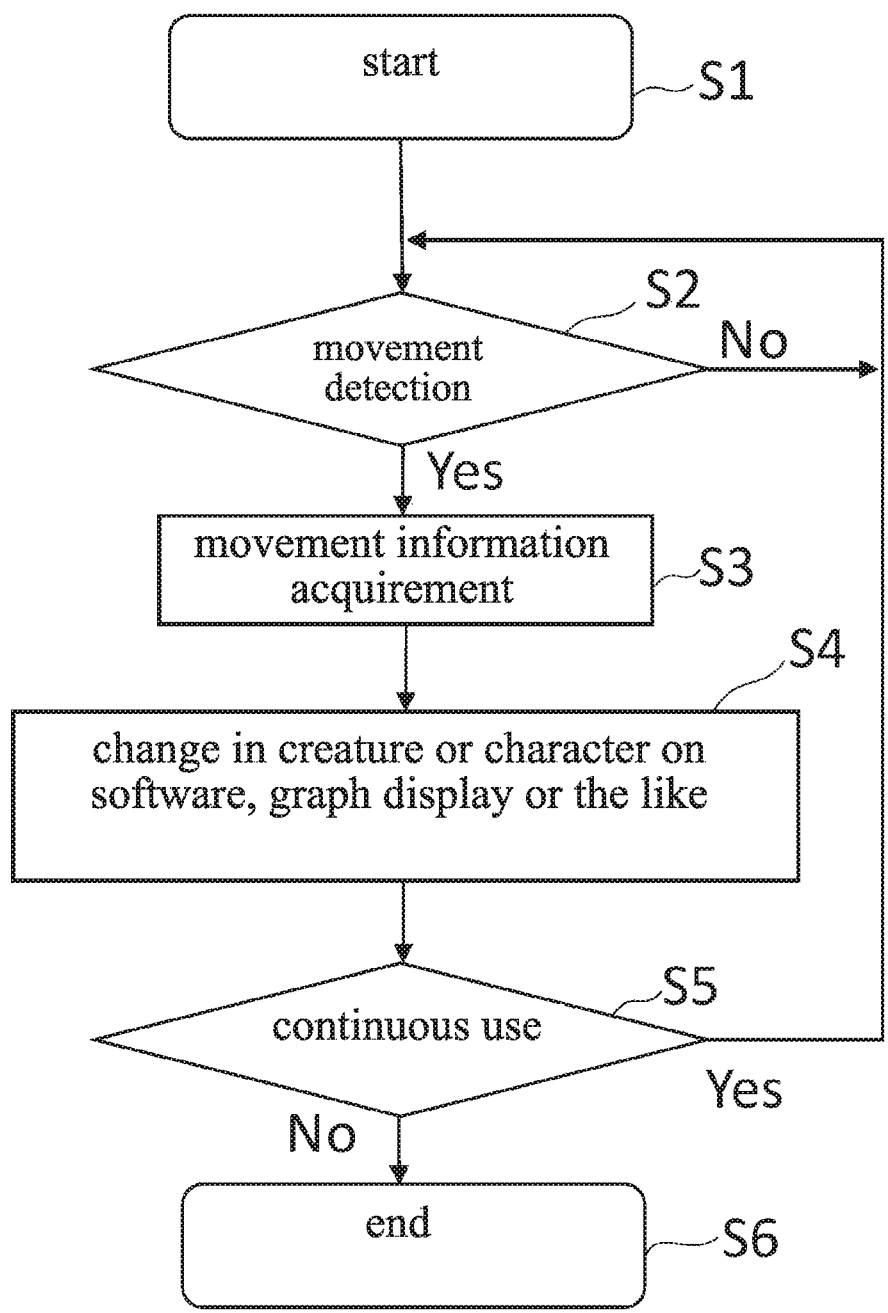
FIG. 3 is a flowchart showing an outline of an information processing method according to the present embodiment.

FIG. 3 is a flowchart showing an outline of an information processing method according to the present embodiment.

It is to be noted that although the information processing method using the pen-type electronic apparatus 1 is illustrated here, the same information processing method can be also applied to other types of electronic apparatus.

First, when the action of pen-type electronic apparatus 1 is started (step S1), it is determined whether or not a movement is detected by the sensor 6 (step S2). When a movement is detected, information of the movement is acquired based on the movement detected by the sensor 6 (step S3). The movement information includes the frequency of the writing action.

Next, the control part 41 selects data (at least any of image data and numeric data data) corresponding to the frequency of the writing action. In this embodiment, as an example, an image of a creature or character (hereinafter also simply referred to as "character or the like") on the software is changed (step S4). Specifically, the control part 41 selects image data of the character or the like on the software from the memory 42 corresponding to the frequency of the writing action and display an image based on the image data on the display 2. For example, as the frequency of the writing action increases, an image of a more mature character or the like is displayed. Thereby, it is possible to obtain an image display in which a character or the like grows along with the writing action. Further, the control part 41 may acquire numeric data corresponding to the frequency of the writing action from the memory 42 or the like, graph the numeric data and display it on the display 2.

Next, it is determined whether or not the pen-type electronic apparatus 1 is used continuously (step S5). If the pen-type electronic apparatus 1 is continuously used, the action returns to step S2 to repeat the subsequent processing. If the pen-type electronic apparatus 1 is not continuously used, the action is terminated (step S6).

By such action, it is possible to perform an image display or a graph display that makes some sort of change in which, for example, a character is born from an egg, grows, becomes stronger, lives longer, changes personality, changes nature, evolves, and so on, based on information regarding the use and movement of the pen-type electronic apparatus 1.

Here, a detailed example of the information processing method according to the present embodiment will be described.

Figure 4:
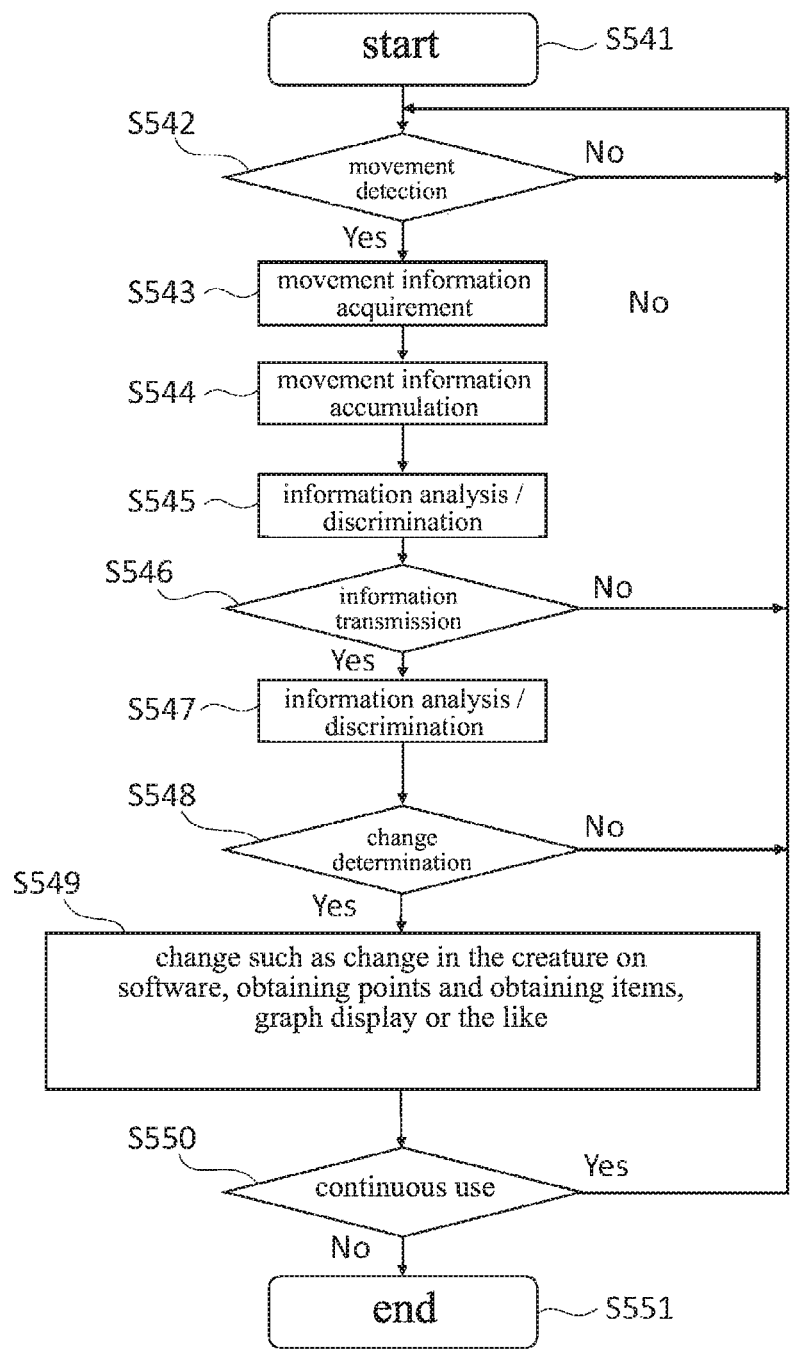
FIG. 4 is a flowchart showing one detailed example of the information processing method according to the present embodiment.

FIG. 4 is a flowchart showing one detailed example of the information processing method according to the present embodiment.

In the (first) detailed example of the information processing method shown in FIG. 4, first, when the operation of the pen-type electronic apparatus 1 is started (step S541), it is determined whether or not a movement is detected by the sensor 6 (step S542). When a movement is detected, movement information is acquired based on the movement detected by the sensor 6 (step S543), and the acquired movement information is accumulated (step S544). The movement information may be accumulated in the memory 42 in the pen-type electronic apparatus 1 or may be accumulated in an external apparatus (such as the mobile terminal 7 or a server) via a network.

Next, based on the accumulated information, movement analysis and discrimination are performed by the information processing part 4 (step S545). This discrimination includes discriminating a mark sheet, a language other than Japanese such as English, whether it is a careful letter, a learning subject, or the like from the analyzed writing action.

Next, it is determined whether or not to transmit the information (step S546). When transmitting the information, a processing of transmitting the information (movement information or discriminated information) from the pen-type electronic apparatus 1 to the mobile terminal 7 or a processing of transmitting the information from the mobile terminal 7 to the server via the network is performed.

Next, movement analysis and discrimination are performed by the apparatus that has received the information (such as the mobile terminal 7 or the server) (step S547). In the apparatus that has received the information, as in step S545, a mark sheet, a language other than Japanese such as English, whether it is a careful letter, a learning subject, or the like may be discriminated from the analyzed writing action. In addition, in the apparatus that has received the information, the analysis and discrimination of the movement of the pen may be performed by an algorithm different from that of the pen-type electronic apparatus 1.

Next, based on this discriminated information, it is determined whether or not to change the image or the like (step S548). That is, when the discriminated information satisfies the condition for changing the image or the like, it is determined that the image or the like is to be changed.

Next, the control part 41 performs a processing corresponding to the determination of change (step S549). For example, a processing of changing an image of a character or the like on software, obtaining points as numeric data, obtaining items, or displaying a graph is performed. Thereby, an image display in which a character or the like grows along with the writing action is performed, a point increases with the writing action, or an item can be obtained.

Next, it is determined whether or not the pen-type electronic apparatus 1 is used continuously (step S550). If the pen-type electronic apparatus 1 is continuously used, the action returns to step S542 to repeat the subsequent processing. If pen-type electronic apparatus 1 is not continuously used, the action is terminated (step S6).

FIG. 5 is a flowchart showing a (second) detailed example of the information processing method according to the present embodiment.

In the (second) detailed example of the information processing method shown in FIG. 5, the information transmission (step S546) and the information analysis/determination (step S547) in the (first) detailed example of the information processing method shown in FIG. 4 are omitted. That is, the processing of the (second) detailed example includes: start of the action of the pen-type electronic apparatus 1 (step S541), movement detection (step S542), movement information acquisition (step S543), movement information accumulation (step S544), information analysis/discrimination (step S545), change determination (step S548), processing corresponding to change determination (step S549), continuation determination (step S550), and processing end (step S551).

FIG. 6 is a flowchart showing a (second) detailed example of the information processing method according to the present embodiment.

In the (third) detailed example of the information processing method shown in FIG. 6, the information analysis/determination (step S545) in the (first) detailed example of the information processing method shown in FIG. 4 is omitted. Specifically, the processing of the (third) detailed example includes: start of the action of the pen-type electronic apparatus 1 (step S541), movement detection (step S542), movement information acquisition (step S543), movement information accumulation (step S544), information transmission (step S546), information analysis/discrimination (step S547), change determination (step S548), processing corresponding to change determination (step S549), continuation determination (step S550), and processing end (step S551).

FIG. 7 is a flowchart showing a (second) detailed example of the information processing method according to the present embodiment.

In the (fourth) detailed example of the information processing method shown in FIG. 7, the information analysis/determination (step S547) in the (first) detailed example of the information processing method shown in FIG. 4 is omitted. Specifically, the processing of the (fourth) detailed example includes: start of the action of the pen-type electronic apparatus 1 (step S541), movement detection (step S542), movement information acquisition (step S543), movement information accumulation (step S544), information analysis/discrimination (step S545), information transmission (step S546), change determination (step S548), processing corresponding to change determination (step S549), continuation determination (step S550), and processing end (step S551).

(Other Configuration Examples of the First Embodiment)

Figure 8A:
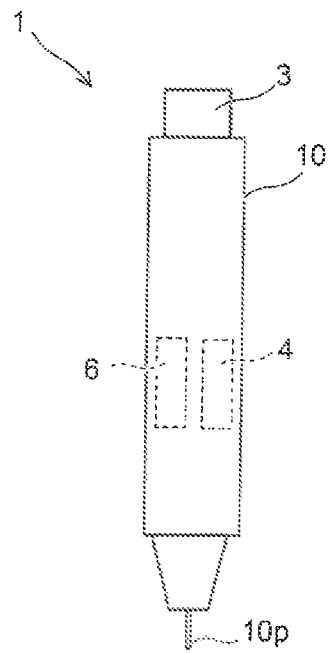
FIG. 8(a) and FIG. 8(b) are schematic views showing another configuration example of the first embodiment.
Figure 8B:
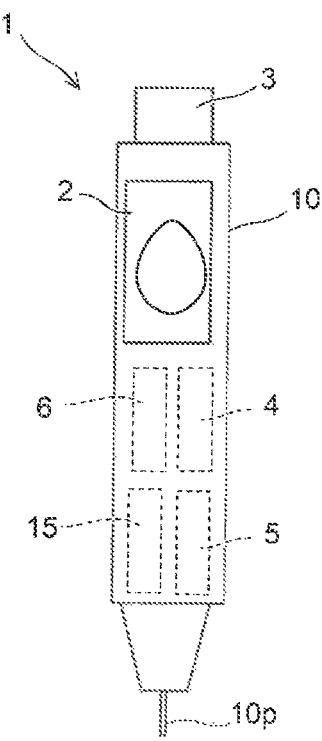
Figure 9:
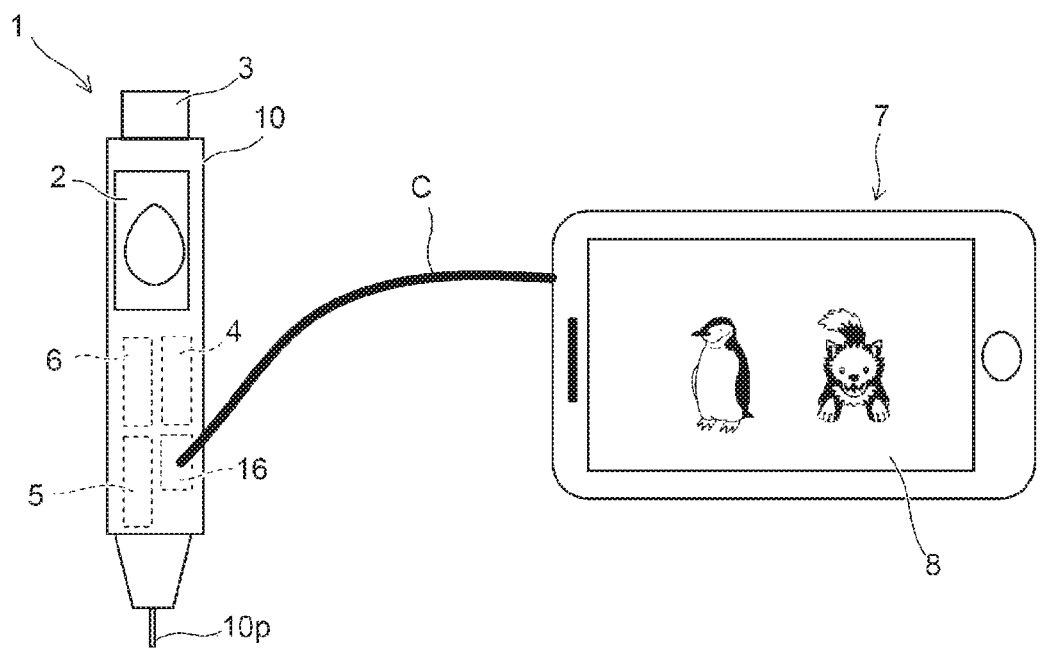
FIG. 9 is a schematic view showing another configuration example of the first embodiment.

FIG. 8 and FIG. 9 are schematic views showing other configuration examples of the first embodiment.

The pen-type electronic apparatus 1 shown in FIG. 8 (*a*) is an example in which a main body 10 is provided with a sensor 6 and an information processing part 4. Specifically, in the pen-type electronic apparatus 1 shown in FIG. 8 (*a*), the display 2 as shown in FIG. 1 is not provided. Even if the main body 10 of the pen-type electronic apparatus 1 is not provided with the display 2, an image may be displayed on a display part of an external apparatus such as the mobile terminal 7. Since the display 2 is not provided in the pen-type electronic apparatus 1, weight reduction and cost reduction can be achieved.

The pen-type electronic apparatus 1 shown in FIG. 8 (*b*) includes a power supplying part 15 for charging the battery 5. As the power supplying part 15, a USB connector or a wireless power supplying part is used. If the USB connector is used, power is supplied by wire, and if the wireless power supplying part is used, non-contact power supply is possible.

The pen-type electronic apparatus 1 shown in FIG. 9 includes an interface part 16 for connecting to an external apparatus (for example, the mobile terminal 7) by a cable C. Specifically, the pen-type electronic apparatus 1 shown in FIG. 9 performs input/output of information with the external apparatus via the cable C. Therefore, the pen-type electronic apparatus 1 shown in FIG. 9 may or may not include wireless communication means. It is to be noted that the interface part 16 may also serve as the power supplying part 15 for charging the battery 5.

Figure 10:
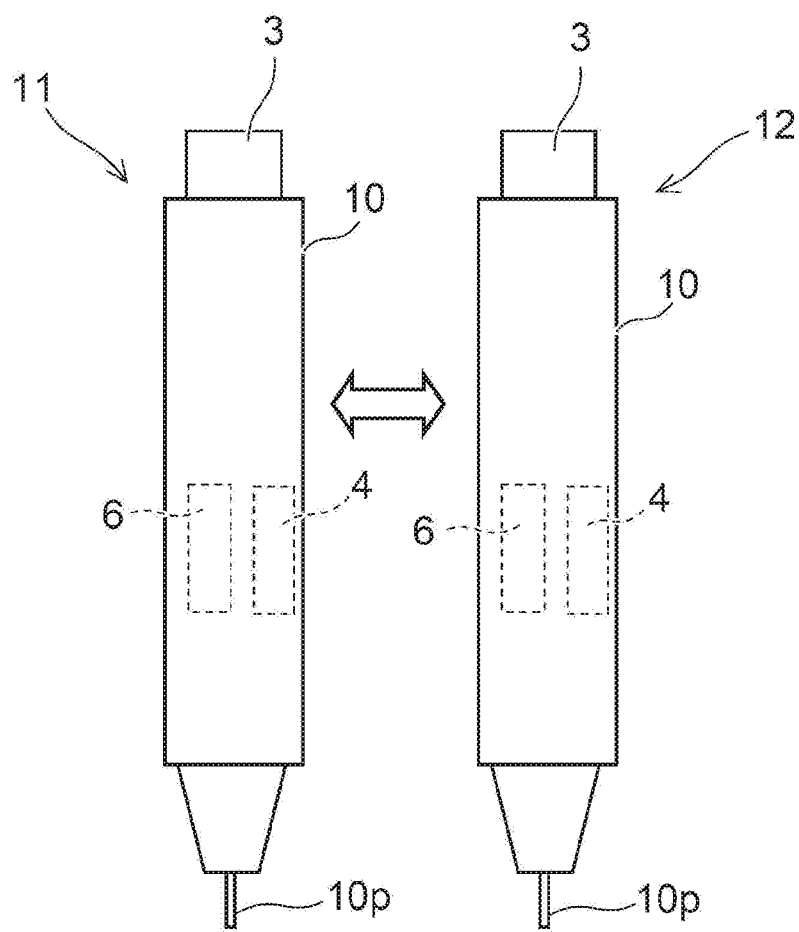
FIG. 10 is a schematic view illustrating an example in which a plurality of pen-type electronic apparatus are used.

FIG. 10 is a schematic view illustrating an example in which a plurality of pen-type electronic apparatus are used.

As shown in FIG. 10, when the sensor 6 detects an action other than the writing action such as bringing the first pen-type electronic apparatus 11 and the second pen-type electronic apparatus 12 close to a predetermined distance or bringing them into contact with each other, characters and the like approach (contact) with each other on the software, and a specific action occurs.

For example, when the first pen-type electronic apparatus 11 and the second pen-type electronic apparatus 12 are brought into contact with each other and the acceleration of the contact is detected by the sensor 6, an image in which eggs or children of the characters and the like are born is displayed on the software. After the eggs or children are born, a change in the image in which the eggs hatch or the characters grow greatly from the children is caused by a writing action using the respective pen-type electronic apparatus 11 and 12.

Further, an image in which a single character or the like is generated on one or both of the first pen-type electronic apparatus 11 and the second pen-type electronic apparatus 12 may be displayed by approaching or contacting the first pen-type electronic apparatus 11 and the second pen-type electronic apparatus 12.

Further, the information of one apparatus may be transferred to the other apparatus by the approach or contact of the first pen-type electronic apparatus 11 and the second pen-type electronic apparatus 12.

Figure 11:
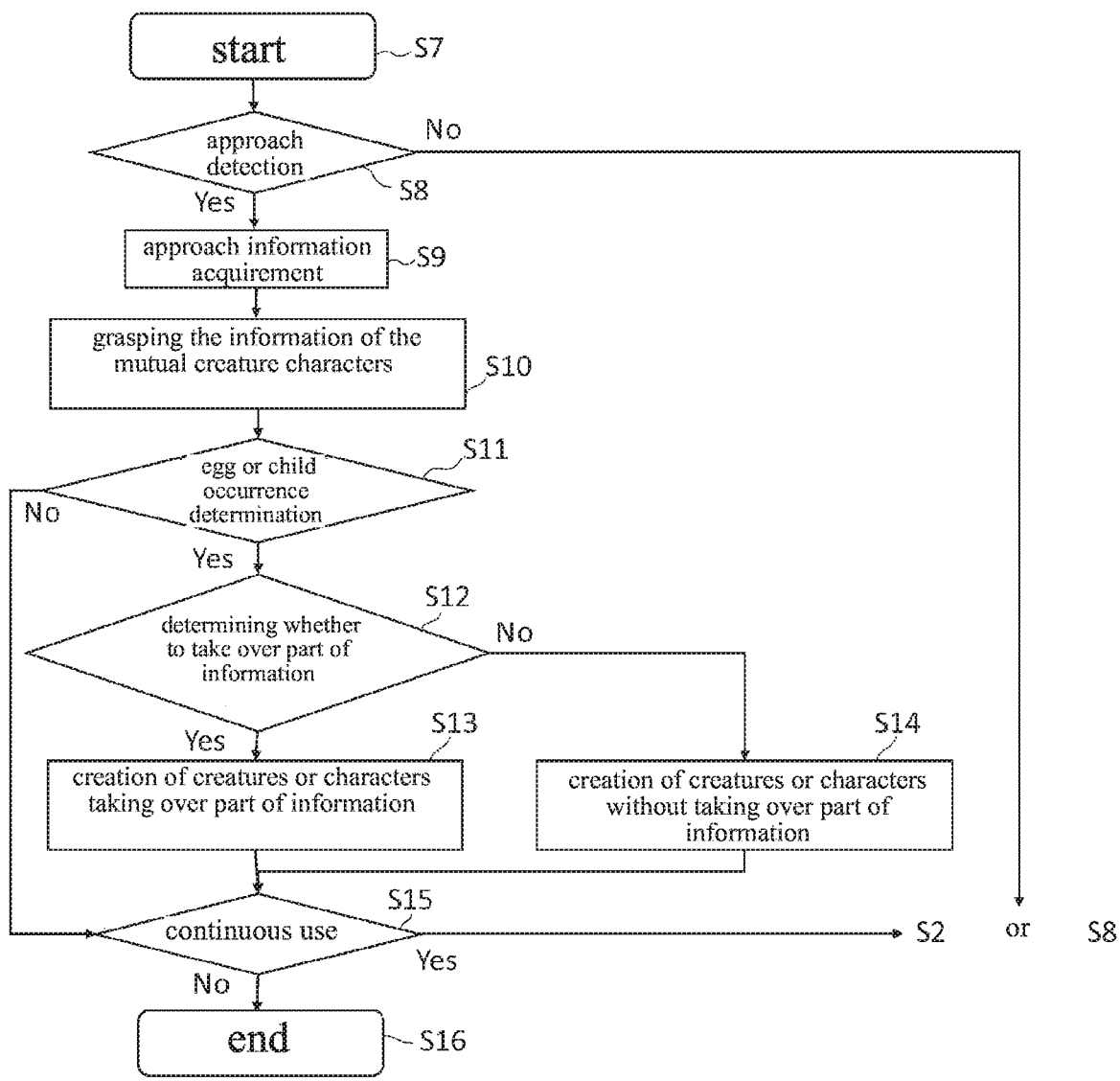
FIG. 11 is a flowchart showing an example of processing when two pen-type electronic apparatus are approaching.

FIG. 11 is a flowchart showing an example of processing when two pen-type electronic apparatus are approaching. It is to be noted that the processing shown in this flowchart is a program processing of one of the two pen-type electronic apparatus. In addition, the term "approach" shall include contact in this processing.

First, by the control part 41 of one pen-type electronic apparatus, whether or not the other pen-type electronic apparatus has approached is detected (step S8). When the approach is detected, the control part 41 acquires information of the other pen-type electronic apparatus that has approached (step S9).

Next, the control part 41 grasps the information of the mutual characters or the like of the two pen-type electronic apparatus which approached (step S10). Next, the control part 41 determines the generation of eggs or children based on the information of the mutual characters or the like (step S11). If no egg or child is generated in the characters or the like, it proceeds to step S15. On the other hand, when it is determined that eggs or children are generated from the mutual characters or the like, the control part 41 determines whether or not a part of the information is taken over (step S12). The taking over of a part of the information refers to, for example, taking over a part of individuality of a parent character or the like when an egg or a child is born from the character or the like.

When a part of the information is taken over, image data of the new character or the like (egg or child) that has taken over a part of the information is created (or selected) and displayed on the display 2 (step S13). On the other hand, if a part of the information is not taken over, image data of the new character or the like (egg or child) that does not take over a part of the information is generated (or selected) and displayed on the display 2 (step S14).

Next, it is determined whether or not the pen-type electronic apparatus 1 is used continuously (step S15). If the pen-type electronic apparatus 1 is continuously used, the action returns to step S2 to repeat the subsequent processing. If the pen-type electronic apparatus 1 is not continuously used, the action is terminated (step S16).

By such processing, in the case where the two pen-type electronic apparatus 11 and 12 approached each other, an image is displayed on the display 2 or the display part of the external apparatus, wherein in the image an egg or child as the character or the like is born or a child character or the like that has taken over a part of the personality of nature of the parent character or the like is born. Thereby, it becomes possible to grow such a born egg or child as the character or the like on software.

Further, it is possible to play a game using a character or the like on software, or to fight other creature, character or the like. Further, creatures, characters or the like raised by other people may be caused to fight each other via a communication function or the Internet, or a battle game may be enjoyed.

Further, as another example, the connection between the first pen-type electronic apparatus 11 and the second pen-type electronic apparatus 12 can be established by the approach or contact between them. It is also possible to take over information of the established connection with software and share various information based on the connection, for example, send messages to each other (encouraging messages, etc.), move characters back and forth, share study time and graphs.

Figure 12:
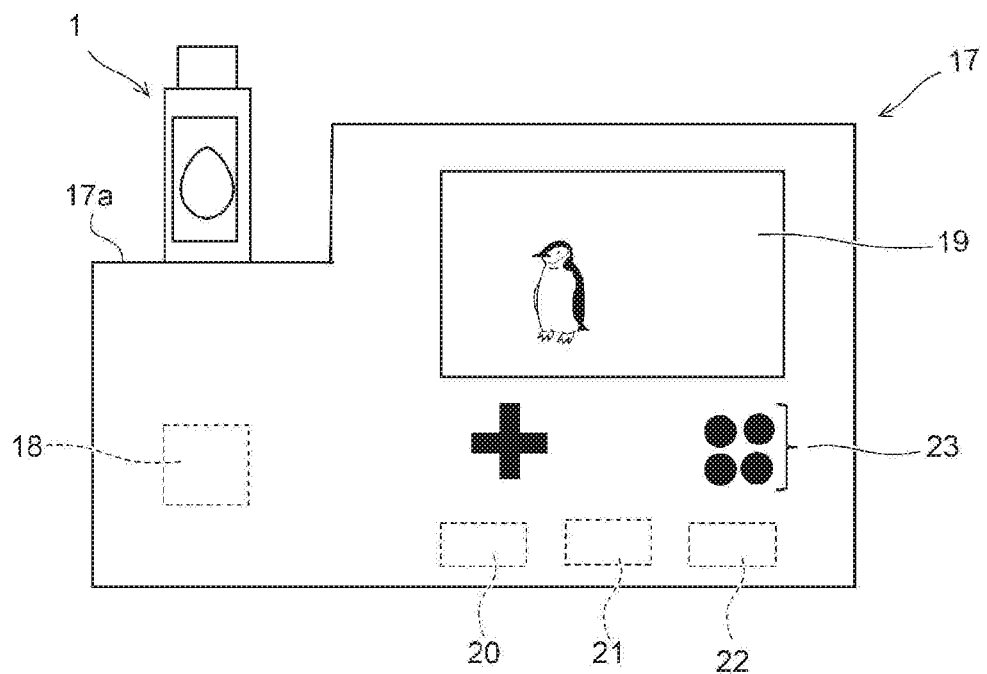
FIG. 12 is a schematic view illustrating an auxiliary apparatus.

FIG. 12 is a schematic view illustrating an auxiliary apparatus.

As shown in FIG. 12, the pen-type electronic apparatus 1 according to the present embodiment may be used by being connected to a dedicated auxiliary apparatus 17.

The auxiliary apparatus 17 includes a charging terminal 18 and a display 19. The display 19 may be a touch panel. For example, the pen-type electronic apparatus 1 is inserted into a storage part 17*a* of the auxiliary apparatus 17 and connected to the charging terminal 18. Thereby, charging is performed.

An image of the character or the like held by the connected pen-type electronic apparatus 1 is displayed on the display 19 of the auxiliary apparatus 17 so that the growing state of the character or the like can be confirmed or a game can be played. When having a game function, the touch panel of the display 19 may be used, or a sensor (acceleration sensor) 20 and a key 23 may be provided and used.

Further, the auxiliary apparatus 17 may include a communication part 21 that performs a connection to a network (for example, a wireless LAN or the Internet) or a connection to an external apparatus, and a battery 22 that is convenient for carrying.

Figure 13:
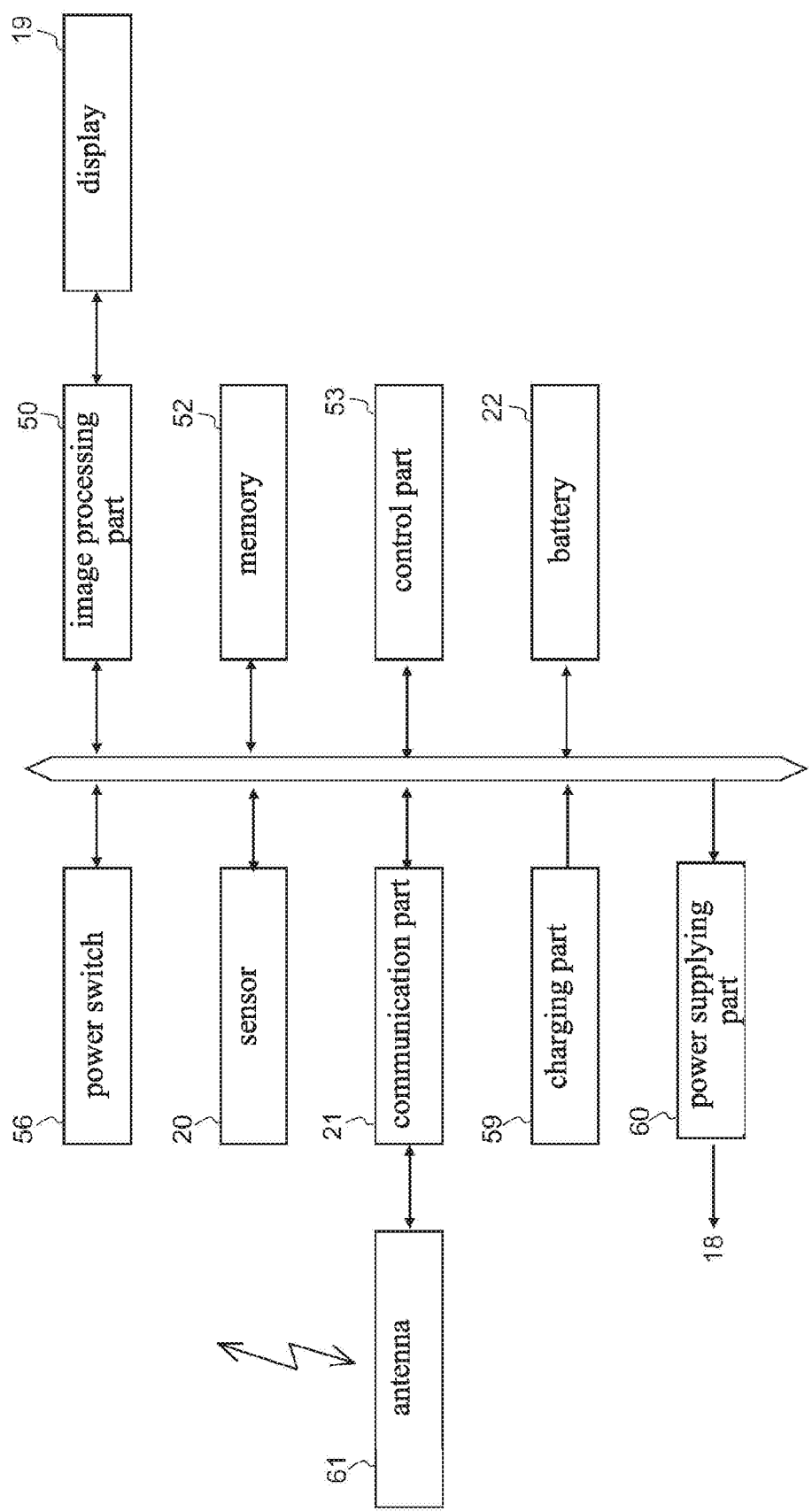
FIG. 13 is a block diagram illustrating the auxiliary apparatus.

FIG. 13 is a block diagram illustrating the auxiliary apparatus. In addition to the above configuration, the auxiliary apparatus 17 may include an image processing part 50, a memory 52, a control part 53, a power switch 56, a charging part 59, a power supplying part 60 and an antenna 61 shown in FIG. 13. The auxiliary apparatus 17 is turned ON/OFF by the power switch 56. The power switch 56 may operate so as to be turned on when the pen-type electronic apparatus 1 is inserted into the storage part 17a and turned off when the pen-type electronic apparatus 1 is pulled out.

The image processing part 50 processes and sends the image data read from the memory 52 according the instruction of the control part 53 to the display 19. The charging part 59 has a circuit or a cable connection terminal for charging the battery 22. The power supplying part 60 is connected to the charging terminal 18 shown in FIG. 12. The antenna 61 is connected to the communication part 21 and transmits/receives information to/from the external apparatus.

Figure 14:
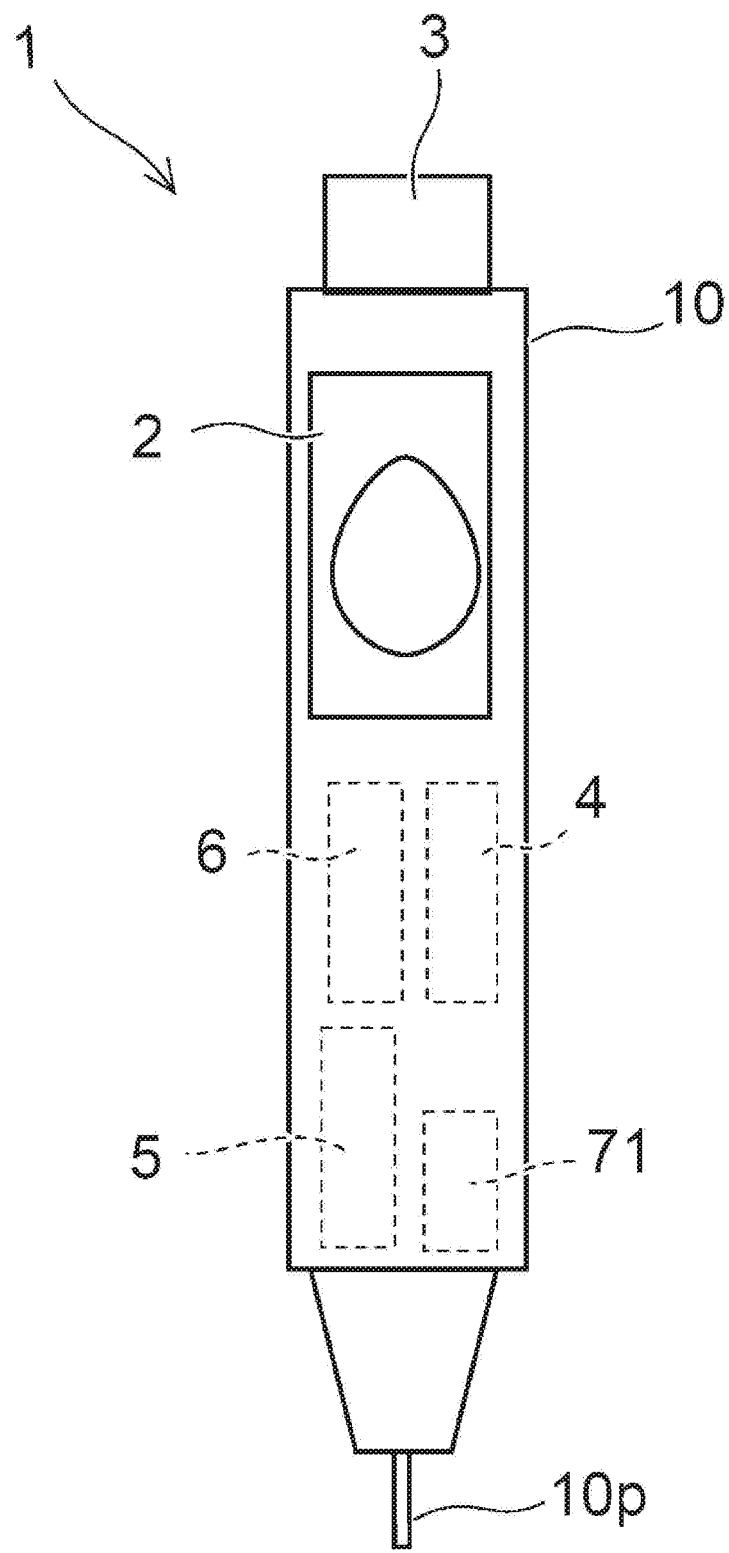
FIG. 14 is a schematic view illustrating the configuration of a pen-type electronic apparatus having a power generation function.

FIG. 14 is a schematic view illustrating the configuration of a pen-type electronic apparatus having a power generation function.

Specifically, the pen-type electronic apparatus 1 shown in FIG. 14 includes a power generation part 71. The power generation part 71 of this pen-type electronic apparatus 1 generates power by a movement such as a writing action or a movement at the time of carrying, or a movement of shaking the main body 10, and charges the battery 5. The battery 5 is charged by power generation by the power generation part 71.

Second Embodiment

Figure 15:
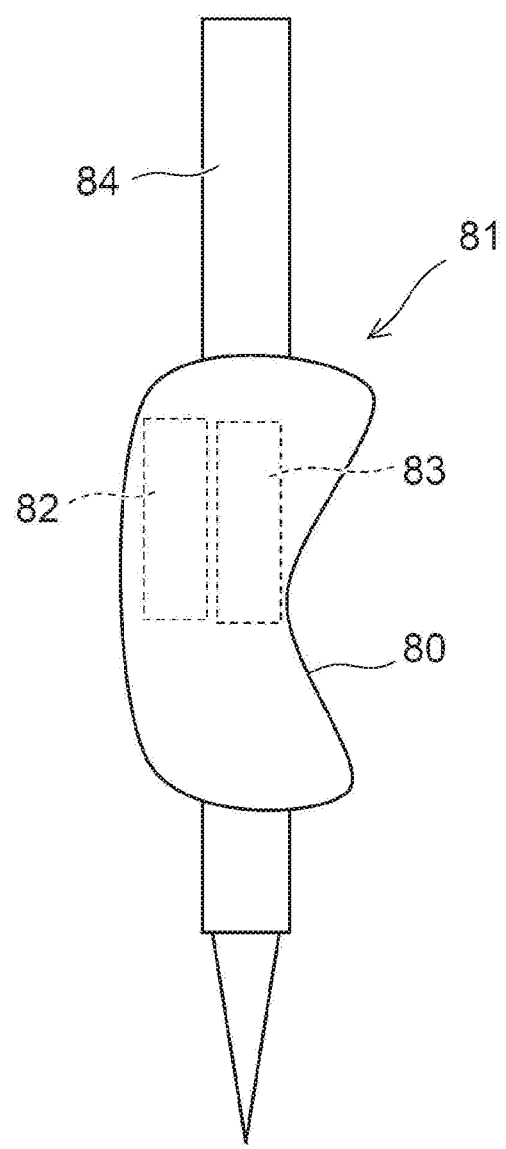
FIG. 15 is a schematic view illustrating an electronic apparatus according to a second embodiment.

FIG. 15 is a schematic view illustrating an electronic apparatus according to a second embodiment.

The electronic apparatus according to the present embodiment is a grip-type electronic apparatus 81 that is attached to a writing tool 84 such as a mechanical pencil or a ballpoint pen. The grip-type electronic apparatus 81 includes a main body 80 attachable to the handle portion of the writing tool 84. The main body 80 is provided with a sensor 82 and a memory 83.

As the sensor 82, similar to the first embodiment, an acceleration sensor, a tilt sensor, a rotational track sensor, a gravitational acceleration sensor and the like are given. When a user uses the writing tool 84 to perform writing action, the movement of the main body 80 moving together with the writing tool 84 is detected by the sensor 82, and the frequency of the writing action is obtained.

The frequency of the writing action is at least any of values indicating the writing frequency by the writing tool 84, the number of times of writing, the writing amount, and the carefulness of the letter. In addition, the sensor 82 may detect a value based on the way of using and moving the writing tool 84.

The frequency of the writing action of the user detected by the sensor 82 may be stored in the memory 83. The information and the like relating to the writing action stored in the memory 83 may be transmitted to an external apparatus via a communication part (transmission part) (not shown), or may be transferred to the external apparatus via a cable. The external apparatus selects and displays an image based on the transferred information relating to the frequency of the writing action. The grip-type electronic apparatus 81 may have a function of receiving the information sent from the outside by the communication part (reception part) (not shown).

According to such a grip-type electronic apparatus 81, information relating to the writing action is detected by the sensor 82, and image display and image change corresponding to the frequency of the writing action are executed by attaching the grip-type electronic apparatus 81 to the writing tool 84 that the user normally uses, and performing the writing action. For example, corresponding to the frequency of the writing action, it is possible to perform an image display in which a character on the software makes some change such as it is born from an egg, grows, becomes stronger, lives longer, changes personality, changes nature, evolves, and so on.

Also in the present embodiment, as in the first embodiment, a plurality of grip-type electronic apparatus 81 may be approached (contacted) to generate a specific action.

(Other Configuration Examples of the Second Embodiment)

Figure 17:
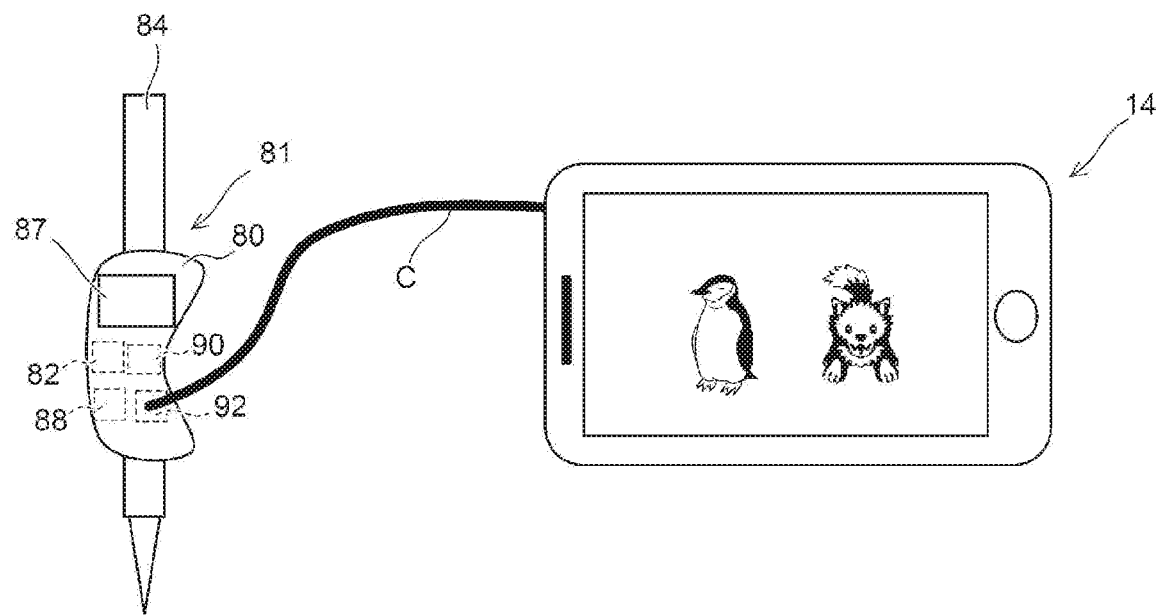
FIG. 17 is a schematic view showing another configuration example of the second embodiment.
Figure 18:
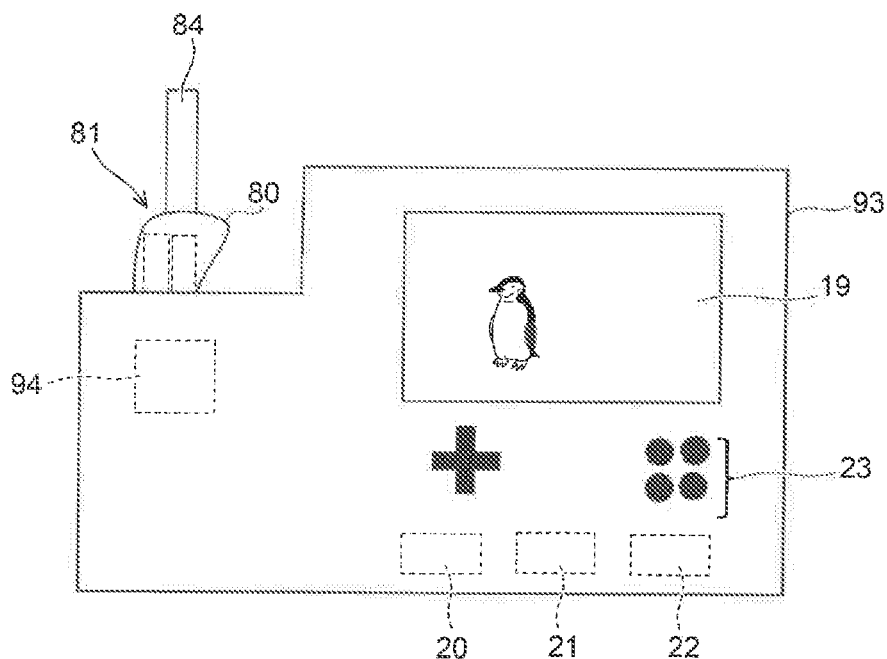
FIG. 18(a) and FIG. 18(b) are schematic views showing another configuration example of a second embodiment.
Figure 18:
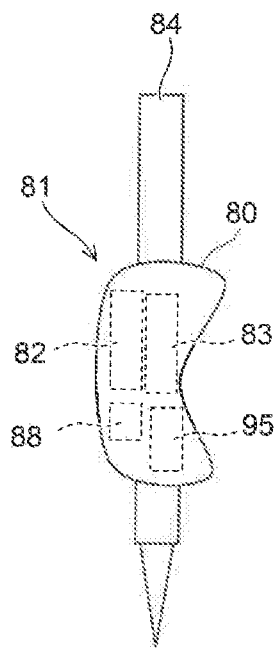

FIG. 16 to FIG. 18 are schematic views showing other configuration examples of the second embodiment.

The grip-type electronic apparatus 81 shown in FIG. 16 has a configuration in which a display 87 is provided in the main body 80. By providing the main body 80 with the display 87, an image of a character or the like on the software can be confirmed with the grip-type electronic apparatus 81 at hand.

Specifically, based on the frequency of the writing action detected by the sensor 82 of the grip-type electronic apparatus 81, for example, an image in which a character or the like makes some change such as it is born from an egg, grows, becomes stronger, lives longer, changes personality, changes nature, evolves, and so on can be confirmed on the display 87 of the main body 80.

Further, in addition to the sensor 82, the main body 80 may be provided with a battery 88, a communication part 90 and a power supplying part 91. The battery 88 is, for example, a storage battery, and is a supply source of electric power for driving each part. The communication part 90 is a part that performs input and output of information (transmission part and reception part) with an external apparatus (for example, mobile terminal 14). As the power supplying part 91, a USB connector or a wireless power supplying part is used, and the battery 88 is charged with power taken from the outside via the power supplying part 91.

The grip-type electronic apparatus 81 shown in FIG. 17 includes an interface part 92 for connecting to an external apparatus (for example, the mobile terminal 14) by a cable C. Thereby, the grip-type electronic apparatus 81 performs input/output of information with the external apparatus via the cable C. It is to be noted that the interface part 92 may also serve as the power supplying part 91 for charging the battery 88.

FIG. 18 (*a*) is a schematic view illustrating an auxiliary apparatus.

As shown in FIG. 18 (a), the grip-type electronic apparatus 81 according to the present embodiment may be used by being connected to a dedicated auxiliary apparatus 93.

The auxiliary apparatus 93 includes a charging terminal 94 and a display 19. The display 19 may be a touch panel. For example, the grip-type electronic apparatus 81 is inserted into the storage position of the auxiliary apparatus 93 while being attached to the writing tool 84, and is connected to the charging terminal 94. Thereby, charging is performed.

An image of the character or the like held by the connected grip-type electronic apparatus 81 is displayed on the display 19 of the auxiliary apparatus 93 so that the growing state of the character or the like can be confirmed or a game can be played. When having a game function, the touch panel of the display 19 may be used, or a sensor (acceleration sensor) 20 and a key 23 may be provided and used. Further, a communication part 21, or a battery 22 that is convenient for carrying may be included.

FIG. 18 (b) is a schematic view illustrating the configuration of a grip-type electronic apparatus having a power generation function.

Specifically, the grip-type electronic apparatus 81 shown in FIG. 18 (b) includes a power generation part 95. The power generation part 95 of this grip-type electronic apparatus 81 generates power by a movement such as a writing action or a movement at the time of carrying, or a movement of shaking the main body 80, and charges the battery 88. The battery 88 is charged by power generation by the power generation part 95.

Figure 19:
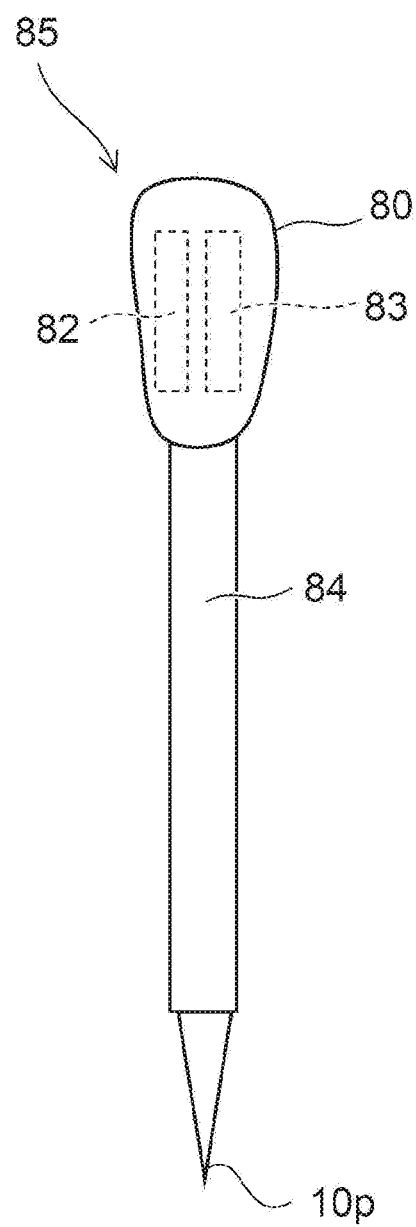
FIG. 19 is a schematic view illustrating a cap-type electronic apparatus.

FIG. 19 is a schematic view illustrating a cap-type electronic apparatus.

Although in the examples shown in FIG. 15 to FIG. 18, the grip-type electronic apparatus 81 attached to the writing tool 84 has been described, it may also be a cap-type electronic apparatus 85 attached to the writing tool 84 as shown in FIG. 19. The cap-type electronic apparatus 85 is mounted so as to be inserted into the handle of the writing tool 84 when the writing tool 84 is used. Further, when the writing tool 84 is not used, it is inserted into the tip of the writing tool 84 (the side of pen tip 10p) and used as a pen cap.

Third Embodiment

Figure 20:
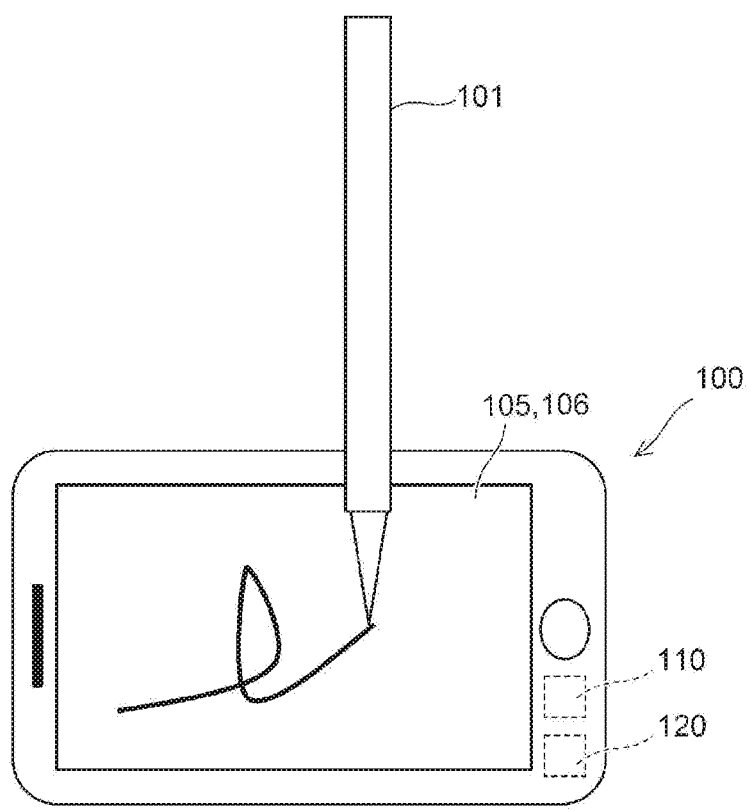
FIG. 20 is a schematic view illustrating an electronic apparatus according to a third embodiment.

FIG. 20 is a schematic view illustrating an electronic apparatus according to a third embodiment.

The electronic apparatus according to the present embodiment is a panel-type electronic apparatus 100 having a detection part such as a touch panel. The panel-type electronic apparatus 100 includes a panel part 105, a control part 110 and a memory 120.

The panel part 105 is provided with a display part for displaying an image or the like and with a detection part 106 for detecting a contact position (coordinates) on the display part. That is, the panel part 105 is a touch panel. When a writing action is performed by bringing the tip of the writing tool 101 such as a stylus pen into contact with the panel part 105, the handwriting is detected by the detection part 106. The control part 110 discriminates the handwriting detected by the detection part 106 and counts the frequency.

The memory 120 stores image data and the like. The memory 120 may be provided inside the main body of the panel-type electronic apparatus 100 or may be provided in an external apparatus. When the memory 120 is provided in an external apparatus, necessary image data or the like may only be transferred from the memory 120 to the panel-type electronic apparatus 100 via communication means (a network, a cable, or the like).

In the panel-type electronic apparatus 100, the control part 110 detects the frequency of writing based on the handwriting detected by the detection part 106. The frequency of writing based on the handwriting is at least any of values indicating the writing frequency, the number of times of writing, the writing amount, and the carefulness of the letter obtained from values which are the acceleration, direction and rotational track of the handwriting calculated from coordinates and movement thereof detected by the detection part 106 of the panel part 105. In addition, the detection part 106 may detect a value based on the way of using and moving the writing tool 101, and a pressure at the time of writing. In addition, the content of the written letter or picture itself may be recorded, or it may be analyzed and used.

The control part 110 performs control to select image data from the memory 120 corresponding to the frequency of writing based on the handwriting detected by the detection part 106 and display an image based on the selected image data on the display part of the panel part 105.

Figure 21:
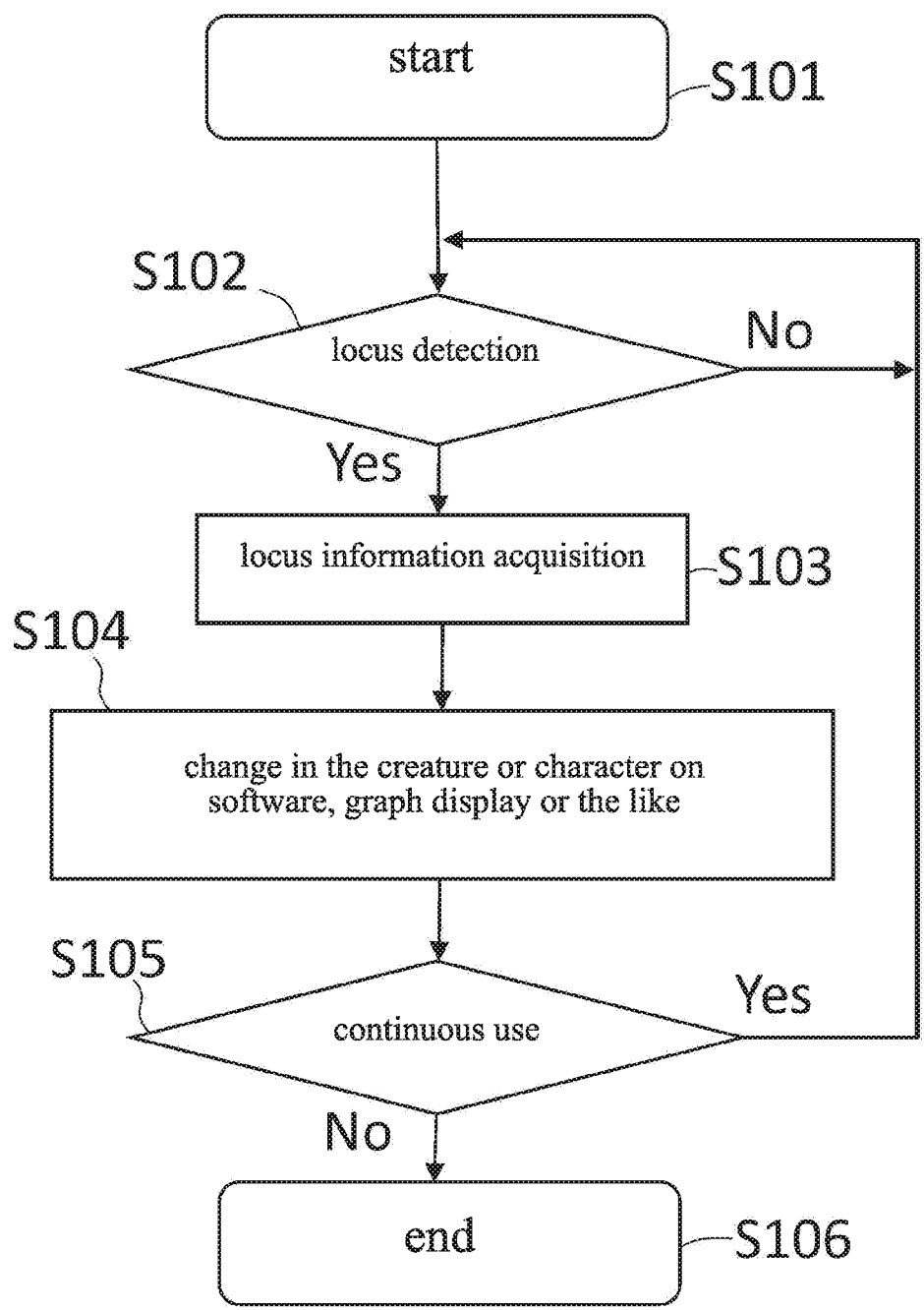
FIG. 21 is a flowchart showing an outline of the action of the electronic apparatus according to the present embodiment.

FIG. 21 is a flowchart showing an outline of the action of the electronic apparatus according to the present embodiment.

When the action of the panel-type electronic apparatus 100, which is an example of the electronic apparatus according to the present embodiment, is started (step S101), first, the detection part 106 of the panel part 105 determines whether or not a handwriting (locus) has been detected (Step S102). In the case where handwriting has been detected, the locus information is acquired based on the locus detected by the detection part 106 (step S103). The locus information is the frequency of writing.

Next, the control part 110 selects image data corresponding to the frequency of writing. In this embodiment, as an example, an image of a character or the like on the software is changed (step S104). Specifically, the control part 110 selects image data of the character or the like on the software from the memory 120 corresponding to the frequency of writing and display an image based on the image data on the display part of the panel part 105. For example, as the frequency of writing increases, an image of a mature character or the like is displayed. Thereby, it is possible to obtain an image display in which a character or the like grows along with the writing action. Further, the control part 110 may acquire numeric data corresponding to the frequency of writing from the memory 42 or the like, graph the numeric data and display it on the display 2.

Next, it is determined whether or not the panel-type electronic apparatus 100 is used continuously (step S105). If the panel-type electronic apparatus 100 is continuously used, the action returns to step S102 to repeat the subsequent processing. If the panel-type electronic apparatus 100 is not continuously used, the action is terminated (step S106).

When the writing action is performed with the writing tool 101 on the panel part 105 by the action of such panel-type electronic apparatus 100, information relating to the writing action is detected by the detection part 106, and image display and image change corresponding to the frequency of writing are executed. For example, corresponding to the frequency of writing, it is possible to display an image in which a character on the software makes some change such as it is born from an egg, grows, becomes stronger, lives longer, changes personality, changes nature, evolves, and so on.

Figure 22:
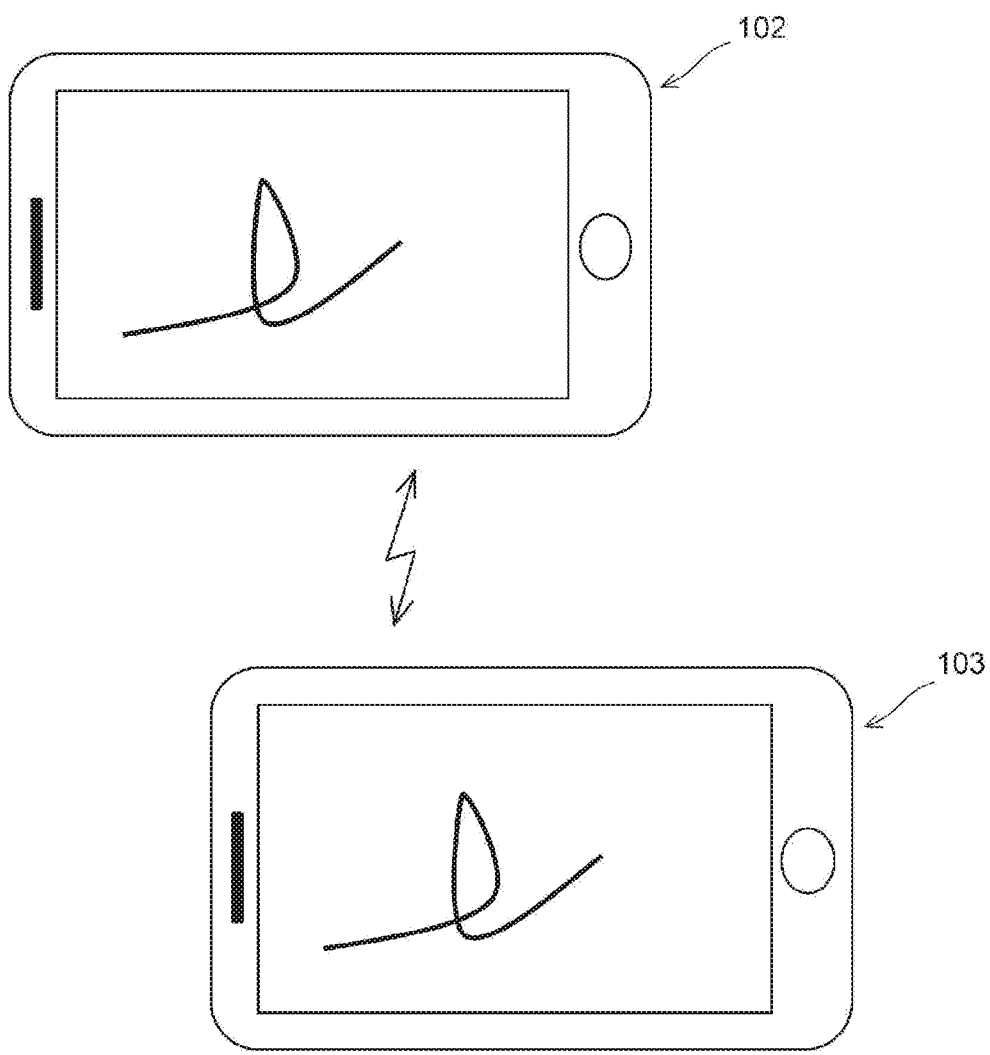
FIG. 22 is a schematic view illustrating an example in which a plurality of panel-type electronic apparatus are used.

FIG. 22 is a schematic view illustrating an example in which a plurality of panel-type electronic apparatus are used.

As shown in FIG. 22, when an action other than the writing action such as bringing the first panel-type electronic apparatus 102 and the second panel-type electronic apparatus 103 close up to a predetermined distance therebetween or bringing them into contact with each other, characters and the like approach (contact) with each other on the software, and a specific action occurs.

For example, when the first panel-type electronic apparatus 102 and the second panel-type electronic apparatus 103 are brought into contact with each other, an image in which eggs or children as the characters and the like are born is displayed on the software. After the eggs or children are born, a change in the image is caused by a writing action using the respective panel-type electronic apparatus 102 and 103, such as the eggs hatch or the characters grow greatly from the children.

Further, an image in which a single character or the like is generated on one or both of the first panel-type electronic apparatus 102 and the second panel-type electronic apparatus 103 may be displayed by approaching or contacting the first panel-type electronic apparatus 102 and the second panel-type electronic apparatus 103.

Further, the information of one apparatus may be transferred to the other apparatus by the approach or contact of the first panel-type electronic apparatus 102 and the second panel-type electronic apparatus 103.

(Other Configuration Examples of the Fourth Embodiment)

Figure 23:
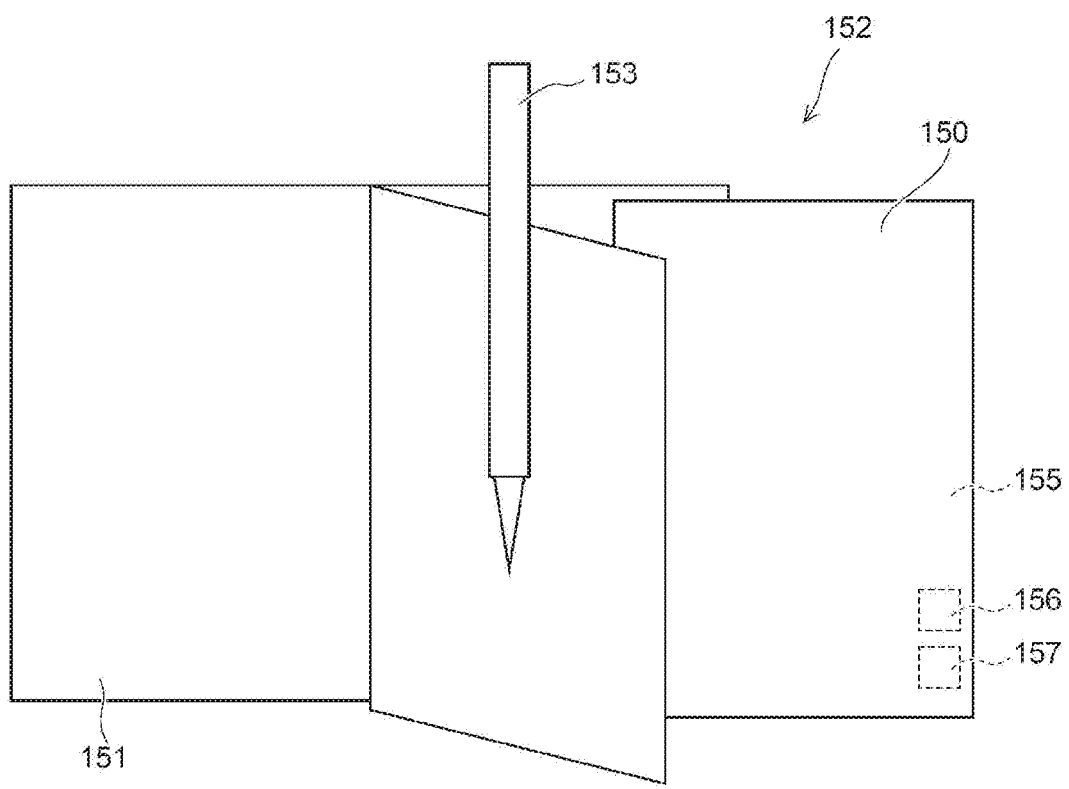
FIG. 23 is a schematic view showing another configuration example of the fourth embodiment.

FIG. 23 is a schematic view showing another configuration example of the fourth embodiment.

This panel-type electronic apparatus 152 is an underlay type which is laid under a writing paper 151 such as a notebook. The panel-type electronic apparatus 152 includes: a flat plate part 150 that can be used as an underlay, a sensor 155 provided in the plate part 150, a memory 156 and a control part 157.

The sensor 155 detects writing pressure or the like and detects coordinates corresponding to the handwriting when the user performs writing with the writing tool 153 in a state where the plate part 150 is laid under the writing paper 151.

The memory 156 stores image data and the like. The memory 156 may be provided inside the plate part 150 of the panel-type electronic apparatus 152 or may be provided in an external apparatus. When the memory 156 is provided in an external apparatus, necessary image data or the like may only be transferred from the memory 156 to the panel-type electronic apparatus 152 via communication means (a network, a cable, or the like).

The control part 157 detects the frequency of writing based on the handwriting detected by the sensor 155. The frequency of writing based on the handwriting is at least any of values indicating the writing frequency, the number of times of writing, the writing amount, and the carefulness of the letter obtained from values which are the acceleration, direction and rotational track of the handwriting, and the pressure at the time of writing that are calculated from coordinates and movement thereof detected by the sensor 155. In addition, the sensor 155 may detect a value based on the way of using and moving the writing tool 153.

The control part 157 selects image data from the memory 156 corresponding to the frequency of writing based on the detected handwriting. The image data selected by the control part 157 is transferred to an external apparatus and displayed on the display part of the external apparatus.

It is to be noted that the control part 157 may store the frequency of writing based on the detected handwriting in the memory 156, and transfer the frequency of writing stored in the memory 156 to the external apparatus at a stage where the panel-type electronic apparatus 152 is connected to the external apparatus (connected by a network or a cable). In the external apparatus, corresponding image data is selected from the transferred frequency of writing, and displayed on the display part of the external apparatus.

By such a panel-type electronic apparatus 152, a user places the plate part 150 under the writing paper 151 to use it as an underlay, and performs a writing action by the writing tool 153. When the writing action is performed, the information relating to this writing action is detected by the sensor 155, and image display and image change corresponding to the frequency of writing are executed by the external apparatus. For example, corresponding to the frequency of writing, it is possible to display an image in which a character on the software makes some change such as it is born from an egg, grows, becomes stronger, lives longer, changes personality, changes nature, evolves, and so on.

Further, only information such as magnetic force is given to the plate part 150, and a pen-type electronic apparatus 1 may be used as the writing tool 153. In this case, the positional relationship between the plate part 150 and the pen-type electronic apparatus 1 is read by using information such as the magnetic force of the plate part 150, the writing information of the pen-type electronic apparatus 1 is acquired, and the various processing and communication described above may be performed.

It is to be noted that in the present embodiment, as in the above-described embodiment, a plurality of panel-type electronic apparatus 152 may be approached (contacted) to generate a specific action. Further, in the panel-type electronic apparatus 100 and 152, writing is performed using the writing tools 101 and 153, but writing may be performed with a finger.

FIG. 24 is a schematic view for explaining an example in which an electronic apparatus of different form is used.

Each form of electronic apparatus such as the pen-type electronic apparatus 1, the grip-type electronic apparatus 81, and the panel-type electronic apparatus 100 described above operates individually. Specifically, the software executed on each of the electronic apparatus has a function to make some change such as a character or the like on the software hatches from an egg, grows, becomes stronger, lives longer, changes personality, changes nature, evolves, and so on based on the information on the use frequency, number of times of use, use amount, use method and the way of moving.

Each electronic apparatus is connectable to a server 161 via a network, and may become able to enjoy a battle type game with each other. The game on the software can be advantageously advanced when the character on the software in each electronic apparatus further grows and becomes stronger. It is also advantageous when fighting against other creatures. In addition, it can be advantageously advanced when creatures or characters raised by another person fight against each other or enjoy a battle game via the Internet.

Figure 25A:
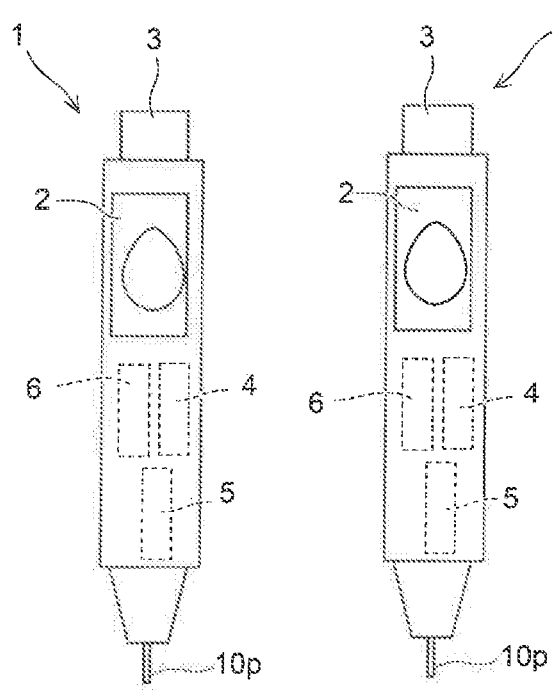
FIG. 25(a) and FIG. 25(b) are schematic views illustrating information exchange between electronic apparatus.
Figure 25B:
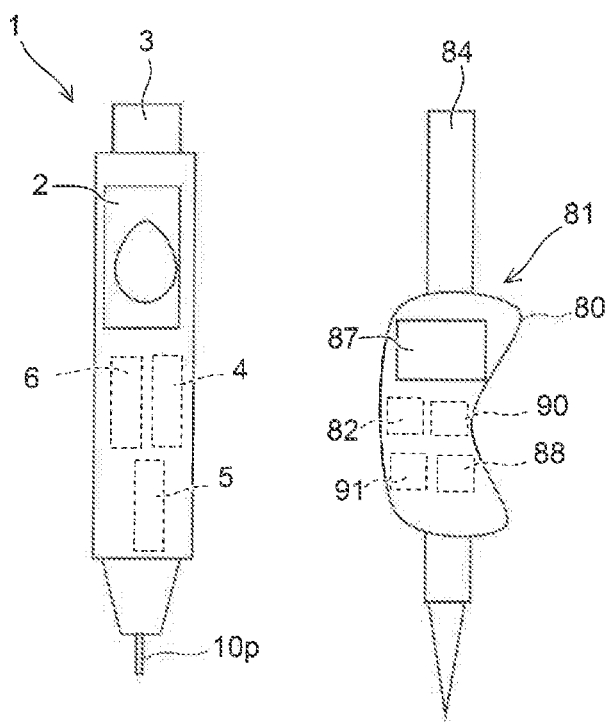
Figure 26:
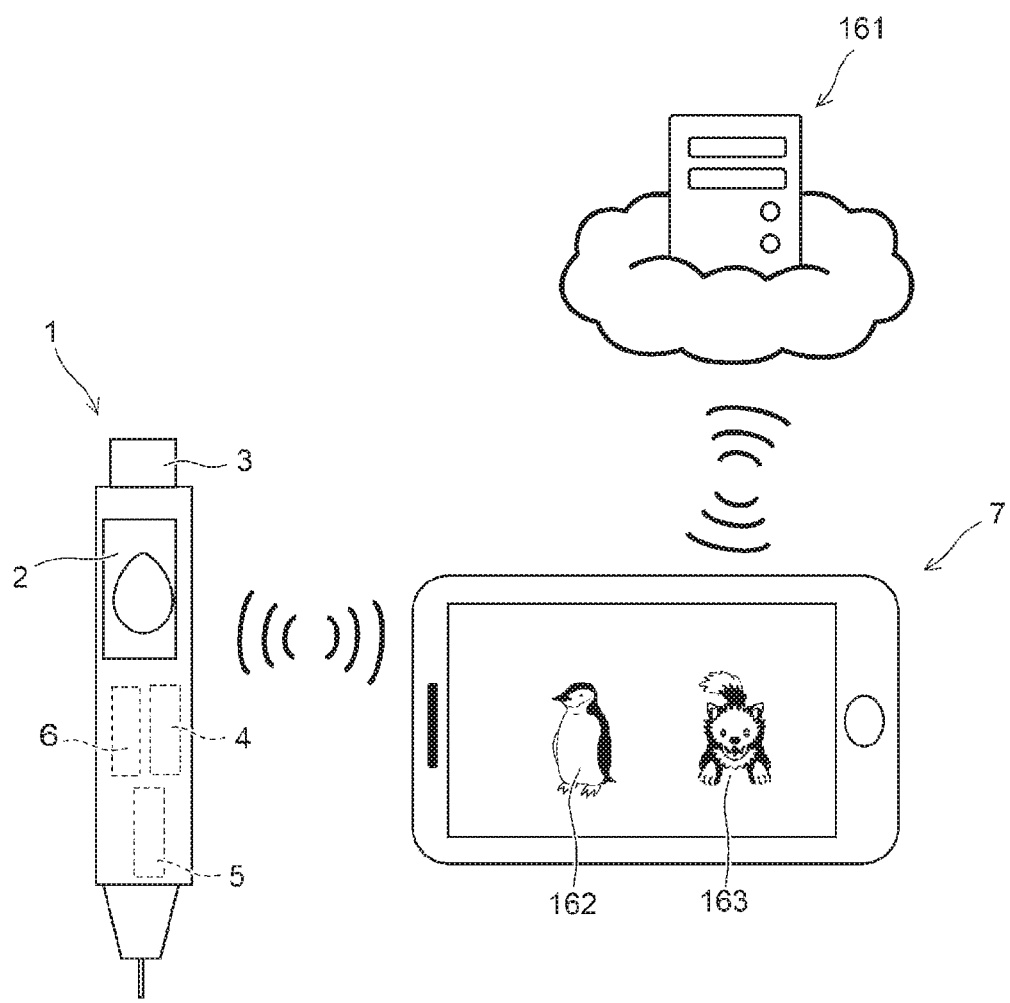
FIG. 26 is a schematic view illustrating information exchange between electronic apparatus.

FIG. 25 and FIG. 26 are schematic views illustrating information exchange between electronic apparatus.

FIG. 25 (a) shows an example of information exchange when electronic apparatus of the same form (for example, pen-type electronic apparatus 1) approach. FIG. 25 (b) shows an example of information exchange when electronic apparatus of different forms (for example, the pen-type electronic apparatus 1 and grip-type electronic apparatus 81) approach.

For example, when two electronic apparatus approach each other, a specific action such as characters or the like touching or approaching on the software is performed on a screen display, and a screen display is performed such that an egg or a child is born on the software. Thereby, the next character or the like can be grown.

FIG. 26 shows an example in which information exchange is performed via a network even when electronic apparatus do not approach each other. For example, the pen-type electronic apparatus 1 is connected via the mobile terminal 7 to the server 161 which is connected to the Internet so as to be virtually in contact with another electronic apparatus via a communication line. Thereby, characters or the like of each electronic apparatus virtually in contact with each other are displayed on the screen of the mobile terminal 7. In the example shown in FIG. 26, a character 162 on the software of the pen-type electronic apparatus 1 and a character 163 on the software of another electronic apparatus virtually in contact via the network are displayed on the screen of the mobile terminal 7. The screen is displayed as if these characters 162 and 163 met.

Then, a state is displayed on the mobile terminal 7 where an egg or a child as a new character is born from the two characters 162 and 163. The egg or child as the new character may be set to inherit the characteristics of the parent.

Fifth Embodiment

Information relating to use and movement or information of handwriting (locus) by the pen-type electronic apparatus 1, the grip-type electronic apparatus 81, and the panel-type electronic apparatus 100 may be given as a "point" rather than directly raising the character or the like on the software.

The point may be exchangeable for digital information, electronic money, or a point of a partner company. Further, the point can be exchanged for raising a character or the like on the software, for a house related to the character or the like, or for furniture. Furthermore, it may be possible to exchange for nutrients or food on the software that help the character or the like grow.

Examples of the above digital information include music, movies, games, puzzles, and the like.

Further, it may be a function of such as releasing the time when the game can be played by the point.

Furthermore, the pen-type electronic apparatus 1 may have a function of writing a letter or an electronic message, and sending the image data of the character or the like on the software or the point together with the written letter or the electronic message.

Figure 27:
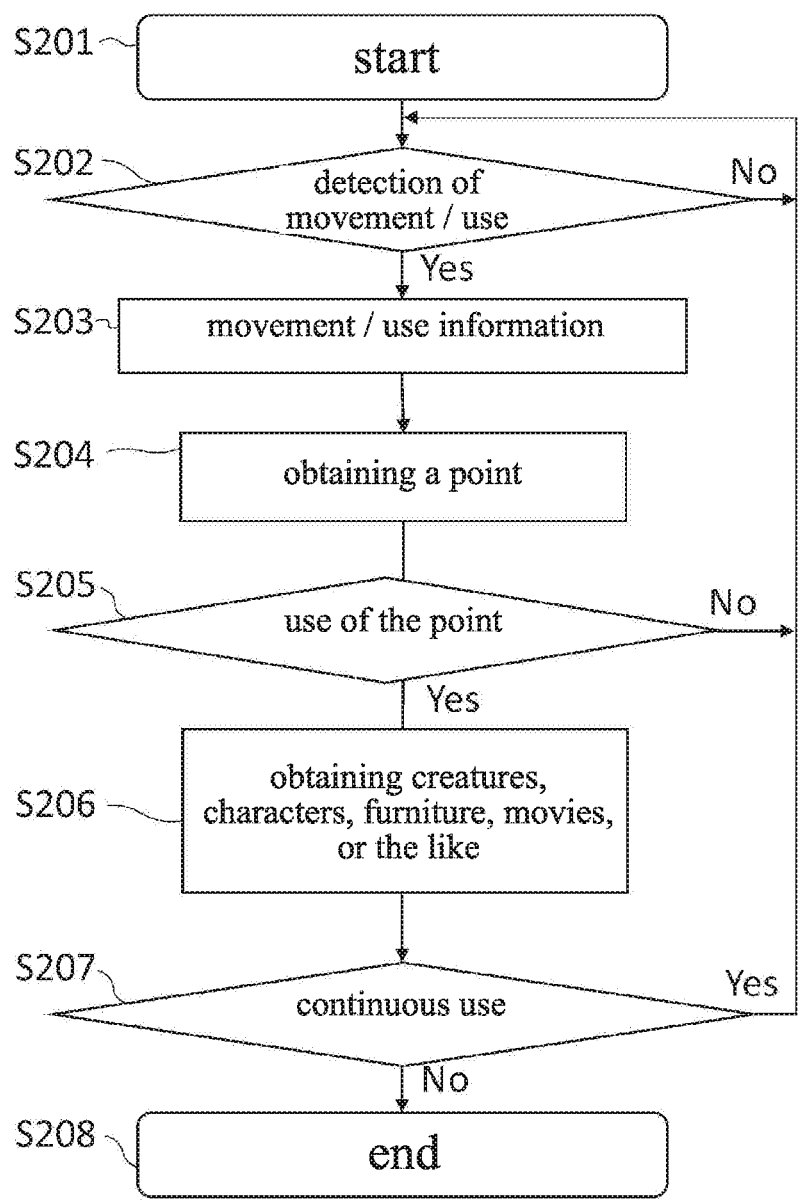
FIG. 27 is a flowchart showing an information processing method according to a fifth embodiment.

FIG. 27 is a flowchart showing an information processing method according to a fifth embodiment.

This information processing method is realized by a program processing executed by the control part 41.

The pen-type electronic apparatus 1, grip-type electronic apparatus 81, panel-type electronic apparatus 100 are connected to the server 161 via a network.

First, when the processing is started (step S201), it is determined whether or not the movement/use is detected (step S202). When movement/use is detected, information of the movement/use is acquired (step S203). The information of the movement/use is the frequency of writing. Further, a point based on the acquired information of the movement/use is obtained (step S204). The points are managed by the server 161 for each user.

Next, it is determined whether or not the points are used (step S205). If the points are used, digital information such as creatures, characters, furniture, movies and the like is obtained according to the points to be used (step S206). This processing is a processing for exchanging a point selected by the user and an equivalent value corresponding to the point by a program processing executed by the server 161, for example.

Next, it is determined whether or not the point is used continuously (step S207). If the point is continuously used, the method returns to step S202 to repeat the subsequent processing. If the panel-type electronic apparatus 100 is not continuously used, the action is terminated (step S208).

The character or the like on the software or the point may be given to the purchased electronic apparatus in advance.

Further, the characters themselves or the like on the software, the growing degree, the point and the like can change the weighting according to time, date, and period. This makes it possible to make a habit of an action, such as making it a habit of studying at a fixed time, or finishing the summer holiday homework early.

Further, by linking the electronic apparatus or the characters on the software with a friend or a certain person, a benefit may be given, such as earning more points when used under certain conditions such as the same day and same time. This creates a sense of unity and becomes motivation of study or the like.

In addition, the point or the character on the software may be obtained when the puzzle is solved. In addition, the point or the character on the software may be obtained when the test is solved or the letters or pictures are practiced.

Moreover, at that time, not only the information of the electronic use from the electronic apparatus but also the written letters and the drawn pictures may be sent by post or in an electronic state. At that time, benefit may be given, such as obtaining more characters or the like on the software or points in a case of careful letters or good pictures.

Further, these electronic apparatus and software may have a function of exchanging and transferring the characters or the like. Similarly, it may have a function of exchanging and transferring the obtained points.

These electronic apparatus and software have a mechanism in which not only a business owner but also a third party or a user can enter. For example, the mechanism is as follows:

(1) A third party or a user can register a character or the like on the software and a game. Thereby, the user or the third party can enjoy the created character or the like on the software and many people can enjoy the game.

(2) Money or points are given to the third party or the user who created the character or the like on the software and the game.

(3) The pen-type, grip-type, and panel-type electronic apparatus can have a configuration of only an internal electronic device that does not include a pen exterior such as a writing part. As a result, the third party can create a pen-type or grip-type electronic apparatus having a degree of freedom in appearance.

(4) A mechanism for changing the weighting of points and the like described above is included.

With respect to these electronic apparatus and software, they may have a mechanism that a third party can enter and can apply limitation such as security and the like. For example, the mechanism is as follows.

Specifically, the pen-type, grip-type, and underlay-type electronic apparatus have a security function and an individual identification function, and operate only by corresponding to the software. Thereby, the use of only a pen-type electronic apparatus and only the software is prevented. It is also possible to prevent unauthorized use.

Figure 28:
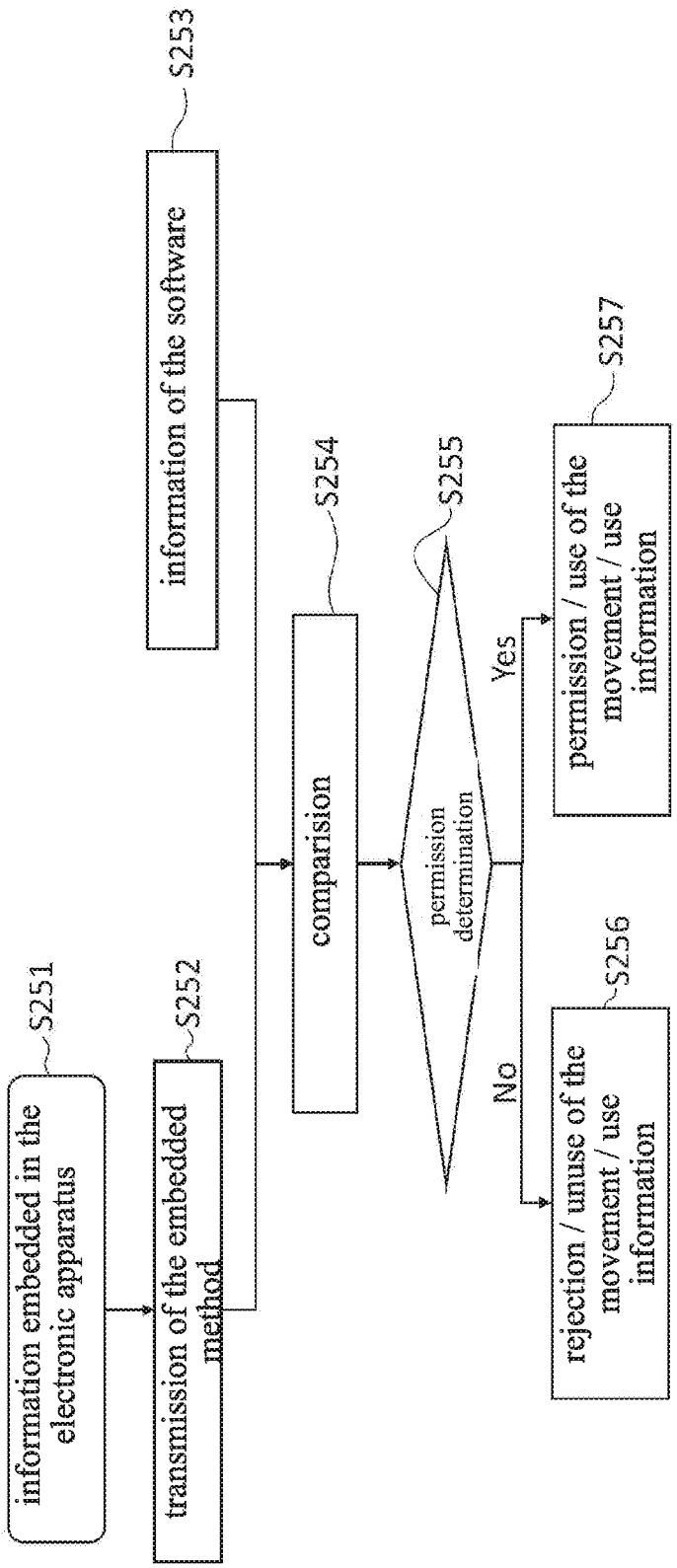
FIG. 28 is a flowchart illustrating a limitation processing.

FIG. 28 is a flowchart illustrating a limitation processing.

First, information embedded in the electronic apparatus is acquired (step S251), and the embedded information is transmitted (step S252). On the other hand, information of the software is acquired (step S253). Next, the information embedded in the electronic apparatus is compared with the information of the software (step S254), and it is determined whether or not to give permission (step S255). When no permission is given, movement/use information is rejected/not used (step S256). When permission is given, the movement/use information is permitted/used (step S257).

Further, a mechanism in which a third party registers a character or the like on the software, a game or the like in the software, and a mechanism for performing examination at the time of registration may be included. In addition, in the case of charging at the time of registration, a mechanism may be created in which a part thereof is received by a business owner.

In addition, a mechanism in which the business owner is capable of checking the character on the software itself and the content of the game.

Further, the electronic apparatus according to the present embodiment may be configured to discriminate whether or not it is a mark sheet, a language other than Japanese such as English, or a careful letter. For example, in the case of a mark sheet, an action such as painting a certain range is identified. Whether the letter is careful or not is discriminated by the speed of movement and movement at regular intervals. Further, whether it is English or not is discriminated by shifting laterally at short intervals or short cycles, unlike Kanji character.

Figure 29:
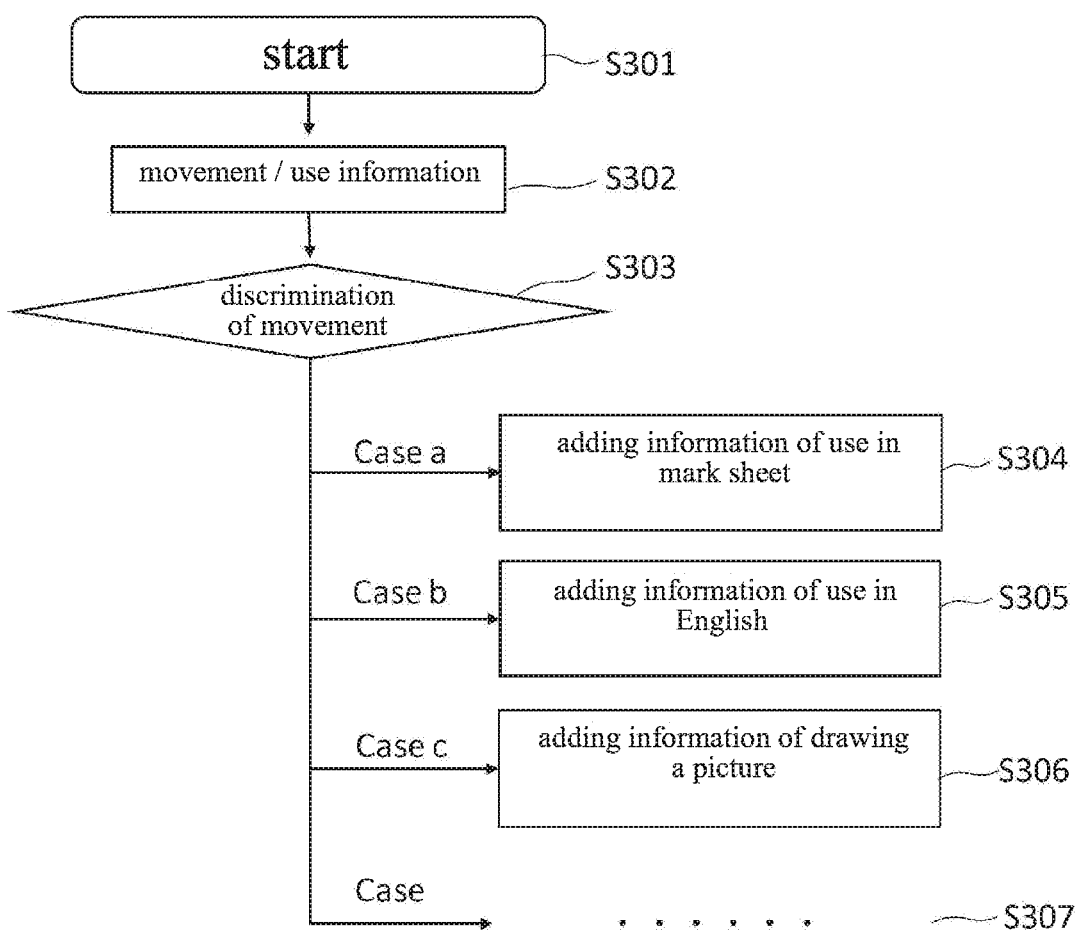
FIG. 29 is a flowchart illustrating a movement determination processing.
Figure 30:
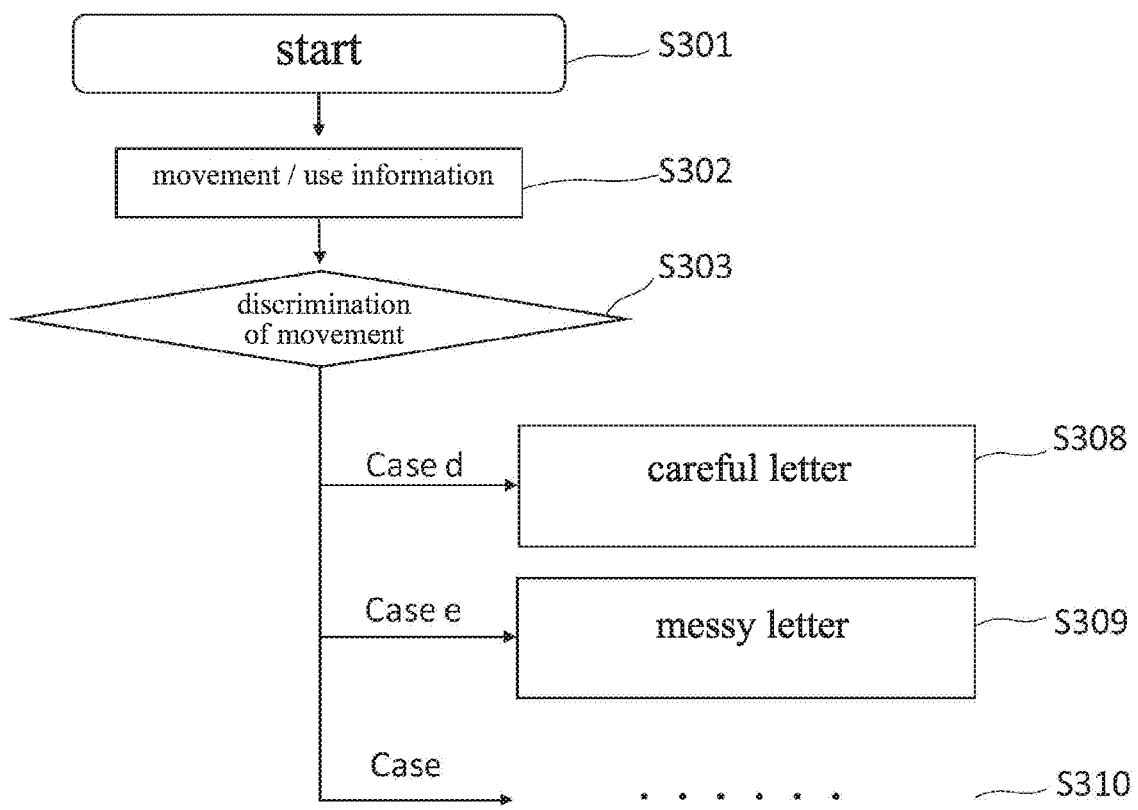
FIG. 30 is a flowchart illustrating a movement determination processing.

FIG. 29 and FIG. 30 are flowcharts illustrating a movement determination processing. This determination processing is realized by a program processing executed by the control part 41.

In FIG. 29, the movement is discriminated (step S303) from the acquisition of the movement/use information (steps S301 to S302). In Case (a), information "used in mark sheet" is added (step S304). In Case (b), information "used in English" is added (step S305). In Case (c), information "drawing a picture" is added (step S306). In addition, in FIG. 30, as in FIG. 29, the movement is discriminated (step S303) from the acquisition of the movement/use information (steps S301 to S302). In Case (d), it is discriminated that "the letter is careful" (step S308), and in Case (e), it is discriminated that "the letter is messy" (step S309).

As a discrimination method, A.I. (Artificial Intelligence), machine learning, deep learning, etc. are given. Thereby, it is possible to discriminate the use information more accurately. This discrimination result can also be used as a learning record or game data.

In some cases, the discriminated information is added to movement or use information. In that case, the point given to the additional information may be changed, and the raising speed may be changed.

In addition, information acquired by the electronic apparatus according to the present embodiment can be used for discrimination of a learning subject.

Figure 31:
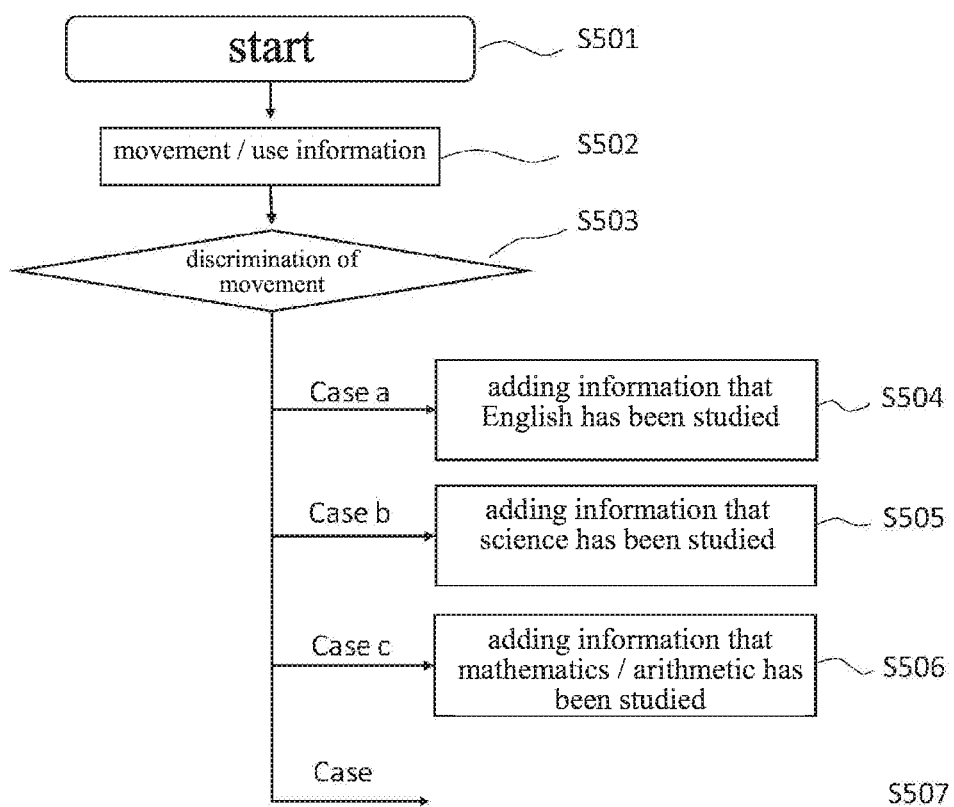
FIG. 31 is a flowchart illustrating a learning subject determination processing.

FIG. 31 is a flowchart illustrating a learning subject determination processing.

This determination processing is realized by a program processing executed by the control part 41.

Specifically, as shown in FIG. 31, first, the movement is discriminated (step S503) from the acquisition of the movement/use information (steps S501 to S502). In Case (a), information of "studied English" is added (step S504), in Case (b), information of "studied science" is added (step S505), and in Case (c), information of "studied mathematics/arithmetic" is added (step S506).

As a determination method, A.I., machine learning, deep learning, etc. are given. Thereby, more accurate discrimination of the learning subject becomes possible based on the specific writing action for each subject. This discrimination result can also be used as a learning record or game data.

As described above, the type of the writing content discriminated based on the writing action (mark sheet, English, picture, careful letter, careless letter, learning subject, etc.) is the writing type. A memory 42 which is the storage part of the electronic apparatus according to the present embodiment or an external apparatus (a mobile terminal 7 or a server 161) stores time (writing time) calculated based on the frequency of the writing action and the writing type discriminated by the control part 41. The control part 41 may perform at least any of graphing and ranking based on the writing time and the writing type stored in the storage part.

Figure 32:
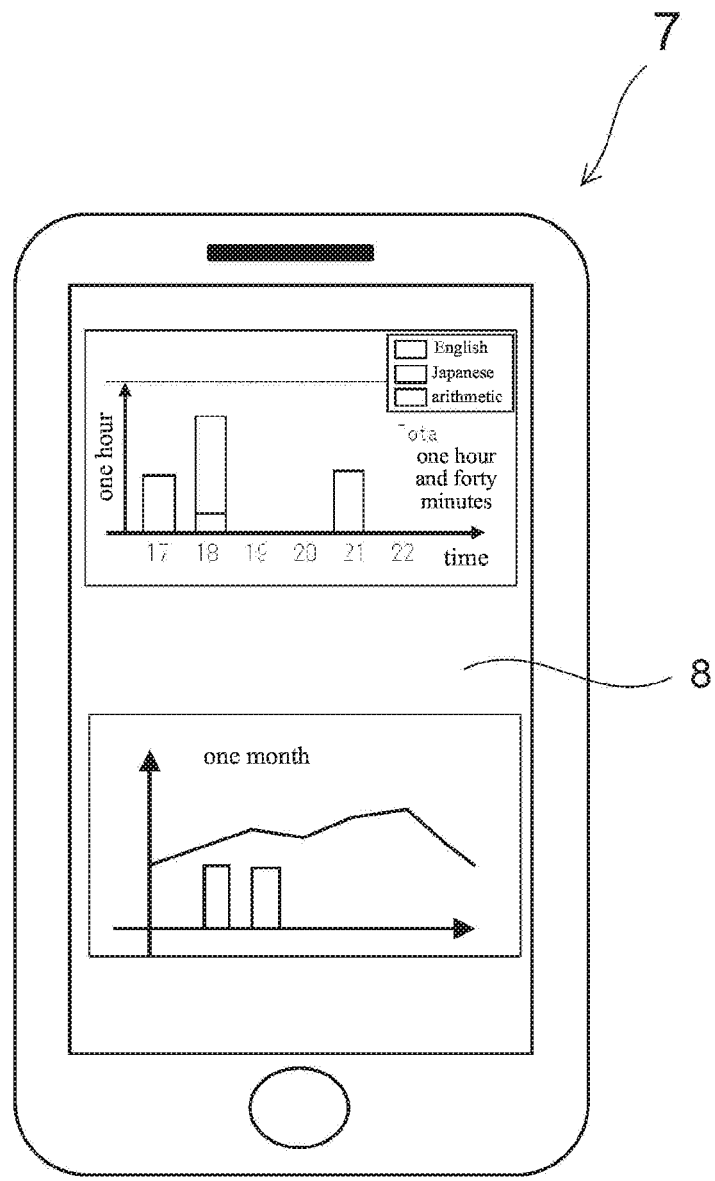
FIG. 32 is a schematic view showing an example of a graph display.

FIG. 32 is a schematic view showing an example of a graph display.

Specifically, based on the information (such as writing time) acquired by the electronic apparatus according to the present embodiment (for example, the pen-type electronic apparatus 1) and the discriminated writing type (such as information of the learning subject), at least one of a learning time, a learning subject, a concentrated time, and a time for writing a careful letter, etc. is graphed. In the example of FIG. 32, a graph is displayed on a display 8 of the mobile terminal 7. The graph may be a learning record for each time, or may be a learning record for every day, every month, or the like. In addition, the learning or the like performed without using the electronic apparatus according to the present embodiment may be manually input.

Further, the letter itself can be discriminated by the information acquired by the electronic apparatus according to the present embodiment.

Figure 33:
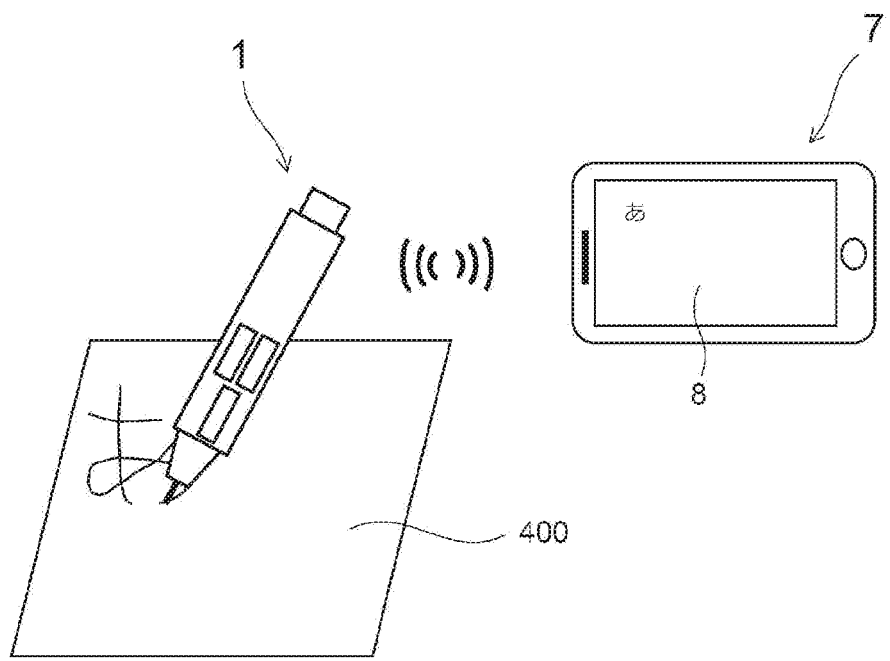
FIG. 33 is a schematic view showing an example of handwriting discrimination.

FIG. 33 is a schematic view showing an example of handwriting discrimination.

For example, when "あ (Japanese character)" is written on the paper 400 with the electronic apparatus according to the present embodiment (for example, the pen-type electronic apparatus 1), "あ (Japanese character)" can be discriminated by the pen itself, an electronic device (for example, the mobile terminal 7) which transmits it, or a computer in the cloud. This discrimination may be performed by a specific rule base, an A.I., machine learning, deep learning, or the like. Further, not only the identification letter but also the handwriting may be completely reproduced.

The information acquired from the electronic apparatus according to the present embodiment (for example, the pen-type electronic apparatus 1), information obtained by analyzing the above information, and information manually input as described above may be able to be shared by various devices through wireless communication (network). By way of example, a pre-registered friend, parent, and the like are shared.

Figure 34:
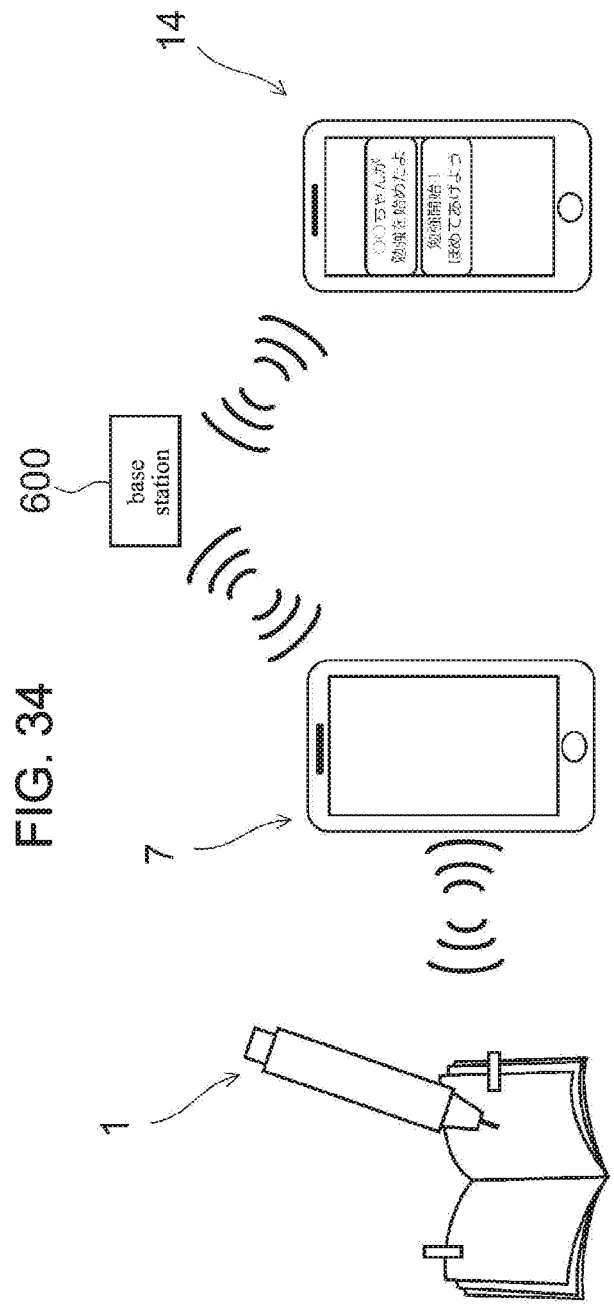
FIG. 34 is a schematic view showing an example of information sharing.

FIG. 34 is a schematic view showing an example of information sharing.

For example, the information acquired by the electronic apparatus according to the present embodiment (for example, the pen-type electronic apparatus 1) is sent to the mobile terminal 7 through wireless communication, and is shared by the mobile terminal 14 of a friend or parent from the mobile terminal 7 via the base station 600 of the network. The information to be shared includes information (message, guidance, etc.) notified from a terminal such as a smart phone, a tablet, or a game machine, the Web, the electronic apparatus according to the present embodiment, a pen-shaped device, or the like.

Ordering and ranking based on the information acquired from the electronic apparatus according to the present embodiment (for example, the pen-type electronic apparatus 1), information obtained by analyzing the above information, and information manually input as described above may be performed.

Figure 35:
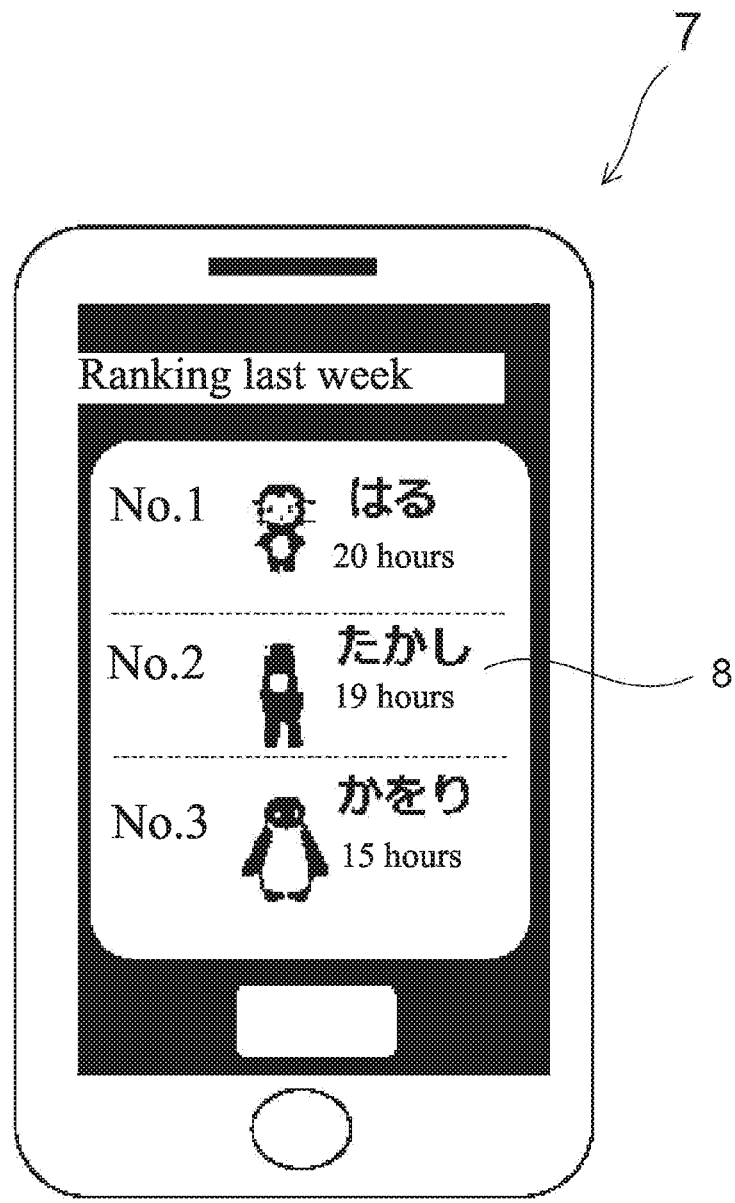
FIG. 35 is a schematic view showing an example of a ranking display.

FIG. 35 is a schematic view showing an example of a ranking display.

In this example, a ranking is displayed on a display 8 of the mobile terminal 7. The ranking display may be a ranking with a friend obtained through the network, may be a ranking with people all over the country, or may be a ranking with one's own past records.

The information acquired from the electronic apparatus according to the present embodiment (for example, the pen-type electronic apparatus 1), information obtained by analyzing the above information, and information manually input as described above may be aggregated via a network.

Figure 36:
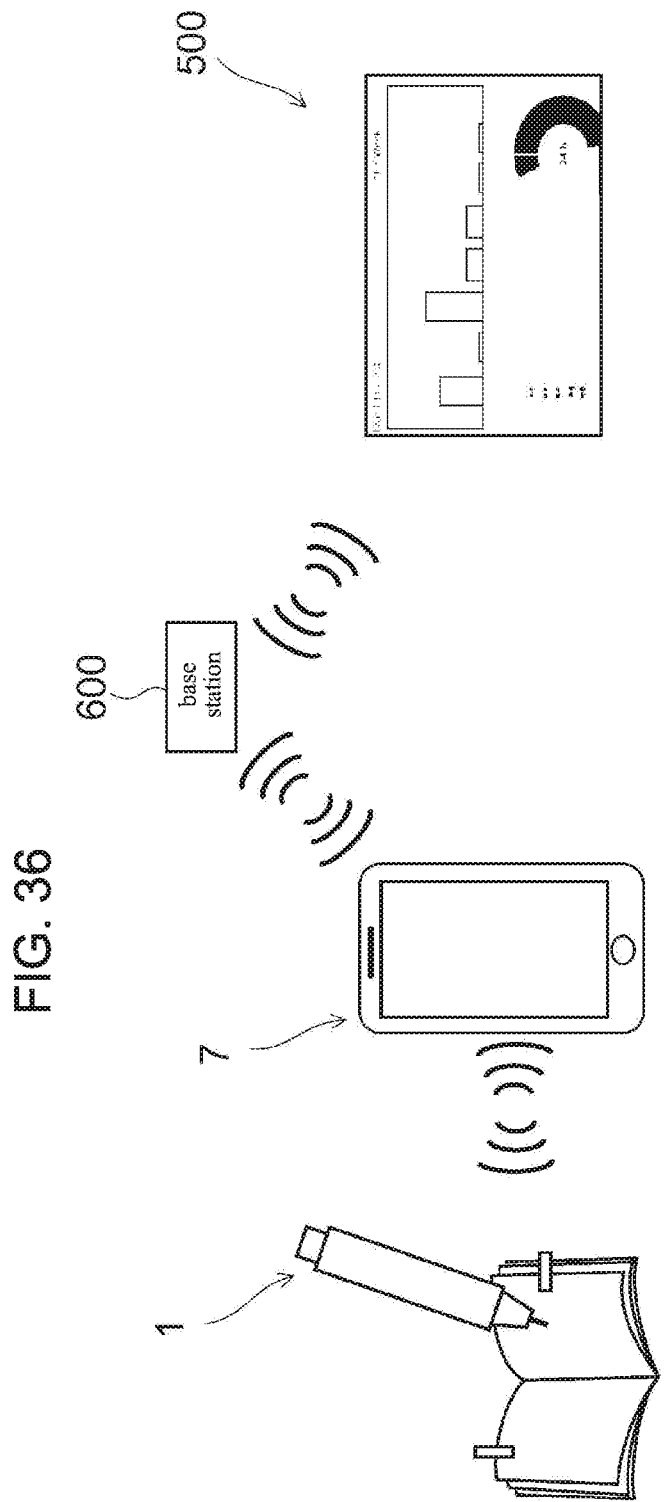
FIG. 36 is a schematic view showing an example of information aggregation.

FIG. 36 is a schematic view showing an example of information aggregation.

The information acquired by the electronic apparatus according to the present embodiment (for example, the pen-type electronic apparatus 1) is sent to the mobile terminal 7 through wireless communication, and is sent to a specific terminal 500 from the mobile terminal 7 via the base station 600 of the network. The information sent to the specific terminal 500 can be aggregated and confirmed as statistical information.

The information aggregated in this way can be confirmed by, for example, the terminal 500 of a cram school or a parent. Even if the cram school or the parent does not have the electronic apparatus according to the present embodiment, the information can be referred to by registering the electronic apparatus or the user who has registered the electronic apparatus in advance.

Figure 37:
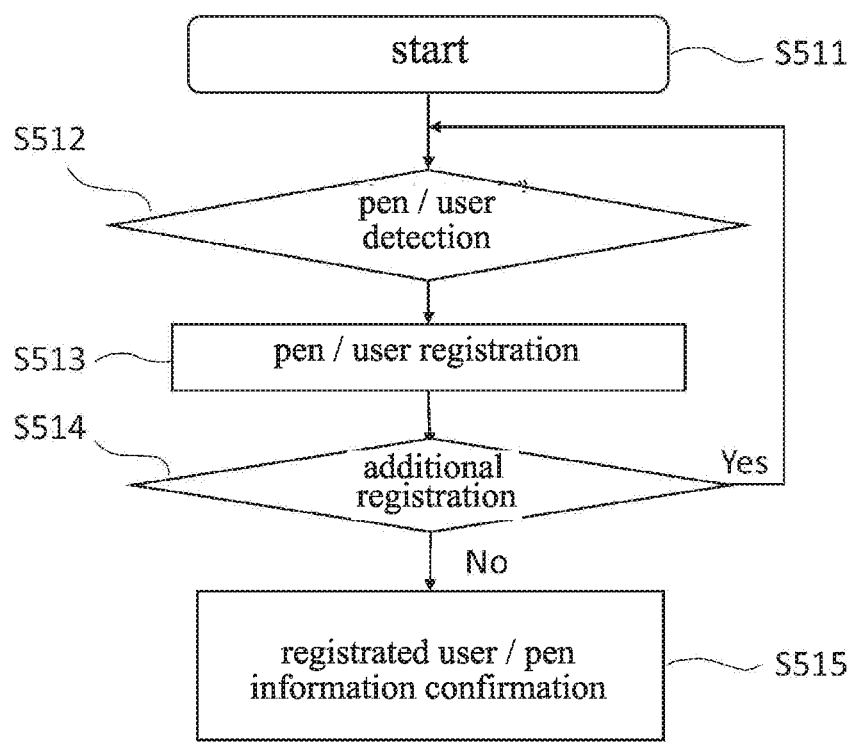
FIG. 37 is a flowchart showing an example of information confirmation processing.

FIG. 37 is a flowchart showing an example of information confirmation processing.

First, when processing is started (step S511), the electronic apparatus according to the present embodiment (for example, the pen-type electronic apparatus 1) or the user is detected (step S512). When the apparatus or the user is detected, the pen or the user is registered (step S513). Next, it is determined whether or not there is an additional registration (step S514). If there is an additional registration, the processing returns to step S512, and the subsequent processing is repeated. If there is no additional registration, information of the registered pen or the user is confirmed (step S515).

Further, people connected via a network may be able to mutually send feedback. For example, a friend, a parent, a cram school or the like presses a button indicating some manifestation of intention. By pressing the button indicating the manifestation of intention, it is shown to the user of the electronic apparatus according to the present embodiment. A merit on the raising game may be obtained by the manifestation of intention. For example, an item may be obtained when the number of the obtained manifestations of intention exceeds a predetermined value, and on the game, the user who obtained the manifestation of intention and the user who sent the manifestation of intention may defeat an enemy together.

Further, the raising of the characters or the like on the software and games using the software have a free part, a pay part, or both.

When both of the free part and the pay part coexist, a merit can be got when charging (paying money).

Examples of the merit are as follows.

(1) An egg can be hatched quickly.
(2) A plurality of eggs can be hatched.
(3) A character or the like grows quickly.
(4) A plurality of eggs or characters grow.
(5) A point can be obtained.
(6) The proportion of obtaining the point increases.

A character or the like raised by itself on the software may be delivered to one's hand as an actual object such as a toy or stationery by transmitting the information to the outside by some method such as through the Internet. An example of the toy is a stuffed toy, and an attached character or the like raised on the software may be not a software but may be delivered to one's hand as an actual item. Also, the stationery is, for example, a pencil case or a pen on which the character is printed. In addition, there are no restrictions on the type of product, such as daily necessities or vehicles such as bicycles.

Figure 38:
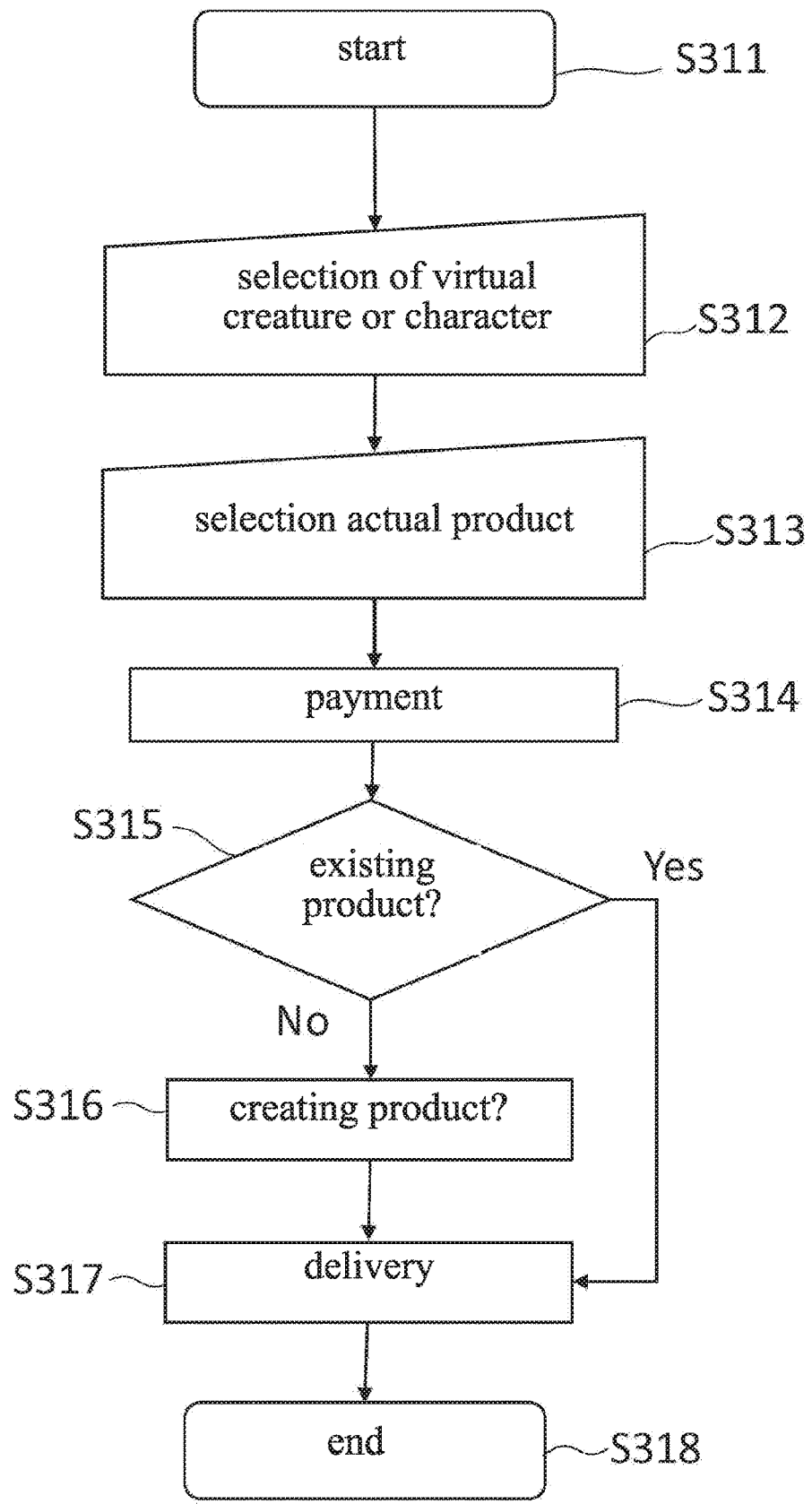
FIG. 38 is a flowchart showing an exchange processing for an actual object.

FIG. 38 is a flowchart showing an exchange processing for an actual object.

When the processing is started (step S311), a character or the like on the software is selected (step S312), and then an actual product is selected (step S313). Next, a payment processing is performed (step S314).

Next, it is determined whether or not the selected product is an existing product (step S315). If there is an existing product, the product is delivered (step S317). If there is no existing product, the product is created (step S316) and delivered (step S317).

Further, on the software, the number of the possessed eggs, the number of characters or the like, and the number of characters or the like that can be raised simultaneously may be limited. Thereby, a motivation to quickly hatch from the eggs and raise the creatures occurs. Moreover, if the upper limit can be increased by charging, a motivation for charging occurs.

In addition, the number of characters or the like on the software that are hatched from eggs, grow, become stronger, live longer, change personality, change nature, evolve, and can be raised at the same time may be changed depending on the point system. It is possible to convert the information on use frequency, number of times of use, use amount, use method, the way of making a movement of a pen-type or grip-type electronic apparatus, a touch type display, or a pressure-sensitive underlay, or the information of locus into points and decide how to use each of them. For example, it is possible to decide such as using a point in hatching from eggs and using a point to improve the personality. Further, if the point can be bought by charging, the motivation for charging will increase.

On a display provided on a pen-type or grip-type electronic apparatus, or on a display of an auxiliary apparatus or a mobile terminal (smart phone, tablet, etc.), it is possible to refer to the state of change of the character on the software.

Figure 39:
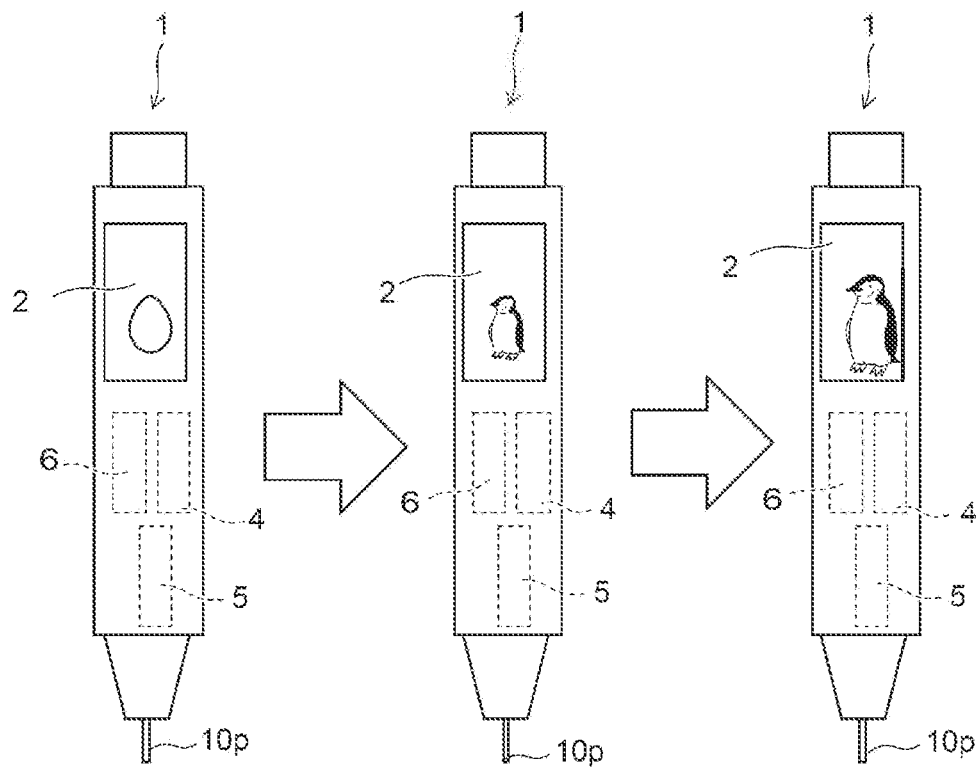
FIG. 39 is a schematic view showing an example of displaying the state of growth.

FIG. 39 is a schematic view showing an example of displaying the state of growth. In this example, it is displayed on the display 2 of the pen-type electronic apparatus 1, but the same applies to the display of other electronic apparatus. Here, changes such as hatching from an egg, a character or the like growing and evolving on the display 2 are sequentially displayed at predetermined time intervals. Further, the changes may be sequentially displayed by a predetermined button operation.

Figure 40:
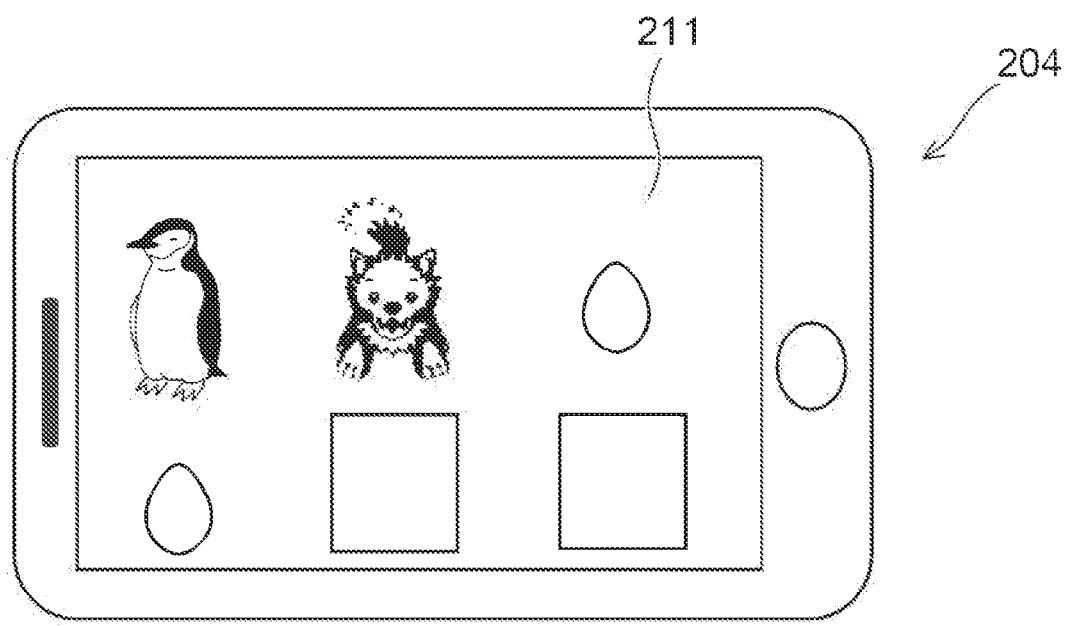
FIG. 40 is a schematic view showing an example of a collection display.

In addition, the electronic apparatus or the like may be provided with a function capable of storing the characters or the like on the software and confirming the state of collection. FIG. 40 is a schematic view showing an example of a collection display. In this example, the images of the stored characters or the like are listed on the display 211 of the mobile terminal 204.

A character or the like on the software itself, an egg, a point for growth, etc. can also be sold by attaching them to an actual object such as stationery such as a pencil and mechanical pencil lead, or a book such as problems collection and textbook, etc. Further, it may be sold with not only stationery or book but also food or daily necessities, etc. When selling with an actual object, the object itself has been attached with a password or a bar code or the like. The password or the bar code or the like may be reflected on the software by being read in a pen-type electronic apparatus, a grip-type electronic apparatus, a smart phone, a tablet, a dedicated terminal or the like.

In addition, when the problem is solved and the answer is entered and the answer is correct, the character itself or the like or point may be given.

The pen-type electronic apparatus 1 does not have an individual power switch, and may have a function of turning on the power by shaking the knock part 3 for putting in/taking out a pen lead or the like, or the pen-type electronic apparatus 1 itself. Further, when there is no change in acceleration or no movement such as knocking or clicking for a certain period of time, a function of automatically turning off the power may be provided.

Figure 41A:
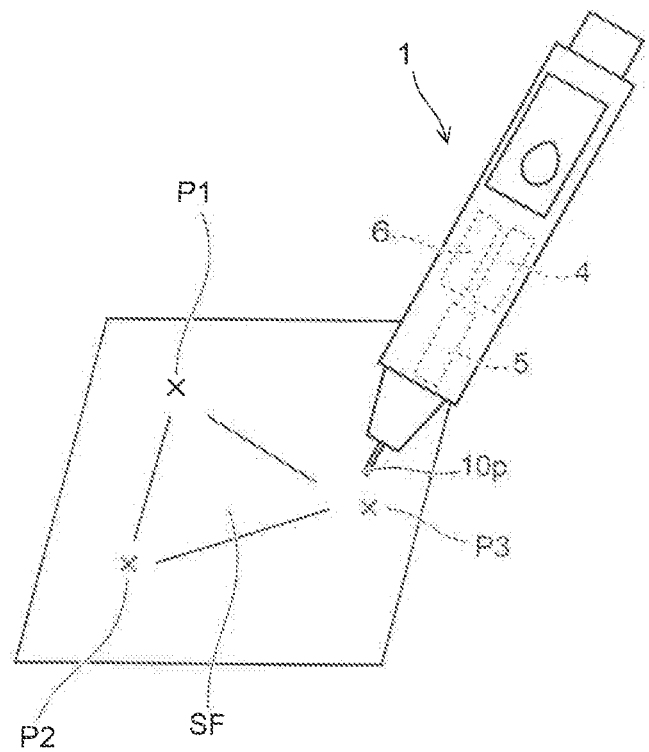
FIG. 41(a) and FIG. 41(b) are schematic views illustrating the distinction between writing actions.
Figure 41B:
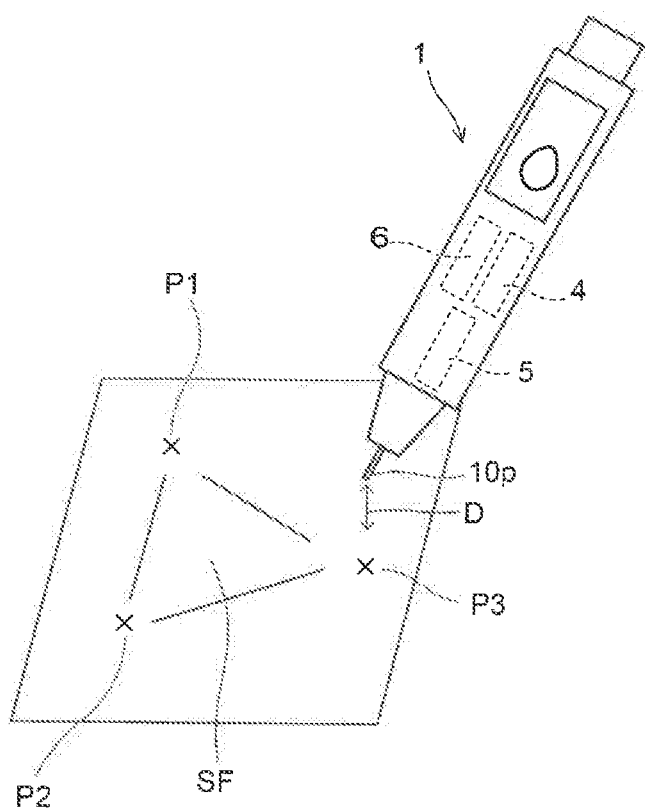

FIGS. 41 (*a*) and (*b*) are schematic views illustrating the distinction between writing actions.

In the electronic apparatus according to the present embodiment, the control part 41 distinguishes between a writing action and a non-writing action. As an example, the control part 41 distinguishes writing actions as follows.

First, as shown in FIG. 41 (*a*), the control part 41 detects a certain plane surface SF from a detection value by the sensor 6. For example, the plane surface SF is detected using the principle that a plane surface is formed when joining three points (P1, P2, and P3) of three-dimensional coordinates read by the sensor 6 or three or more points.

When the coordinates of the pen tip 10*p* are on the plane surface SF according to the detection value of the sensor 6, it is distinguished from the writing action. Further, as shown in FIG. 41 (*b*), when the coordinates of the pen tip 10*p* is within a certain distance D from the plane surface SF, it is also distinguished from the writing action.

On the other hand, when the coordinates of the pen tip 10*p* become a movement in a three-dimensional direction different from the detected plane surface SF and is separated beyond the certain distance D, the movement is determined to be not treated as a writing action. The certain distance D in the three-dimensional direction is, for example, 10 cm.

Further, when the same action with a certain period, a certain direction, and a certain distance is performed for a long distance and for a long time, it may be determined not to be treated as a writing action. The long distance is, for example, 10 cm, and the long time is, for example, 5 seconds.

For example, instead of writing a letter, when drawing several circles that do not have any meaning, it is not treated as a writing action that enables point acquisition and the raising of character. This is discriminated from a situation in which there is little change in acceleration and the state continues for a certain period of time. Further, even when the acceleration vector is directed in a certain direction or when the edge is repeatedly moved up and down, the change in the acceleration vector continues at a fixed interval. This case is not treated as a writing action.

When a plurality of people use the same electronic apparatus, distinctions in characters or the like on software or points for each person are, for example, performed as below.

Figure 42:
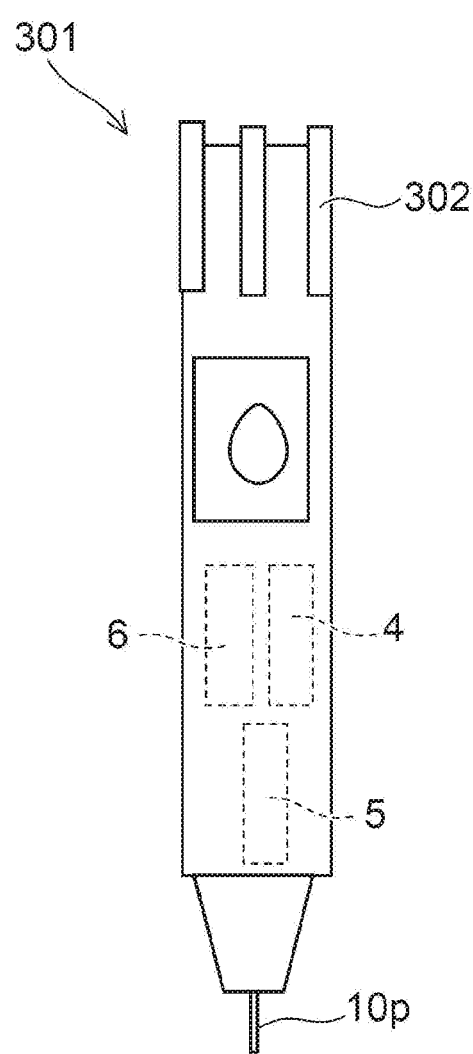
FIG. 42 is a schematic view illustrating the distinction of users of electronic apparatus.

(1) FIG. 42 is a schematic view illustrating the distinction of users of electronic apparatus. As the pen-type electronic apparatus 301 shown in FIG. 42, a knock part for identification 302 is provided. For example, a user (person/individual) is distinguished by providing a plurality of knock portions of the pen tail or rotating a part of the pen, as a multifunctional ball point pen (multicolor ball point pen).

(2) When writing a letter or drawing a picture, the user (person/individual) is distinguished by the peculiarity of the movement and the peculiarity of the letter. Here, "peculiarity" refers to a movement speed, a moving interval, a cycle, handwriting, and the like of a pen when writing a letter or drawing a picture, and each of them is information having an individual-specific change pattern. Information corresponding to the above-mentioned "peculiarity" is calculated by the control part 41 from the value related to the movement detected by the sensor 6, and similarity determination and pattern matching with the information of the "peculiarity" of the individual registered in advance are performed. Thereby, the user (person/individual) is distinguished.

Further, a pen-type, grip-type, or panel-type electronic apparatus may have a function of controlling the movement of the software by discriminating a specific movement or a specific locus. By way of example, the lock is released only when a specific movement is made, and the used information can be accumulated or transmitted.

Further, by tracing a specific pattern (password) or the like, a character or the like on the software may be obtained, raised, grown, or a point may become available.

Further, the user (person/individual) may be identified by performing a specific movement (for example, the way of swinging a pre-registered electronic apparatus).

Figure 43:
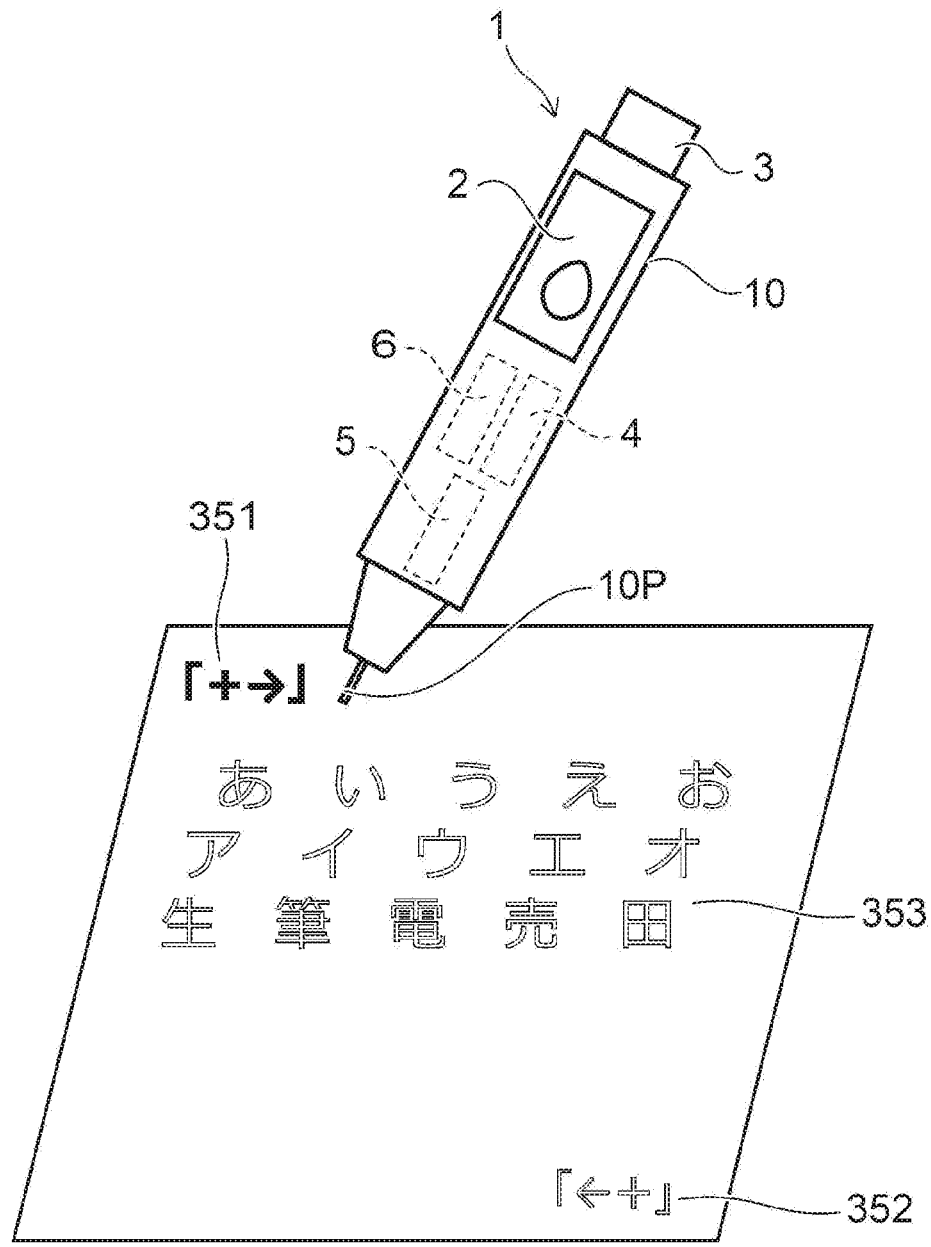
FIG. 43 is a schematic view for explaining association between a pen-type electronic apparatus and letter information.

FIG. 43 is a schematic view for explaining association between a pen-type electronic apparatus and letter information.

Figure 44:
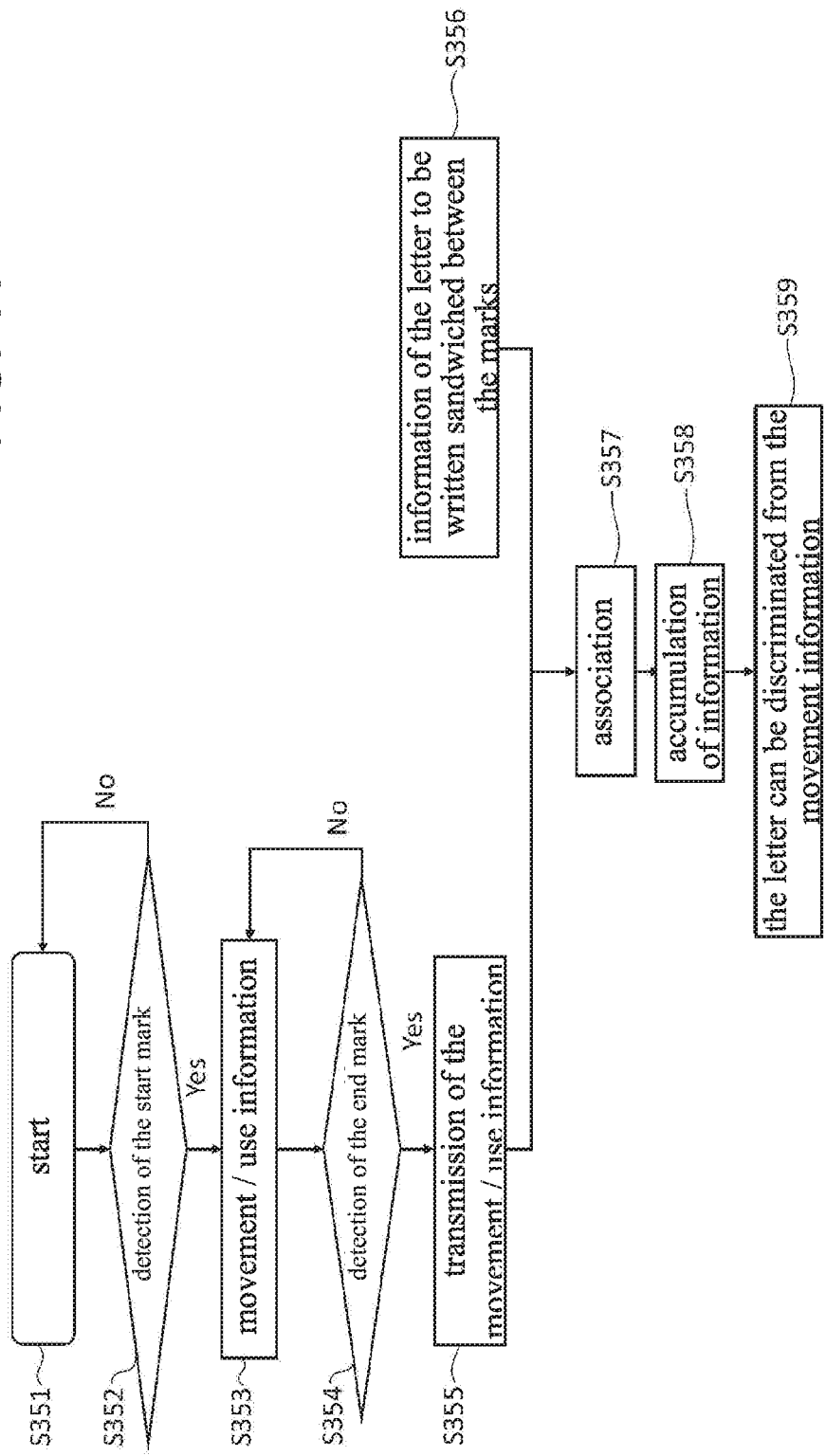
FIG. 44 is a flowchart for explaining association between a pen-type electronic apparatus and letter information.

FIG. 44 is a flowchart for explaining association between a pen-type electronic apparatus and letter information.

By using the pen-type electronic apparatus 1 according to the present embodiment, electronic information (text data) of a letter or a symbol can be automatically obtained from the writing action detected by the sensor 6.

Specifically, when the letter or the symbol is written using the pen-type electronic apparatus 1, the information of movement detected by the sensor 6 is accumulated. Then, by associating the information with the text data, when a writing action is performed with the pen-type electronic apparatus 1, text data of the letter or the symbol corresponding to the writing action is detected and converted into text data.

In order to facilitate the association between the writing action and the text data, as shown in FIG. 43, a start mark 351 and an end mark 352 are placed on paper or the like, and letters for tracing from above are provided. The user starts the detection by tracing the start mark 351 with the pen-type electronic apparatus 1.

After tracing the start mark 351, the user sequentially traces the letters 353 provided in advance with the pen-type electronic apparatus 1. For example, it is assumed that " あ (Japanese character)" is provided as the first letter and is traced. The detection value by the sensor 6 is associated with the text data of "あ (Japanese character)". Similarly, by tracing a plurality of letters, information of association between the detection value of the sensor 6 and the text data is accumulated. At the stage where the user traces the end mark 352, the data accumulation is finished.

The processing of data accumulation and letter discrimination will be described with reference to FIG. 44.

This processing is realized by a program processing executed by the control part.

First, the processing is started (step S351). When the start mark is detected (step S352), the movement/use information of the writing action is acquired by the sensor 6 (step S353). This action is repeated until the end mark is detected (step S354).

After the end mark is detected, the movement/use information of the writing action acquired by the sensor 6 is transmitted to the server 161 or the like (step S355). Next, the transmitted movement/use information of the writing action is associated with the information (text data) of the letter to be written sandwiched between the start mark and the end mark (step S356, S357), and the associated information is accumulated (step S358).

By accumulating information of the association between the movement/use information of the writing action and the text data, the text data of the letter can be discriminated from the information of the sensor 6 when the writing action is performed using the pen-type electronic apparatus 1 (step S359).

With such a utilization method, the pen-type electronic apparatus 1 according to the present embodiment can be provided with a function such as OCR (Optical Character Recognition). For example, using a notebook with faint letters like a Kanji character exercise book, information of the association between the information of the movement of the writing action of letters using the pen-type electronic apparatus (detection value by the sensor 6) and the text data known in advance is accumulated. Using this information of association as a database, text data corresponding to the writing action can be obtained from the writing action using the pen-type electronic apparatus 1.

With respect to the software using the electronic apparatus according to the present embodiment (for example, the pen-type electronic apparatus 1), a raising game using the software can benefit from connection with another electronic apparatus or others (such as registration on the software). For example, the following can be considered.

(1) When studying at the same time or near time, such as within one hour before and after, it will be advantageous for quickly raising the virtual creature and fighting against virtual enemies.

(2) When registration is made, cooperation will be obtained at the time of fighting against the virtual enemies on the software.

(3) Points and items can be obtained depending on the registration or non-registration and the number of registered people.

With respect to the software using the electronic apparatus according to the present embodiment (for example, the pen-type electronic apparatus 1), a raising game using the software can have a function of starting in a specific environment.

For example, when a notebook for learning is discriminated with a camera of the smart phone, a game using Augmented Reality (AR) can be played thereon.

Alternatively, the pen-type electronic apparatus 1, a smart watch or the like is read and a game related to the electronic apparatus is played.

With respect to the information to be acquired by the electronic apparatus according to the present embodiment (for example, the pen-type electronic apparatus 1), the acquisition cycle thereof may not always be the same cycle. Specifically, in the control part, when writing information including at least any of the writing frequency, the number of times of writing, the writing amount, the carefulness of the letter, the writing speed, the writing acceleration, the writing angle (the angle of the pen), the writing angle and the pressure at the time of writing is acquired, a plurality of acquisition modes with different sampling frequencies may be switched. For example, a first acquisition mode in which writing information is acquired at a first number of times of sampling per certain time may be switched with a second acquisition mode in which writing information is acquired at a second number of times of sampling less than the first number of times of sampling per certain time. Further, when three or more acquisition modes are switched, the first acquisition mode, the second acquisition mode, . . . , and the n-th acquisition mode (N is a natural number) are prepared and these modes may be switched.

Thereby, a period of acquiring information with high frequency and a period of acquiring information with low frequency are mixed.

Figure 45:
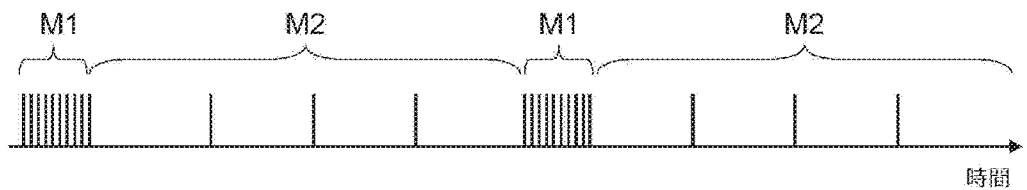
FIG. 45 is a schematic view showing an example of switching of acquisition mode.

FIG. 45 is a schematic view showing an example of switching of acquisition mode.

In FIG. 45, the horizontal axis indicates time, and one vertical line indicates the acquisition timing of one time of writing information.

When information is acquired with a high frequency (the first acquisition mode M1), for example, a sampling frequency of about 50 Hz to 5000 Hz is assumed. On the other hand, when information is acquired with a low frequency (the second acquisition mode M2), a sampling frequency of about 0.01 Hz to 50 Hz is assumed. The high frequency (the first acquisition mode M1) and the low frequency (the second acquisition mode M2) may be switched periodically, or may be switched not periodically but with randomness.

Further, information acquisition itself may be performed at certain intervals, and the frequency may be changed when information is accumulated or data is transmitted.

Moreover, the kind of data acquired may be changed for each time. For example, at a certain timing, all the acceleration data of the X axis, the Y axis, and the Z axis are acquired, and at another timing, the acceleration data is acquired only for the X axis and the Y axis.

From these changes in cycle, there can be considered uses for different purposes as follows. For example, learning subjects and letters are discriminated in a high frequency period (the first acquisition mode M1), and a learning time is measured at a low frequency (the second acquisition mode M2).

Thereby, both the acquisition of information necessary for processing and the reduction of the amount of data can be achieved.

With respect to the software using the electronic apparatus according to the present embodiment (for example, the pen-type electronic apparatus 1), a function of analyzing learning frequency, learning amount, learning speed, concentration data, etc. for each accumulated learning subject, and proposing a better learning method from the analyzed data can be provided.

For example, if the study time of Japanese language is short, the study of Japanese language will be urged, and if the concentration is lost, a rest will be promoted. Further, this behavior may be input by a parent or a cram school, or may be automatically discriminated by A.I. or the like.

The learning record can also be linked to the improvement of the grades. In this case, it is assumed that the result of the periodic test or the like is input by himself/herself, a guardian, or a cram school. Further, it is also assumed that the correct answer of each question is linked. In this case, the information input by himself/herself, a guardian or a cram school, or information such as a circle mark or a cross mark is read. A mark sheet may be read.

Figure 46:
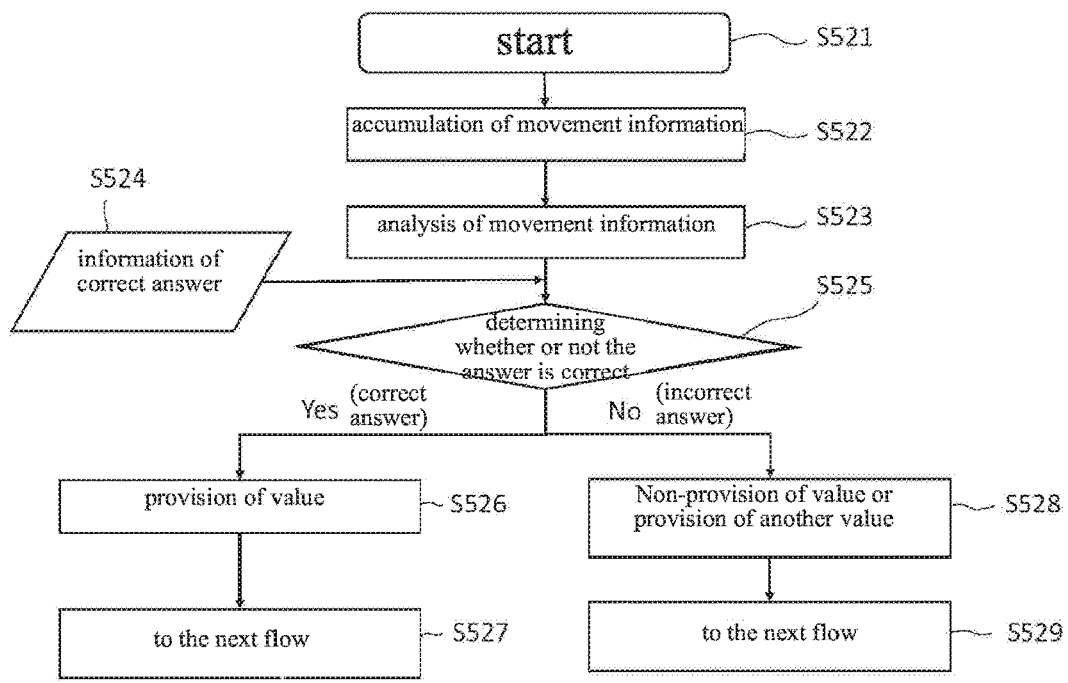
FIG. 46 is a flowchart showing an example of correct answer confirmation processing.

FIG. 46 is a flowchart showing an example of correct answer confirmation processing.

First, when the processing is started (step S521), the information of movement read by the sensor 6 is accumulated (step S522), and the movement information is analyzed (step S523).

Next, information of the correct answer is read in from the database (step S524), and the information obtained from the analysis result of the information of movement is compared with the information of the correct answer to determine whether or not the answer is correct (step S525).

If the answer is correct in this determination, a predetermined value is provided (step S526), and the processing proceeds to the next processing (step S527). For example, in the case of a correct answer, the raising speed increases, and many items or points can be obtained. On the other hand, if the answer is not correct, the predetermined value is not provided or another value is provided (step S528), and the processing proceeds to the next processing (step S529). By such processing, the learning record and the improvement of grade can be linked.

With respect to the software using the electronic apparatus according to the present embodiment (for example, the pen-type electronic apparatus 1), a function of identifying the carefulness of the letter, and the speed, the angle, the way of holding the pen can be provided. Further, information of a person writing a careful letter and a person writing a beautiful letter is accumulated, and the data can be discriminated by analyzing the data by machine learning or the like and comparing with the data.

With respect to the software using the electronic apparatus according to the present embodiment (for example, the pen-type electronic apparatus 1), it is possible to have a function of setting a goal by using the information acquired by the electronic apparatus (writing time, study time, etc.), the discriminated writing type (information such as a mark sheet, a language, a learning subject, carefulness of a letter, and ranking), or the graphed information, and calculating back from the desired occupation or the desired university.

For example, it is possible to grasp the study amount of a student in the University of Tokyo during his/her high school days, and set a daily study amount goal with that goal for high school students. Further, for example, if one desires to be a programmer, a teaching material for programming may be provided in addition to the necessary information such as mathematics and arithmetic. These indexes serving as goals may be sent via a network or may be set by himself/herself.

With respect to the software using the electronic apparatus according to the present embodiment (for example, the pen-type electronic apparatus 1), it is possible to have a function linking a raising game with the learning record/the content of the learning record. Examples are shown below.

(1) An occupation is given to a virtual creature on the software, and the virtual creature becomes stronger by learning the subjects related to that occupation.

(2) An occupation is given to a virtual creature on the software, and the virtual creature will not be born without learning the subjects related to that occupation.

(3) The virtual places on the software where the virtual creature on the software can go cannot be released or reached without learning for a certain time.

(4) The virtual places on the software where the virtual creature on the software can go cannot be reached without learning a certain subject.

(5) The items that the virtual creature on the software can get vary depending on the subject that has been learned.

With respect to the software using the electronic apparatus according to the present embodiment (for example, the pen-type electronic apparatus 1), it is possible to have a function of disabling or limiting the software when a certain time, a certain period or a certain flow is ended.

Figure 47:
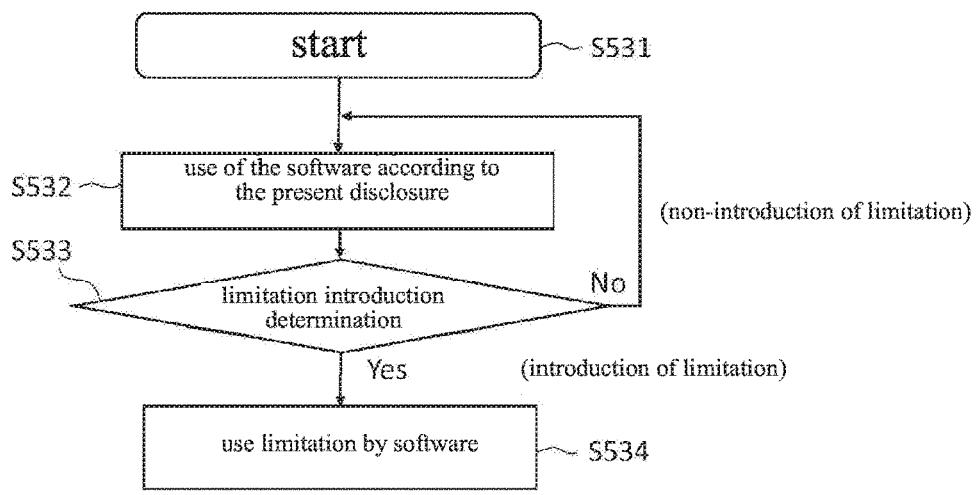
FIG. 47 is a flowchart showing an example of limitation function processing.

FIG. 47 is a flowchart showing an example of limitation function processing.

First, when the processing is started (step S531), the use of the software according to the present embodiment is permitted (step S532). Next, a limitation introduction determination is performed (step S533) to determine whether or not the limitation is introduced. If the limitation is not introduced, the processing returns to step S532 and the use of the software according to the present embodiment is continued. On the other hand, if the limitation is introduced, the processing proceeds to step S534 and the use of the software is limited.

It is to be noted that, when the software according to the present embodiment is used until a certain time, a certain period, or a certain flow is ended, the use of the smart phone itself or the game machine itself may be limited. The limitation is, for example, requesting an input of a password, or the like.

The electronic apparatus according to the present embodiment (for example, the pen-type electronic apparatus 1) may be attached with a heart rate monitor element at the grip portion thereof to measure the heart rate.

Specifically, the control part acquires biological information including at least any of blood flow and heart rate of the user in addition to the writing information. Thereby, the concentration of the user can be measured by using at least any of the writing information and the biological information.

The writing pressure may be able to be acquired by the electronic apparatus according to the present embodiment (for example, the pen-type electronic apparatus 1). By doing so, it is possible to accurately discriminate whether or not a letter is written, and it is also possible to accurately know the start and end of writing. In addition, it is possible to acquire information of the strength of writing pressure, which can be used to feed back the carefulness of the letter and a better way of writing. As means for acquiring the writing pressure, for example, a pressure sensor or a strain sensor may be disposed near the pen tip 10p as the sensor 6.

The strength of grasping may be able to be acquired by the electronic apparatus according to the present embodiment (for example, the pen-type electronic apparatus 1). To take the strength of grasping, for example, a pressure sensor or the like may be disposed to the grip portion.

The concentration of the user may be able to be discriminated by using the electronic apparatus according to the present embodiment (for example, the pen-type electronic apparatus 1). Further, the discriminated concentration may be fed back to himself/herself, the parent or the cram school, etc. Learning can be improved based on this information. The discrimination of concentration may analyze the movement of the pen, and may use the information of the heart rate, the writing pressure, and the strength of grasping as described above.

By using the electronic apparatus according to the present embodiment (for example, the pen-type electronic apparatus 1), when a so-called pen turning action is performed, a function of reading the movement and discriminating a technical name or scoring may be provided.

Figure 48:
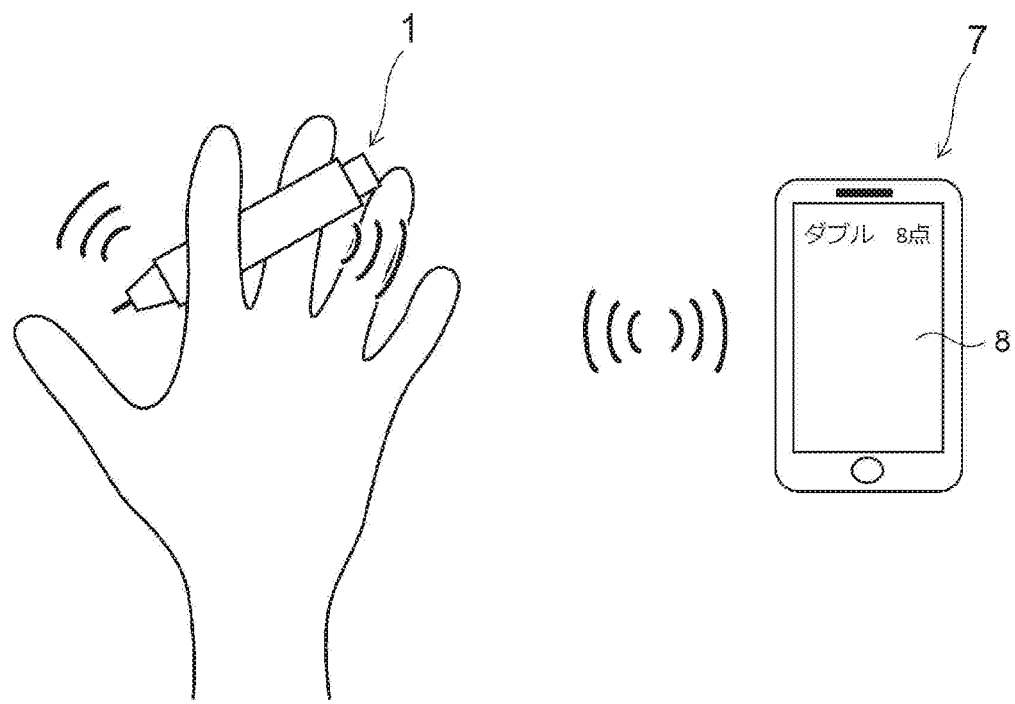
FIG. 48 is schematic view showing an example of scoring of a pen turning action.

FIG. 48 is schematic view showing an example of scoring of a pen turning action.

For example, if an acceleration sensor, a gravitational acceleration sensor or the like used as the sensor 6 of the pen-type electronic apparatus 1 is used, it is possible to detect how many times and at what angle the pen has rotated. The pen-type electronic apparatus 1 or the mobile terminal 7 has a function of analyzing the information, discriminating the technical name, and scoring the goodness.

As a substitute for the electronic apparatus according to the present embodiment, a smart watch, a ring-type device or a band-type device can be used. In this case, it is possible to use an existing electronic apparatus, although the accuracy is inferior to the case of attaching to a pen. Further, in a device having a shape wound around the wrist, it is possible to acquire information of hand muscles and muscle movement and use the information for action detection. Further, in the device having the shape wound around the wrist, a sensor which acquires blood flow and heart rate simultaneously can be provided.

The electronic apparatus (for example, a pen-type electronic apparatus 1) according to the present embodiment may have a built-in speaker.

Figure 49:
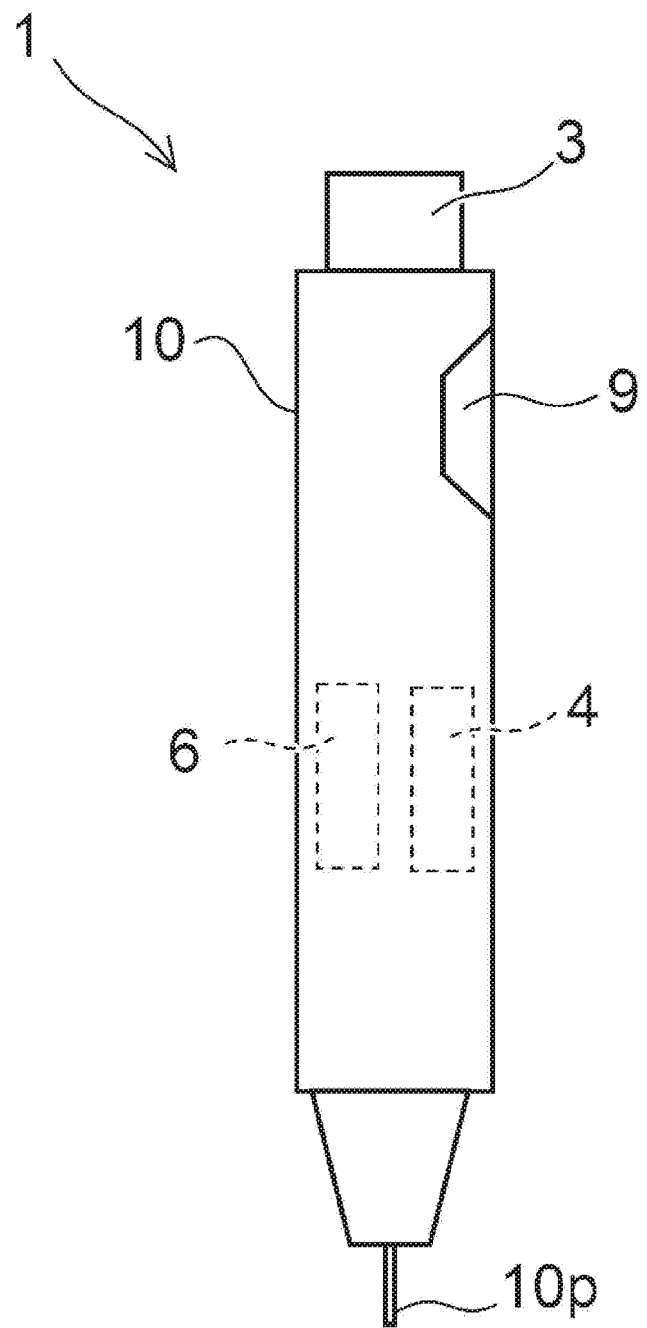
FIG. 49 is a schematic view showing an example of an electronic apparatus containing a speaker.

FIG. 49 is a schematic view showing an example of an electronic apparatus containing a speaker.

For example, a speaker 9 is built in the main body 10 of the pen-type electronic apparatus 1. Thereby, sound, voice, music, etc. can be played from the speaker 9. With the built-in speaker 9, when electronic apparatus according to the present embodiment such as the pen-type electronic apparatus 1 is used, it is possible to play sound effects, play music to increase the motivation for studying, and be called from a character by sound or voice.

The electronic apparatus according to the present embodiment (for example, the pen-type electronic apparatus 1) may have a function of combining a static image or a moving image distributed from a server via a network and data acquired by the electronic apparatus. This function may be provided to a server connected to the network.

Figure 50:
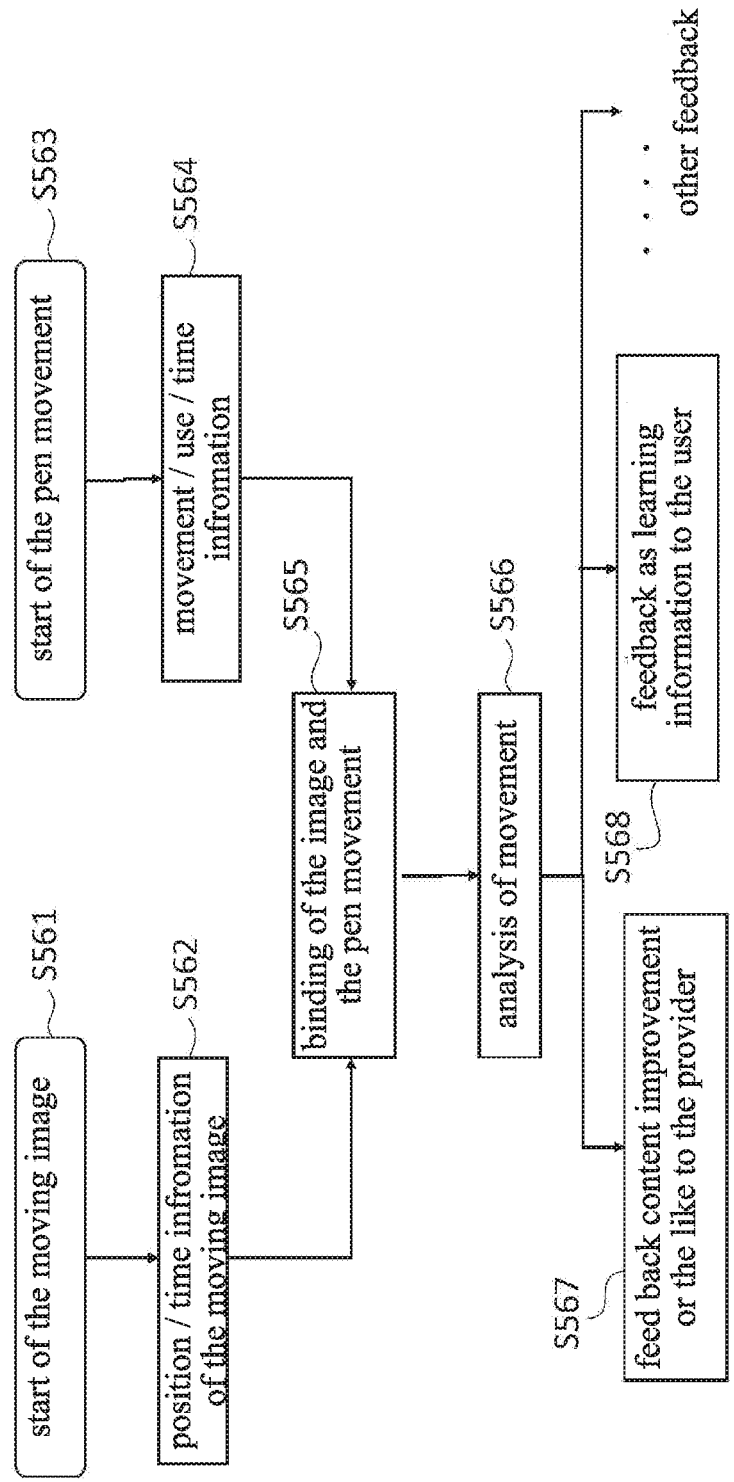
FIG. 50 is a flowchart showing an example of a binding processing of a moving image with a movement of a pen.

FIG. 50 is a flowchart showing an example of a binding processing of a moving image with a movement of a pen.

First, when the distribution of the moving image is started (step S561), the position and time information of the moving image are acquired (step S562). On the other hand, when the movement of the pen-type electronic apparatus 1 which is an example of the electronic apparatus starts (step S563), the movement of the pen, use state and time information are acquired (step S564).

Next, the time of the moving image acquired in step S562 and the time of the movement of the pen acquired in step S564 are associated with each other so that the information of the moving image and the movement of the pen is bound (step S565).

Next, analysis of the movement of the pen (letter type, carefulness, etc.) is performed (step S566). Then, in order to use the analysis result for content improvement or the like, it is fed back to the provider who distributed the moving image (step S567), or fed back as learning information to the user of the electronic apparatus (step S568), or other feedback is performed.

By such processing, it is possible to grasp the relationship between the moving image and the movement of the pen such as in which part of the moving image the pen moves or the letter is written. Thereby, for example, it is possible to obtain information such as which part of the moving image is intensively studied, and conversely which part of the moving image is ignored. Based on this information, for example, an educational provider can improve the moving image.

It is to be noted that, in the present embodiment, since the movement of the pen and the moving image can be associated with each other, for example, a gesture can be recognized from the movement of the pen and the moving image can be controlled according to the recognized gesture. For example, when it is determined that the pen has not moved for a certain time, a function of automatically stopping the moving image, or a function of controlling actions such as pausing, fast forwarding, and fast returning with a specific pen gesture can be provided.

The electronic apparatus according to the present embodiment (for example, the pen-type electronic apparatus 1) can be used for rehabilitation and cognitive disease prevention. For example, based on a result of detecting and analyzing the movement of the pen, feedback is given to the user by applying vibration to the main body 10 or outputting sound, light, images, or the like. Further, attendants such as nurses, caregivers, or the like can grasp the relationship between the movement of the pen and the situation of rehabilitation or care by sending information such as how much the user of the pen-type electronic apparatus 1 has written and how the hand has moved to the terminal they own.

The electronic apparatus according to the present embodiment (for example, the pen-type electronic apparatus 1) is applicable in the case of signing for identity verification such as when a credit card is used. At this time, the movement of the pen at the time of signing is detected by using the electronic apparatus according to the present embodiment (for example, the pen-type electronic apparatus 1). Thereby, security can be improved, such as prevention of impersonation of a signature.

Figure 51:
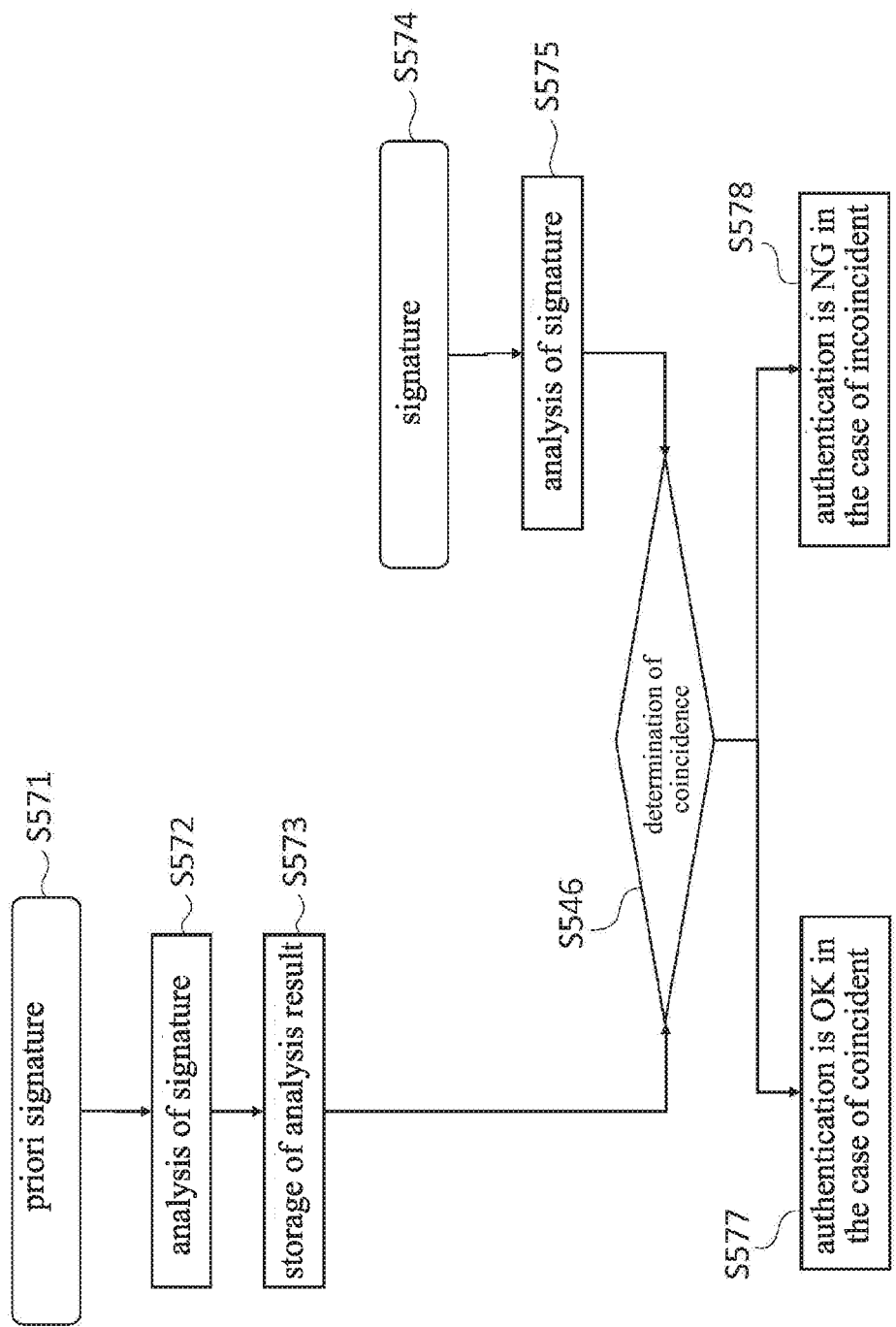
FIG. 51 is a flowchart showing an example of a signature discrimination processing.

FIG. 51 is a flowchart showing an example of a signature discrimination processing.

First, a signature is acquired in advance (step S571). In this processing, in order to register a correct signature, an electronic apparatus according to the present embodiment (for example, the pen-type electronic apparatus 1) is used and a user is asked to write a signature.

Next, the signature is analyzed (step S572). Specifically, information of the movement of the pen when the user writes the signature is detected. The information of the movement of the pen is writing information including at least any of the carefulness of the letter, the writing speed, the writing acceleration, the writing angle (the angle of the pen) and the pressure at the time of writing. This writing information is considered to be the intrinsic information of the user. Then, the analysis result is stored (step S573).

Next, a signature for identity verification is acquired (step S574). Specifically, when a credit card is used, the electronic apparatus according to the present embodiment (for example, the pen-type electronic apparatus 1) is used and the user is asked to write a signature for identity verification.

Next, the signature is analyzed (step S575). This processing detects information of the movement of the pen when a signature for identity verification is written. The information of the movement of the pen is the same as the writing information stored in step S573.

Next, signature matching is discriminated (step S576). Specifically, the degree of coincidence between the writing information of the correct signature stored in step S573 and the writing information of the signature for identity verification analyzed in step S575 is obtained.

When the degree of coincidence exceeds a predetermined value, the signature is coincident and authentication is OK (step S577). If the degree of coincidence is equal to or less than a predetermined value, the signature is not coincident and authentication is NG (step S578).

In a signature discrimination processing using the electronic apparatus according to the present embodiment (for example, the pen-type electronic apparatus 1), the discriminability is higher than that of handwriting collation since writing information (writing information including at least any of a writing direction, a writing speed, a writing acceleration, carefulness of the letter, a writing angle (the angle of the pen) and a pressure at the time of writing) obtained from the movement of the pen is used. For example, in order to mimic the signature of another person, it considered to draw slowly in comparison with the writing speed of the person himself/herself. Further, it is also considered that the angle of the pen and the pressure at the time of writing are different from the person himself/herself. In the present embodiment, even if the same shape as the signature of the person himself/herself is drawn, such writing information is comprehensively judged to determine whether or not said signature is the signature of the person himself/herself. Therefore, discrimination can be performed with higher accuracy in comparison with simple handwriting collation.

It is to be noted that the processing of the coincidence discrimination based on the writing information (step S576) may be performed by A.I., machine learning, deep learning, or the like.

Here, an example of a specific size of the electronic apparatus according to the present embodiment is shown.

It is preferable that the pen-type electronic apparatus 1 and the grip-type electronic apparatus 81 have the following size and weight for a configuration used with hands. One example is 50 cm or less in length and 1 kg or less in weight.

Further, in the pen-type electronic apparatus 1, a position where the sensor 6 for detecting movement is arranged is preferably a position closer to the tip (the side of pen tip 10p) than the center portion of the main body 10, or a position close to the tail of the main body 10 (the side opposite to the pen tip 10p) so that the movement of the pen tip 10p can be easily detected. For example, the sensor 6 is within 5 cm from the pen tip 10p of the main body 10 or within 5 cm from the tail of the main body 10.

As described above, by using the electronic apparatus according to the present embodiment, corresponding to the frequency of the writing action, it is possible to perform an image display in which a character on the software makes some change such as it is born from an egg, grows, becomes stronger, lives longer, changes personality, changes nature, evolves, and so on.

Further, with a software, a pen-type and grip-type electronic apparatus, etc., the carefulness or goodness of the letter, the excellence of the picture or the like may be discriminated, and the information may be used to influence the growth, personality, strength, form, etc. of the characters on the software. For example, when many good pictures are drawn, a pretty creature will be obtained. When many careful letters are written, a gentle personality will be obtained.

Further, a character or the like hatched from an egg or the character itself or the like may be affected. For example, when a picture is drawn, a character of a certain type or form is born, and when a letter is written, a character of another type or form is born.

Further, as the image displayed on the display 2, not only living creatures and characters but also vehicles such as cars and airplanes, inanimate objects such as robots and machines, plants, etc. are included. Further, it may also be a real person or a historical person.

According to the electronic apparatus of the embodiment described above, the following operational effects can be obtained.

(1) By using a pen-type electronic apparatus 1, or a grip-type electronic apparatus 81 and a cap-type electronic apparatus 85a attached to a writing implement such as a pencil, a mechanical pencil, or a ballpoint pen, it is possible to detect with a sensor the movement such as whether or not it is being used, the use frequency, the number of times of use, the use amount, the use method. Thereby, a character or the like on the software grows based on the information read by the sensor. The state of growth of the character or the like can be confirmed by a display attached to the pen, a smartphone, a game machine, a dedicated terminal, or the like. In addition, a game using the character or the like can be performed.

(2) By bringing the pens having the same function close to each other and bringing them into contact with each other, eggs and children are born, and the next character and the like can be raised.

(3) Information can be exchanged between the pen and a dedicated terminal or a smartphone via wired or wireless communication.

(4) The above (1) to (3) lead to the motivation to use the pen, and further, an effect of motivating what is done when studying or drawing a picture is obtained. Further, depending on the way of use, by changing the degree of growth the growth process, personality, nature, or the like of the character, motivation of studying seriously, writing careful letters or the like is obtained.

It is to be noted that although the present embodiment and the application examples (modification examples, specific examples) are described above, the present disclosure is not limited to these examples. For example, although an image is displayed on the display 2 in the present embodiment, sound or voice may be output instead of displaying an image or together with displaying an image. Moreover, as an image displayed corresponding to the frequency of the writing action, letter information or numerical information may be displayed in addition to the character or the like. For example, when the same Kanji character is repeatedly written, it may be recognized that the same Kanji character has been written from the movement of the electronic apparatus, and the number of times the Kanji character has been written may be displayed on the display 2 or may be output by voice. Further, with respect to each of the above-described embodiments or application examples thereof (modification examples, specific examples), appropriate additions, deletions of constituent elements, and design changes by those skilled in the art, as well as appropriate combinations of features of each embodiment are included in the scope of the present disclosure as long as the spirit of the present disclosure is included.

POSSIBILITY OF APPLICATION FOR INDUSTRY

The present disclosure is suitable for use with hands such as a toothbrush, a spoon, a fork, and chopsticks in addition to a writing tool. It is also possible to apply the same system as that of the present disclosure even when a habit such as an alarm clock is required. Further, the software described in the embodiments may be executed by a computer, recorded on a recording medium, or distributed via a network. Further, the software and the application described above can also be realized without using an electronic apparatus such as a pen-type electronic apparatus 1 or a panel-type electronic apparatus 100. For example, typing with a personal computer may be treated as letter information instead of input information of acceleration of such as the pen-type electronic apparatus 1, and the information entered by the stylus in the tablet terminal may be treated as information of letters or pictures. By doing so, even in learning using a personal computer or a tablet, the same effects as in the present embodiment can be obtained, and motivation for study can be increased.

EXPLANATION OF REFERENCE SYMBOLS

1 . . . pen-type electronic apparatus
2 . . . display
3 . . . knock part
4 . . . information processing part
5 . . . battery
6 . . . sensor
7 . . . mobile terminal
8 . . . display
9 . . . speaker
10 . . . main body
10p . . . pen tip
11 . . . first pen-type electronic apparatus
12 . . . second pen-type electronic apparatus
14 . . . mobile terminal
15 . . . power supplying part
16 . . . interface part
17 . . . auxiliary apparatus
17a . . . storage part
18 . . . charging terminal
19 . . . display
20 . . . sensor
21 . . . communication part
22 . . . battery
23 . . . key
41 . . . control part
42 . . . memory
43 . . . communication part
50 . . . image processing part
52 . . . memory
53 . . . control part
56 . . . power switch
59 . . . charging part
60 . . . power supplying part
61 . . . antenna
71 . . . power generation part
80 . . . main body
81 . . . grip-type electronic apparatus
82 . . . sensor
83 . . . memory
84 . . . writing tool
85 . . . cap-type electronic apparatus
87 . . . display
88 . . . battery
90 . . . communication part
91 . . . power supplying part
92 . . . interface part
93 . . . auxiliary apparatus
94 . . . charging terminal
95 . . . power generation part
100 . . . panel-type electronic apparatus
101 . . . writing tool
102 . . . first panel-type electronic apparatus
103 . . . second panel-type electronic apparatus
105 . . . panel part
106 . . . detection part
110 . . . control part
120 . . . memory
150 . . . plate part
151 . . . writing paper
152 . . . panel-type electronic apparatus
153 . . . writing tool
155 . . . sensor
156 . . . memory
157 . . . control part
161 . . . server
162 . . . character
163 . . . character
201 . . . image processing part
204 . . . mobile terminal
205 . . . power switch
208 . . . charging part
209 . . . antenna
211 . . . display
301 . . . pen-type electronic apparatus
302 . . . knock part for identification
351 . . . start mark
352 . . . end mark
353 . . . letter
400 . . . paper
500 . . . terminal
600 . . . base station
C . . . cable
D . . . distance
SF . . . plane surface
P1, P2, P3 . . . point

What is claimed is:

1. An electronic apparatus, comprising:
a pen-type main body having a writing function or a main body attachable to a writing tool;
a sensor provided in the main body for detecting movement of the main body by a user;
a storage part for storing data including image data of an animated character on software or the image data and numeric data; and
a control part for performing control based on a value detected by the sensor;
wherein the control part obtains a frequency of a writing action by discriminating and counting time when change in specific acceleration predetermined as an action not treated as the writing action including a letter occurred, from time when acceleration exceeding a certain value detected by the sensor continued for a certain period of time, and selects data from a database and outputs the data to an output part so that the animated character on software occurs and changes corresponding to the obtained frequency,
wherein the frequency of the writing action comprises at least one of: values indicating a writing frequency, a number of times of writing, a writing amount, and carefulness of a letter by the main body,
and wherein, for the animated character, at least one of: being born from an egg, moving, changing, growing, becoming stronger, living longer, changing personality, changing nature, evolving, calling the user with sound or voice, and playing a sound effect is performed in response to the frequency.

2. The electronic apparatus according to claim 1, wherein the control part performs control to discriminate whether or not the writing action includes the letter by a periodicity of the change in the acceleration data based on the value detected by the sensor.

3. The electronic apparatus according to claim 1, wherein the control part performs control to discriminate a learning subject from characteristics of the change in the acceleration data based on the value detected by the sensor.

4. The electronic apparatus according to claim 1, wherein at least one of: the storage part, the output part and the control part is provided in the main body or an external apparatus.

5. The electronic apparatus according to claim 1, further comprising:
a transmission part provided in the main body for transmitting the frequency to outside; and
a power generation part for generating power by action of the main body.

6. The electronic apparatus according to claim 1, further comprising:
a reception part for receiving other data sent from outside,
wherein the sensor detects a specific action of the main body other than the writing action including the letter,
and wherein the control part stores the other data received by the reception part in the storage part when detecting the specific action by the sensor.

7. The electronic apparatus according to claim 1, wherein the control part performs control to transmit information of the frequency to outside when it is discriminated that a movement is a specific movement from characteristics of the change in the acceleration data based on the value detected by the sensor.

8. The electronic apparatus according to claim 1, wherein the control part discriminates type of content written by the user from characteristics of the change in the acceleration data based on the value detected by the sensor, and performs control to graph and display at least one of: learning time, learning subject, concentrated time and a time for writing careful letters on the display based on the type of writing discriminated.

9. The electronic apparatus according to claim 1, wherein the control part distinguishes a user by matching an individual-specific change pattern and a writing movement pattern of an individual registered in advance from characteristics of the change in the acceleration data based on the value detected by the sensor.

10. The electronic apparatus according to claim 1, wherein the control part gives vibration to the main body based on the result of analysis from characteristics of the change in the acceleration data based on the value detected by the sensor, and outputs either sound or light to give feedback to the user.

11. The electronic apparatus according to claim 1, further comprising a pressure sensor provided in the main body for detecting writing pressure.

12. An information processing method by an electronic apparatus which comprises a sensor for detecting a movement of a user who uses a writing tool or a movement of the writing tool; and a control part for performing control to output information to an output part based on information detected by the sensor,
wherein the performing control comprises steps of:
obtaining frequency of a writing action by discriminating and counting time when change in specific acceleration predetermined as an action not treated as the writing action including a letter occurred, from time when acceleration detected by the sensor exceeded certain value and this status continued for a certain period of time; and
outputting data including an image data of an animated character on software to the output part so that the animated character occurs and changes corresponding to the obtained frequency,
wherein the frequency of the writing action comprises at least one of: values indicating a writing frequency, a number of times of writing, a writing amount, and carefulness of a letter by the main body,
and wherein, for the animated character, at least one of: occurrence, being born from an egg, moving, changing, growing, becoming stronger, living longer, changing personality, changing nature, evolving, calling the user with sound or voice, and playing a sound effect is performed in response to the frequency.

13. The information processing method according to claim 12, wherein the step of discriminating the writing action of the letter comprises: deciding whether or not the writing action includes the letter by a periodicity of the change in the acceleration data based on the value detected by the sensor.

14. The information processing method according to claim 12, wherein the control part further comprises a step of discriminate a learning subject from characteristics of the change in the acceleration data based on the value detected by the sensor.

15. The information processing method according to claim 12, wherein the step of discriminating the writing action including the letter comprises a process of deciding that the action is not the writing action of the letter when three-dimensional coordinates of the pen tip exceeds certain three-dimensional space within a preset time from the value detected by the sensor.

16. The information processing method according to claim 12, wherein the control part further comprises steps of:
extracting handwriting from characteristics of change in acceleration data based on the value detected by the sensor;
performing collation between the extracted handwriting and handwriting previously registered in a database; and
switching user information of the electronic apparatus based on result of the collation.

17. The information processing method according to claim 12, wherein the control part further comprises steps of:
acquiring biological information including at least one of: blood flow and heart rate of the user; and measuring concentration of the user using at least one of: characteristics of the change in the acceleration data based on the value detected by the sensor and the biological information.

18. The information processing method according to claim 12, wherein, the control part switches a plurality of acquisition modes having different sampling frequencies when acquiring the acceleration data.

19. The information processing method according to claim 12, wherein the control part discriminates a degree of coincidence between registered writing information of a user registered in advance and discrimination target writing information, and performs a process of discriminating whether or not the user registered in advance and the user of a pen are the same person, the registered writing information comprising at least one of: a signature writing direction, a writing speed, a writing acceleration and carefulness of a letter, the discrimination target writing information corresponding to the registered writing information and comprising at least one of: a writing direction, a writing speed, a writing acceleration and carefulness of a letter when the user writes a signature.

20. An information processing method by an electronic apparatus which comprises a sensor for detecting a movement of a user who uses a writing tool or a movement of the writing tool, comprising steps of:
    obtaining frequency as a writing action including a letter by discriminating and counting time when change in specific acceleration predetermined as an action not treated as the writing action including a letter occurred, from time when acceleration detected by the sensor exceeded certain value and this status continued for a certain period of time;
    calculating a point corresponding to the frequency associated with the writing action; and
    performing at least one of: granting the point associated with the user and exchanging with an equivalent value corresponding to the point with a server via a network.

21. An electronic apparatus, comprising:
    a pen-type main body having a writing function or a main body attachable to a writing tool;
    a sensor provided in the main body for detecting movement of the main body by a user;
    a storage part for storing data including image data character on software or the image data character on software and numeric data; and
    a control part for performing control based on a value detected by the sensor,
    wherein the control part obtains frequency as a writing action including a letter by discriminating and counting time when change in specific acceleration predetermined as an action not treated as the writing action including a letter occurred, from time when acceleration detected by the sensor exceeded certain value and this status continued for a certain period of time, and outputs information to the output part so that it becomes at least one of: playing music, outputting the frequency as a graph, outputting a ranking with other users in the frequency corresponding to the frequency,
    and wherein the frequency of the writing action comprises at least one of: values indicating a writing frequency, a number of times of writing, a writing amount, and carefulness of a letter by the main body.

22. An information processing method by an electronic apparatus which comprises a sensor for detecting a movement of a user who uses a writing tool or a movement of the writing tool; and a control part for performing control to output information to an output part based on information detected by the sensor, wherein the control part comprises steps of:
    obtaining frequency as a writing action including a letter by discriminating and counting time when change in specific acceleration predetermined as an action not treated as the writing action including a letter occurred, from time when acceleration detected by the sensor exceeded certain value and this status continued for a certain period of time; and
    outputting information to the output part so that at least one of: playing music, outputting the frequency as a graph, outputting a ranking with other users in the frequency is performed in response to the frequency,
    wherein the frequency of the writing action comprises at least one of: values indicating a writing frequency, a number of times of writing, a writing amount, and carefulness of a letter by the main body.

* * * * *